(12) United States Patent
Cao et al.

(10) Patent No.: US 11,764,684 B2
(45) Date of Patent: *Sep. 19, 2023

(54) SYSTEMS AND METHODS FOR REGULATING POWER CONVERSION SYSTEMS WITH OUTPUT DETECTION AND SYNCHRONIZED RECTIFYING MECHANISMS

(71) Applicant: ON-BRIGHT ELECTRONICS (SHANGHAI) CO., LTD., Shanghai (CN)

(72) Inventors: Yaming Cao, Shanghai (CN); Qiang Luo, Shanghai (CN); Yuan Lin, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,372

(22) Filed: Feb. 10, 2020

(65) Prior Publication Data

US 2020/0280259 A1 Sep. 3, 2020

Related U.S. Application Data

(63) Continuation of application No. 15/665,264, filed on Jul. 31, 2017, now Pat. No. 10,622,902, which is a
(Continued)

(30) Foreign Application Priority Data

| Apr. 12, 2012 | (CN) | 201210118202.7 |
| Dec. 4, 2014 | (CN) | 201410729533.3 |
| Jul. 3, 2017 | (CN) | 201710534527.6 |

(51) Int. Cl.
| H02M 3/335 | (2006.01) |
| H02M 1/08 | (2006.01) |
| H02M 1/00 | (2006.01) |

(52) U.S. Cl.
CPC ........ H02M 3/33515 (2013.01); H02M 1/08 (2013.01); H02M 3/33507 (2013.01);
(Continued)

(58) Field of Classification Search
CPC .... H02M 1/08; H02M 1/0009; H02M 1/0032; H02M 1/0048; H02M 3/335;
(Continued)

(56) References Cited

U.S. PATENT DOCUMENTS

| 6,069,804 A | 5/2000 | Ingman et al. |
| 6,091,233 A | 7/2000 | Hwang et al. |
(Continued)

FOREIGN PATENT DOCUMENTS

| CN | 2529442 Y | 1/2003 |
| CN | 101106333 A | 1/2008 |
(Continued)

OTHER PUBLICATIONS

Chinese Patent Office, Office Action dated Mar. 19, 2021, in Application No. 202010063404.0.
(Continued)

*Primary Examiner* — Gary A Nash
(74) *Attorney, Agent, or Firm* — Faegre Drinker Biddle & Reath LLP

(57) ABSTRACT

System controller and method for regulating a power converter. For example, the system controller includes a first controller terminal and a second controller terminal. The system controller is configured to receive an input signal at the first controller terminal and generate a drive signal at the second controller terminal based at least in part on the input
(Continued)

signal to turn on or off a transistor in order to affect a current associated with a secondary winding of the power converter. Additionally, the system controller is further configured to determine whether the input signal remains larger than a first threshold for a first time period that is equal to or longer than a first predetermined duration.

30 Claims, 20 Drawing Sheets

Related U.S. Application Data continuation-in-part of application No. 15/204,324, filed on Jul. 7, 2016, now Pat. No. 10,411,604, which is a continuation of application No. 14/602,944, filed on Jan. 22, 2015, now Pat. No. 9,595,874, which is a continuation-in-part of application No. 13/466,808, filed on May 8, 2012, now Pat. No. 8,953,342.

(52) U.S. Cl.
CPC ...... *H02M 3/33592* (2013.01); *H02M 1/0009* (2021.05); *H02M 1/0032* (2021.05); *H02M 1/0048* (2021.05); *H02M 3/33523* (2013.01); *H02M 3/33576* (2013.01); *Y02B 70/10* (2013.01)

(58) Field of Classification Search
CPC ........... H02M 3/33515; H02M 3/3592; H02M 3/33507; H02M 3/33523; H02M 3/33576; Y02B 70/10
See application file for complete search history.

(56) References Cited

U.S. PATENT DOCUMENTS

| | | |
|---|---|---|
| 6,198,638 B1 | 3/2001 | Lee |
| 6,972,969 B1 | 12/2005 | Shteynberg et al. |
| 7,173,835 B1 | 2/2007 | Yang |
| 7,447,049 B2 | 11/2008 | Garner et al. |
| 7,768,801 B2 | 8/2010 | Usui et al. |
| 7,791,903 B2 | 9/2010 | Zhang et al. |
| 7,826,237 B2 | 11/2010 | Zhang et al. |
| 7,869,231 B2 | 1/2011 | Cohen |
| 7,952,894 B2 | 5/2011 | Lin et al. |
| 8,102,676 B2 | 1/2012 | Huynh et al. |
| 8,134,851 B2 | 3/2012 | Soldano et al. |
| 8,391,028 B2 | 3/2013 | Yeh |
| 8,542,507 B2 | 9/2013 | Hsu et al. |
| 8,570,772 B2 | 10/2013 | Morris et al. |
| 8,953,342 B2 | 2/2015 | Fang |
| 9,413,246 B2 | 8/2016 | Luo et al. |
| 9,595,874 B2 | 3/2017 | Cao et al. |
| 9,602,006 B2 | 3/2017 | Fahlenkamp |
| 9,608,532 B2 | 3/2017 | Wong et al. |
| 9,787,198 B1 | 10/2017 | Cao et al. |
| 10,003,268 B2 | 6/2018 | Fang et al. |
| 10,063,153 B2 | 8/2018 | Fang |
| 10,122,284 B2 | 11/2018 | Fang |
| 10,148,189 B2 | 12/2018 | Cao et al. |
| 10,158,298 B2 | 12/2018 | Lin et al. |
| 10,193,451 B2 | 1/2019 | Luo et al. |
| 10,270,354 B1 | 4/2019 | Lu et al. |
| 10,411,604 B2 | 9/2019 | Cao et al. |
| 10,411,605 B2 | 9/2019 | Cao et al. |
| 10,432,096 B2 | 10/2019 | Fang et al. |
| 10,483,856 B2 | 11/2019 | Cao et al. |
| 10,505,442 B2 | 12/2019 | Wong et al. |
| 10,516,341 B1 | 12/2019 | Fu et al. |
| 10,608,544 B2 | 3/2020 | Moon et al. |
| 10,622,902 B2 | 4/2020 | Cao et al. |
| 10,622,903 B2 | 4/2020 | Cao et al. |
| 10,651,747 B2 | 5/2020 | Cao et al. |
| 10,756,640 B1 | 8/2020 | Radic et al. |
| 10,819,211 B2 | 10/2020 | Yang et al. |
| 11,581,815 B2 | 2/2023 | Cao et al. |
| 11,588,405 B2 | 2/2023 | Cao et al. |
| 2002/0114172 A1 | 8/2002 | Webb et al. |
| 2003/0117119 A1 | 6/2003 | Bridge |
| 2004/0125621 A1 | 7/2004 | Yang et al. |
| 2005/0024897 A1 | 2/2005 | Yang et al. |
| 2005/0057951 A1 | 3/2005 | Berghegger |
| 2006/0018135 A1 | 1/2006 | Yang et al. |
| 2007/0014133 A1 | 1/2007 | Shao et al. |
| 2007/0139095 A1 | 6/2007 | Fang et al. |
| 2008/0037302 A1 | 2/2008 | Yang et al. |
| 2009/0168464 A1 | 7/2009 | Lin et al. |
| 2009/0257644 A1 | 10/2009 | Dodzin et al. |
| 2009/0322300 A1 | 12/2009 | Melanson et al. |
| 2010/0027298 A1 | 2/2010 | Cohen |
| 2010/0128501 A1* | 5/2010 | Huang ............... H02M 3/33523 363/21.16 |
| 2010/0219802 A1* | 9/2010 | Lin .................... H02M 3/33507 323/284 |
| 2011/0002145 A1 | 1/2011 | Halberstadt |
| 2011/0019446 A1* | 1/2011 | Wu .................... H02M 3/33523 363/79 |
| 2011/0044076 A1* | 2/2011 | Zhang ............... H02M 3/33507 363/21.17 |
| 2011/0169463 A1 | 7/2011 | Yang et al. |
| 2011/0305055 A1 | 12/2011 | Hsu et al. |
| 2012/0032708 A1 | 2/2012 | Coleman |
| 2012/0075891 A1* | 3/2012 | Zhang ............... H02M 3/33515 363/21.18 |
| 2012/0300520 A1 | 11/2012 | Ren et al. |
| 2013/0033236 A1 | 2/2013 | Li et al. |
| 2013/0235620 A1 | 9/2013 | Morris et al. |
| 2013/0258723 A1 | 10/2013 | Fang et al. |
| 2013/0272036 A1 | 10/2013 | Fang |
| 2014/0021786 A1 | 1/2014 | Fang |
| 2014/0204625 A1 | 7/2014 | Liu et al. |
| 2014/0218976 A1 | 8/2014 | Luo et al. |
| 2014/0368254 A1 | 12/2014 | Lee et al. |
| 2015/0070944 A1 | 3/2015 | Fang |
| 2015/0229223 A1 | 8/2015 | Cao et al. |
| 2015/0249380 A1 | 9/2015 | Hayakawa et al. |
| 2015/0280584 A1 | 10/2015 | Gong et al. |
| 2016/0149499 A1 | 5/2016 | Fang |
| 2016/0322909 A1 | 11/2016 | Cao et al. |
| 2017/0005578 A1 | 1/2017 | Luo et al. |
| 2017/0126138 A1 | 5/2017 | Cao et al. |
| 2017/0155322 A1 | 6/2017 | Zhang et al. |
| 2017/0222569 A1 | 8/2017 | Choi et al. |
| 2017/0264287 A1 | 9/2017 | Osanai |
| 2017/0353099 A1 | 12/2017 | Yang et al. |
| 2018/0013352 A1 | 1/2018 | Cao et al. |
| 2018/0034377 A1 | 2/2018 | Cao et al. |
| 2018/0076720 A1 | 3/2018 | Cao et al. |
| 2018/0248488 A1 | 8/2018 | Cao et al. |
| 2019/0068073 A1 | 2/2019 | Cao et al. |
| 2019/0393767 A1 | 12/2019 | Hwang et al. |
| 2019/0393790 A1 | 12/2019 | Cao et al. |
| 2020/0161985 A1 | 5/2020 | Li et al. |
| 2020/0280260 A1 | 9/2020 | Cao et al. |
| 2020/0336071 A1 | 10/2020 | Iorio et al. |
| 2020/0343810 A1 | 10/2020 | Xu et al. |
| 2021/0226540 A1 | 7/2021 | Zhao et al. |
| 2021/0376746 A1 | 12/2021 | Cao et al. |
| 2022/0294355 A1 | 9/2022 | Lin et al. |
| 2022/0329171 A1 | 10/2022 | Zhao et al. |
| 2023/0010393 A1 | 1/2023 | Zhao |
| 2023/0033953 A1 | 2/2023 | Cao |

FOREIGN PATENT DOCUMENTS

| | | |
|---|---|---|
| CN | 101188384 A | 5/2008 |
| CN | 101272089 A | 9/2008 |
| CN | 101378232 A | 3/2009 |
| CN | 201238265 Y | 5/2009 |

(56) References Cited

FOREIGN PATENT DOCUMENTS

| | | |
|---|---|---|
| CN | 201435677 Y | 3/2010 |
| CN | 101841247 A | 9/2010 |
| CN | 102017376 A | 4/2011 |
| CN | 102104338 A | 6/2011 |
| CN | 102217181 | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 102882377 A | 1/2013 |
| CN | 103296867 A | 9/2013 |
| CN | 103501112 A | 1/2014 |
| CN | 103728572 A | 4/2014 |
| CN | 103887980 A | 6/2014 |
| CN | 102185501 B | 9/2014 |
| CN | 104300793 A | 1/2015 |
| CN | 104393763 A | 3/2015 |
| CN | 103378751 A | 4/2015 |
| CN | 105322800 A | 2/2016 |
| CN | 105356727 A | 2/2016 |
| CN | 106026703 A | 5/2016 |
| CN | 107104598 A | 8/2017 |
| CN | 206379873 U | 8/2017 |
| CN | 107342691 A | 11/2017 |
| CN | 107579670 A | 1/2018 |
| CN | 107872158 A | 4/2018 |
| CN | 107979289 A | 5/2018 |
| CN | 108566104 A | 9/2018 |
| CN | 105846695 B | 11/2018 |
| CN | 108736749 A | 11/2018 |
| CN | 108880296 A | 11/2018 |
| CN | 109274272 A | 1/2019 |
| CN | 106130349 B | 3/2019 |
| CN | 109802559 A | 5/2019 |
| CN | 110620514 A | 12/2019 |
| CN | 209913730 U | 1/2020 |
| CN | 110896283 A | 3/2020 |
| CN | 110995013 A | 4/2020 |
| CN | 111146961 A | 5/2020 |
| CN | 111193407 A | 5/2020 |
| CN | 111404403 A | 7/2020 |
| CN | 211296573 U | 8/2020 |
| CN | 111697838 A | 9/2020 |
| CN | 111865095 A | 10/2020 |
| CN | 112688570 A | 4/2021 |
| CN | 112803773 A | 5/2021 |
| EP | 2525480 A1 | 11/2012 |
| JP | 2000-014136 A | 1/2000 |
| JP | 2007-28894 A | 2/2007 |
| JP | 2009-124296 A | 6/2009 |
| JP | 2009-261042 A | 11/2009 |
| JP | 2009-278717 A | 11/2009 |
| JP | 5285602 B2 | 9/2013 |
| JP | 6351787 B2 | 7/2018 |
| TW | 200717978 A | 5/2007 |
| TW | I 366335 | 6/2012 |
| TW | 201234854 A | 8/2012 |
| TW | I 401866 | 7/2013 |
| TW | I 436571 | 5/2014 |
| TW | I 448064 | 8/2014 |
| TW | 201521347 | 6/2015 |
| TW | I 489751 | 6/2015 |
| TW | 201537882 | 10/2015 |
| TW | I 509971 | 11/2015 |
| TW | 201707361 | 2/2017 |
| TW | I 625924 B | 6/2018 |
| TW | I 635699 | 9/2018 |
| TW | 201919322 A | 5/2019 |
| TW | 201933752 A | 8/2019 |
| TW | 201937834 A | 9/2019 |
| TW | 202002494 A | 1/2020 |
| TW | 202019066 A | 5/2020 |
| TW | 202110051 A | 3/2021 |
| TW | 202114333 A | 4/2021 |

OTHER PUBLICATIONS

Taiwan Intellectual Property Office, Office Action dated Feb. 23, 2021, in Application No. 109128639.
Taiwan Intellectual Property Office, Office Action dated Mar. 8, 2021, in Application No. 109110084.
United States Patent and Trademark Office, Notice of Allowance dated Apr. 15, 2021, in U.S. Appl. No. 16/503,916.
Beijing East IP Ltd., Statement attached with a Mailing List, submitted to the State Intellectual Property Office of China dated Apr. 29, 2015, and resubmitted to the State Intellectual Property Office of China dated Nov. 18, 2015, requesting correction of the filing date for Chinese Patent Application No. 201210118202.7.
State Intellectual Property Office of China, Formal Letter of Examination dated Dec. 2, 2015, in Application No. 201210118202.7.
State Intellectual Property Office of China, print-out of bibliographic data from http://cpquery.sipo.gov.cn of Chinese Patent Application No. 201210118202.7, dated Feb. 25, 2016.
Chinese Patent Office, Office Action dated Jan. 26, 2014, in Application No. 201210118202.7.
Chinese Patent Office, Office Action dated Oct. 28, 2015, in Application No. 201410093010.4.
Chinese Patent Office, Office Action dated May 25, 2016, in Application No. 201410729533.3.
Chinese Patent Office, Office Action dated Dec. 20, 2017, in Application No. 201610345719.8.
Chinese Patent Office, Office Action dated Sep. 4, 2018, in Application No. 201710102817.3.
Chinese Patent Office, Office Action dated Nov. 9, 2018, in Application No. 201710534527.6.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Taiwan Intellectual Property Office, Office Action dated Oct. 9, 2014, in Application No. 101118860.
Taiwan Intellectual Property Office, Office Action dated Dec. 2, 2016, in Application No. 104101330.
Taiwan Intellectual Property Office, Office Action dated May 4, 2017, in Application No. 105122491.
Taiwan Intellectual Property Office, Office Action dated Dec. 27, 2017, in Application No. 106111598.
Taiwan Intellectual Property Office, Office Action dated Oct. 24, 2018, in Application No. 106140199.
United States Patent and Trademark Office, Office Action dated Jan. 10, 2020, in U.S. Appl. No. 16/503,916.
United States Patent and Trademark Office, Office Action dated Sep. 18, 2020, in U.S. Appl. No. 16/503,916.
Chinese Patent Office, Office Action dated Apr. 6, 2022, in Application No. 202110771012.4.
Chinese Patent Office, Office Action dated Dec. 30, 2021, in Application No. 202110379198.9.
Chinese Patent Office, Office Action dated Jul. 5, 2022, in Application No. 202110865735.0.
Chinese Patent Office, Office Action dated Mar. 1, 2022, in Application No. 202110379198.9.
Chinese Patent Office, Office Action dated Mar. 29, 2022, in Application No. 202110263198.2.
Chinese Patent Office, Office Action dated Nov. 2, 2021, in Application No. 202110263198.2.
Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.
Taiwan Intellectual Property Office, Office Action dated Apr. 13, 2022, in Application No. 110129676.
Taiwan Intellectual Property Office, Office Action dated May 3, 2022, in Application No. 110138601.
United States Patent and Trademark Office, Notice of Allowance dated Feb. 8, 2022, in U.S. Appl. No. 16/503,916.
United States Patent and Trademark Office, Notice of Allowance dated Jul. 12, 2022, in U.S. Appl. No. 16/787,869.

(56) References Cited

OTHER PUBLICATIONS

United States Patent and Trademark Office, Notice of Allowance dated Jul. 6, 2022, in U.S. Appl. No. 16/503,916.
United States Patent and Trademark Office, Office Action dated Sep. 10, 2021, in U.S. Appl. No. 16/787,869.
Taiwan Intellectual Property Office, Office Action dated Oct. 11, 2022, in Application No. 110136342.
United States Patent and Trademark Office, Notice of Allowance dated Oct. 19, 2022, in U.S. Appl. No. 16/503,916.
United States Patent and Trademark Office, Notice of Allowance dated Oct. 3, 2022, in U.S. Appl. No. 16/787,869.
United States Patent and Trademark Office, Office Action dated Oct. 17, 2022, in U.S. Appl. No. 17/333,844.
Chinese Patent Office, Office Action dated Mar. 16, 2023, in Application No. 202010471872.1.
Taiwan Intellectual Property Office, Office Action dated Nov. 11, 2022, in Application No. 110142621.
United States Patent and Trademark Office, Notice of Allowance dated Feb. 2, 2023, in U.S. Appl. No. 17/333,844.
United States Patent and Trademark Office, Notice of Allowance dated Jan. 20, 2023, in U.S. Appl. No. 17/152,418.
United States Patent and Trademark Office, Notice of Allowance dated Mar. 15, 2023, in U.S. Appl. No. 17/333,844.
United States Patent and Trademark Office, Notice of Allowance dated Apr. 27, 2023, in U.S. Appl. No. 17/333,844.
United States Patent and Trademark Office, Notice of Allowance dated May 5, 2023, in U.S. Appl. No. 17/152,418.

\* cited by examiner

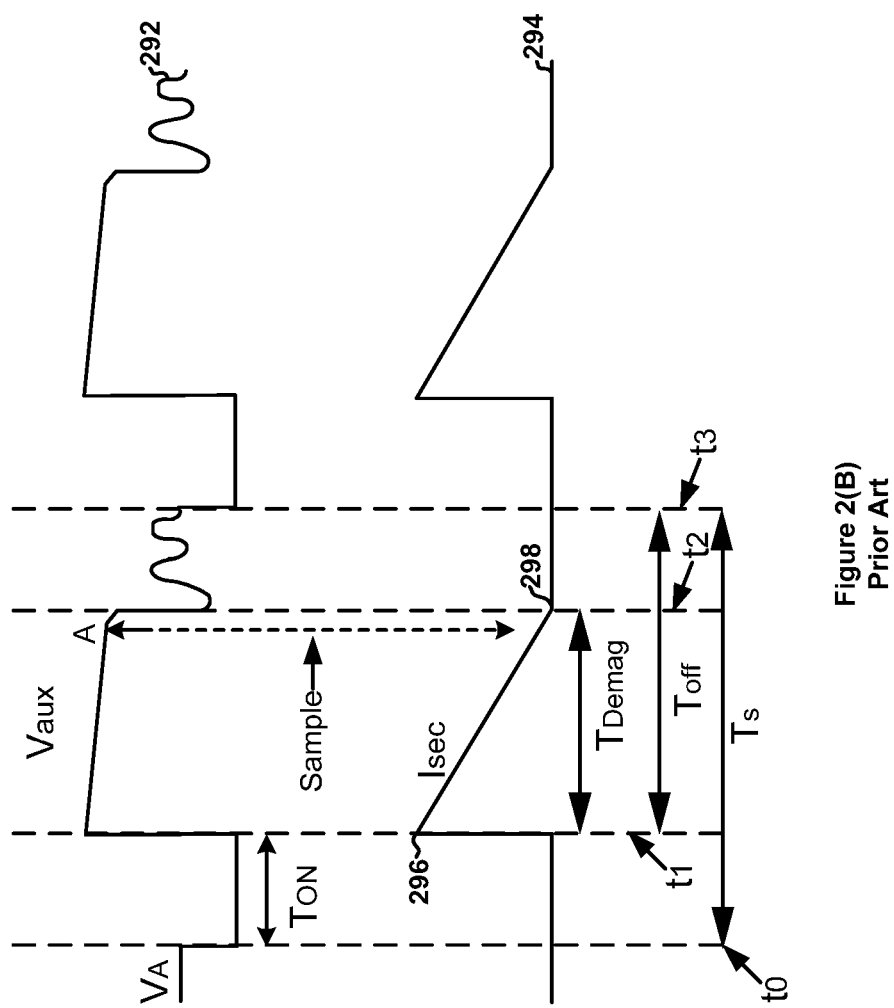

SYSTEMS AND METHODS FOR REGULATING POWER CONVERSION SYSTEMS WITH OUTPUT DETECTION AND SYNCHRONIZED RECTIFYING MECHANISMS

1. CROSS-REFERENCES TO RELATED APPLICATIONS

This application is a continuation of U.S. patent application Ser. No. 15/665,264, filed Jul. 31, 2017, which claims priority to Chinese Patent Application No. 201710534527.6, filed Jul. 3, 2017, both of these applications being incorporated by reference herein for all purposes. Additionally, U.S. patent application Ser. No. 15/665,264 is a continuation-in-part of U.S. patent application Ser. No. 15/204,324, filed Jul. 7, 2016, which is a continuation of U.S. patent application Ser. No. 14/602,944, filed Jan. 22, 2015, and U.S. patent application Ser. No. 14/602,944 claims priority to Chinese Patent Application No. 201410729533.3, filed Dec. 4, 2014, all of these applications being incorporated by reference herein for all purposes. Moreover, U.S. patent application Ser. No. 14/602,944 is a continuation-in-part of U.S. patent application Ser. No. 13/466,808, filed May 8, 2012, which claims priority to Chinese Patent Application No. 201210118202.7, filed Apr. 12, 2012, all of these applications being incorporated by reference herein for all purposes.

This application is related to U.S. patent application Ser. No. 15/184,827, which is incorporated by reference herein for all purposes.

2. BACKGROUND OF THE INVENTION

The present invention is directed to integrated circuits. More particularly, the invention provides systems and methods with output detection and synchronized rectifying mechanisms. Merely by way of example, the invention has been applied to a power conversion system. But it would be recognized that the invention has a much broader range of applicability.

FIG. 1 is a simplified diagram showing a conventional flyback power conversion system. The power conversion system 100 includes a primary winding 110, a secondary winding 112, a power switch 120, a current sensing resistor 122, a rectifying diode 124, a capacitor 126, an isolated feedback component 128, and a controller 102. The controller 102 includes an under-voltage-lockout component 104, a pulse-width-modulation generator 106, a gate driver 108, a leading-edge-blanking (LEB) component 116, and an over-current-protection (OCP) component 114. For example, the power switch 120 is a bipolar transistor. In another example, the power switch 120 is a field effect transistor.

The power conversion system 100 implements a transformer including the primary winding 110 and the secondary winding 112 to isolate an AC input voltage 190 on the primary side and an output voltage 192 on the secondary side. The isolated feedback component 128 processes information related to the output voltage 192 and generates a feedback signal 136. The controller 102 receives the feedback signal 136, and generates a gate-drive signal 130 to turn on and off the switch 120 in order to regulate the output voltage 192. For example, the isolated feedback component 128 includes an error amplifier, a compensation network, and an opto-coupler.

Though the fly-back power conversion system 100 can be used for output voltage regulation, the power conversion system 100 often cannot achieve good output current control without additional circuitry of high cost. Moreover, the required output current sensing resistor in the secondary side usually reduces the efficiency of the power conversion system 100.

FIG. 2(A) is a simplified diagram showing another conventional flyback power conversion system. The power conversion system 200 includes a system controller 202, a primary winding 210, a secondary winding 212, an auxiliary winding 214, a power switch 220, a current sensing resistor 230, two rectifying diodes 260 and 262, two capacitors 264 and 266, and two resistors 268 and 270. For example, the power switch 220 is a bipolar transistor. In another example, the power switch 220 is a MOS transistor.

Information related to the output voltage 250 can be extracted through the auxiliary winding 214 in order to regulate the output voltage 250. When the power switch 220 is closed (e.g., on), the energy is stored in the transformer that includes the primary winding 210 and the secondary winding 212. Then, when the power switch 220 is open (e.g., off), the stored energy is released to the secondary side, and the voltage of the auxiliary winding 214 maps the output voltage on the secondary side. The system controller 202 receives a current sensing signal 272 that indicates a primary current 276 flowing through the primary winding 210, and a feedback signal 274 that relates to a demagnetization process of the secondary side. For example, a switching period of the switch 220 includes an on-time period during which the switch 220 is closed (e.g., on) and an off-time period during which the switch 220 is open (e.g., off).

FIG. 2(B) is a simplified conventional timing diagram for the flyback power conversion system 200 that operates in the discontinuous conduction mode (DCM). The waveform 292 represents a voltage 254 of the auxiliary winding 214 as a function of time, and the waveform 294 represents a secondary current 278 that flows through the secondary winding 212 as a function of time.

For example, as shown in FIG. 2(B), a switching period, $T_s$ of the switch 220, starts at time to and ends at time $t_3$, an on-time period, $T_{on}$, starts at the time to and ends at time $t_1$, a demagnetization period, $T_{demag}$ starts at the time $t_1$ and ends at time $t_2$, and an off-time period, $T_{off}$, starts at the time $t_1$ and ends at the time $t_3$. In another example, $t_0 \leq t_1 \leq t_2 \leq t_3$. In DCM, the off-time period, $T_{off}$, is much longer than the demagnetization period, $T_{demag}$.

During the demagnetization period $T_{demag}$, the switch 220 remains open, the primary current 276 keeps at a low value (e.g., approximately zero). The secondary current 278 decreases from a value 296 (e.g., at $t_1$) as shown by the waveform 294. The demagnetization process ends at the time $t_2$ when the secondary current 278 has a low value 298 (e.g., approximately zero). The secondary current 278 keeps at the value 298 for the rest of the switching period. A next switching period does not start until a period of time after the completion of the demagnetization process (e.g., at $t_3$).

As shown in FIG. 1 and FIG. 2(A), the power conversion system 100 and the power conversion system 200 each use a rectifying diode (e.g., the diode 124 in FIG. 1 and the diode 260 in FIG. 2) on the secondary side for rectification. A forward voltage of the rectifying diode is usually in a range of 0.3V-0.8V. Such a forward voltage often results in significant power loss in operation, and thus causes low efficiency of the power conversion system. For example, when a power conversion system has an output level of 5V/1 A, a rectifying diode with a forward voltage of 0.3V-0.4V causes a power loss of about 0.3 W-0.4 W at a full load (e.g., 1A). The reduction of the system efficiency is about 4%-6%.

In addition, in order for the power conversion system 200 to achieve low standby power consumption, the switching frequency is often kept low to reduce switching loss under no load or light load conditions. However, when the power conversion system 200 changes from no/light load conditions to full load conditions, the output voltage 250 may drop abruptly and such a voltage drop may not be detected by the system controller 202 instantly because the system controller 202 can often detect the output voltage only during a demagnetization process of each switching cycle. Therefore, the dynamic performance of the power conversion system 200 is often unsatisfactory at a low switching frequency under no/light load conditions. For example, the power conversion system 200 has an output level of 5V/1 A and the output capacitor 264 has a capacitance of 1000 μF. Under no/light load conditions, the switching frequency is 1 kHz corresponding to a switching period of 1 ms. If the output load changes from no/light load conditions (e.g., 0 A) to full load conditions (e.g., 1 A), the output voltage 250 drops 1 V (e.g., from 5 V to 4 V), which is often unacceptable in certain applications.

FIG. 3 is a simplified diagram showing a conventional power conversion system with a secondary-side synchronization rectifier (SR). The power conversion system 2300 (e.g., a flyback power converter) includes a primary-side pulse-width-modulation (PWM) controller 2302, a primary winding 2304, a secondary winding 2306, a secondary-side synchronization rectifier (SR) controller 2308, a transistor 2310 (e.g., a MOSFET), an output capacitive load 2312, an output resistive load 2314, and a power switch 2330 (e.g., a transistor). The secondary-side synchronization rectifier (SR) controller 2308 includes terminals 2390, 2392, 2394 and 2396.

As shown in FIG. 3, the terminal 2390 receives a voltage signal 2362 indicative of a voltage at a terminal 2364 of the transistor 2310 (e.g., a drain terminal of the transistor 2310), and the terminal 2392 outputs a drive signal 2366 to the transistor 2310 (e.g., a MOSFET). Additionally, the terminal 2394 receives a voltage signal 2316 indicative an output voltage that is received by the output capacitive load 2312 and the output resistive load 2314. Also, the terminal 2396 is biased to the secondary-side ground.

The primary-side pulse-width-modulation (PWM) controller 2302 generates a drive signal 2332 (e.g., $V_{g1}$) and outputs the drive signal 2332 to the power switch 2330 (e.g., a transistor), and the secondary-side synchronization rectifier (SR) controller 2308 generates the drive signal 2366 (e.g., $V_g$) and outputs the drive signal 2366 to the transistor 2310 (e.g., a MOSFET).

In a secondary-side synchronization rectifier (SR) control system, the turn-on delay of the transistor 2310 often needs to be minimized in order to avoid any significant demagnetization current flowing through the body diode of the transistor 2310. Such minimization of the turn-on delay of the transistor 2310 usually is important for a high-efficiency and/or high-power-density system. On the other hand, to avoid inadvertent turn-on of the transistor 2310 by noise or disturbance, it is often important for the secondary controller 2308 to filter out the noise or disturbance by adding certain debounce time before turning on the transistor 2310.

The secondary-side synchronization rectifier (SR) controller 2308 includes a voltage detector 2320, a logic controller 2322, and a driver 2324. The secondary-side synchronization rectifier (SR) controller 2308 detects a voltage signal 2362 (e.g., $V_d$) indicative of a voltage at a terminal 2364 of the transistor 2310 (e.g., a drain terminal of the transistor 2310), and provides the drive signal 2366 (e.g., $V_g$) to decide turning on or off of the transistor 2310. Initially, the transistor 2310 is turned off with the drive signal 2366 (e.g., $V_g$) being equal to zero and the voltage signal 2362 (e.g., $V_d$) being larger than zero. Under normal operation, when the primary-side pulse-width-modulation (PWM) controller 2302 opens (e.g., turns off) the power switch 2330 (e.g., a transistor), the voltage signal 2362 (e.g., $V_d$) drops rapidly. After the voltage signal 2362 (e.g., $V_d$) becomes less than a threshold voltage, the secondary-side synchronization rectifier (SR) controller 2308 turns on the transistor 2310 by pulling the drive signal 2366 (e.g., $V_g$) high. Usually, noise or disturbance is coupled from the AC line to the voltage signal 2362 through the transformer.

Hence, it is highly desirable to improve techniques for rectification and output detection of a power conversion system.

3. BRIEF SUMMARY OF THE INVENTION

The present invention is directed to integrated circuits. More particularly, the invention provides systems and methods with output detection and synchronized rectifying mechanisms. Merely by way of example, the invention has been applied to a power conversion system. But it would be recognized that the invention has a much broader range of applicability.

According to one embodiment, a system controller for regulating a power conversion system includes a first controller terminal and a second controller terminal. The system controller is configured to receive at least an input signal at the first controller terminal, and generate a gate drive signal at the second controller terminal based on at least information associated with the input signal to turn on or off a transistor in order to affect a current associated with a secondary winding of the power conversion system. The system controller is further configured to, if the input signal is larger than a first threshold, generate the gate drive signal at a first logic level to turn off the transistor, and if the input signal changes from a first value larger than a second threshold to a second value smaller than the second threshold, change the gate drive signal from the first logic level to a second logic level to turn on the transistor.

According to another embodiment, a system controller for regulating a power conversion system includes a first controller terminal and a second controller terminal. The system controller is configured to receive at least an input signal at the first controller terminal, the input signal being proportional to an output voltage associated with a secondary winding of the power conversion system, and generate a gate drive signal at the second controller terminal based on at least information associated with the input signal to turn on or off a transistor in order to affect a current associated with the secondary winding of the power conversion system. The system controller is further configured to, only if the input signal changes from a first value larger than a first threshold to a second value smaller than the first threshold, generate a pulse of the gate drive signal to turn on the transistor during a pulse period associated with the pulse.

According to yet another embodiment, a system controller for regulating a power conversion system includes a first comparator, a signal detector, and a driving component. The first comparator is configured to receive an input signal and output a first comparison signal based on at least information associated with the input signal. The signal detector is configured to receive the input signal and output a first detection signal based on at least information associated with the input signal. The driving component is configured to output a gate drive signal based on at least information associated with the first comparison signal and the first detection signal to turn on or off a transistor in order to affect a current associated with a secondary winding of the power conversion system. The comparator is further configured to determine whether the input signal is larger than a first threshold. The signal detector is further configured to determine whether the input signal changes from a first value larger than a second threshold to a second value smaller than the second threshold. The driving component is further configured to, if the first comparison signal indicates the input signal is larger than the first threshold, generate the gate drive signal at a first logic level to turn off the transistor, and if the first detection signal indicates the input signal changes from the first value larger than the second threshold to the second value smaller than the second threshold, change the gate drive signal from the first logic level to a second logic level to turn on the transistor.

In one embodiment, a system controller for regulating a power conversion system includes a comparator, a pulse signal generator, and a driving component. A comparator is configured to receive an input signal and output a comparison signal based on at least information associated with the input signal. The pulse signal generator is configured to receive at least the comparison signal and generate a pulse signal based on at least information associated with the comparison signal. The driving component is configured to receive the pulse signal and generate a gate drive signal based on at least information associated with the pulse signal to turn on or off a transistor in order to affect a current associated with the secondary winding of the power conversion system. The comparator is further configured to determine whether the input signal is larger than or smaller than a threshold. The pulse signal generator is further configured to, only if the comparison signal indicates the input signal changes from a first value larger than the threshold to a second value smaller than the threshold, generate a first pulse of the pulse signal. The driving component is further configured to, in response to the first pulse of the pulse signal, generate a second pulse of the gate drive signal to turn on the transistor during a pulse period associated with the second pulse.

In another embodiment, a method for regulating a power conversion system includes receiving at least an input signal, processing information associated with the input signal, and generating a gate drive signal based on at least information associated with the input signal to turn on or off a transistor in order to affect a current associated with a secondary winding of the power conversion system. The process for generating a gate drive signal based on at least information associated with the input signal to turn on or off a transistor in order to affect a current associated with a secondary winding of the power conversion system includes, if the input signal is larger than a first threshold, generating the gate drive signal at a first logic level to turn off the transistor, and if the input signal changes from a first value larger than a second threshold to a second value smaller than the second threshold, changing the gate drive signal from the first logic level to a second logic level to turn on the transistor.

In yet another embodiment, a method for regulating a power conversion system includes receiving at least an input signal, the input signal being proportional to an output voltage associated with a secondary winding of the power conversion system, processing information associated with the input signal, and generating a gate drive signal based on at least information associated with the input signal to turn on or off a transistor in order to affect a current associated with the secondary winding of the power conversion system. The process for generating a gate drive signal based on at least information associated with the input signal to turn on or off a transistor in order to affect a current associated with the secondary winding of the power conversion system includes, only if the input signal changes from a first value larger than a first threshold to a second value smaller than the first threshold, generating a pulse of the gate drive signal to turn on the transistor during a pulse period associated with the pulse.

In yet another embodiment, a method for regulating a power conversion system includes receiving an input signal, processing information associated with the input signal, and determining whether the input signal is larger than a first threshold. The method further includes generating a comparison signal based on at least information associated with the input signal, determining whether the input signal changes from a first value larger than a second threshold to a second value smaller than the second threshold, and generating a detection signal based on at least information associated with the input signal. In addition, the method includes outputting a gate drive signal based on at least information associated with the comparison signal and the detection signal to turn on or off a transistor in order to affect a current associated with a secondary winding of the power conversion system. The process for outputting a gate drive signal based on at least information associated with the comparison signal and the detection signal to turn on or off a transistor in order to affect a current associated with a secondary winding of the power conversion system includes, if the comparison signal indicates the input signal is larger than the first threshold, generating the gate drive signal at a first logic level to turn off the transistor, and if the detection signal indicates the input signal changes from the first value larger than the second threshold to the second value smaller than the second threshold, changing the gate drive signal from the first logic level to a second logic level to turn on the transistor.

In yet another embodiment, a method for regulating a power conversion system includes receiving an input signal, processing information associated with the input signal, and determining whether the input signal is larger than or smaller than a threshold. The method further includes generating a comparison signal based on at least information associated with the first input signal, receiving the comparison signal, and processing information associated with the comparison signal. In addition, the method includes generating a pulse signal based on at least information associated with the comparison signal, receiving the pulse signal, processing information associated with the pulse signal, and generating a gate drive signal based on at least information associated with the pulse signal to turn on or off a transistor in order to affect a current associated with the secondary winding of the power conversion system. The process for generating a pulse signal based on at least information associated with the comparison signal includes, only if the comparison signal indicates the input signal changes from a first value larger than the threshold to a second value smaller than the threshold, generating a first pulse of the pulse signal. The process for generating a gate drive signal based on at least information associated with the pulse signal to turn on or off a transistor in order to affect a current associated with the secondary winding of the power conversion system includes, in response to the first pulse of the pulse signal, generate a second pulse of the gate drive signal to turn on the transistor during a pulse period associated with the second pulse.

According to yet another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal is larger than a first threshold at a first time, in response to the input signal being determined to be larger than the first threshold at the first time, determine whether the input signal is smaller than a second threshold at a second time, and in response to the input signal being determined to be smaller than the second threshold at the second time, change the drive signal at the second controller terminal from a first logic level to a second logic level. Also, the second time is after the first time.

According to yet another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal remains larger than a first threshold for a time period that is longer than a predetermined duration, and in response to the input signal being determined to have remained larger than the first threshold for the time period that is longer than the predetermined duration, determine whether the input signal is smaller than a second threshold at a time following the time period. Moreover, the system controller is further configured to, in response to the input signal being determined to be smaller than the second threshold at the time, change the drive signal at the second controller terminal from a first logic level to a second logic level.

According to yet another embodiment, a system controller for regulating a power conversion system includes a first controller terminal, and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether a time interval from a first time when the input signal becomes larger than a first threshold to a second time when the input signal becomes smaller than a second threshold is longer than a predetermined duration, and in response to the time interval being determined to be longer than the predetermined duration, determine whether the input signal is smaller than a third threshold at a time following the time interval. Also, the system controller is further configured to, in response to the input signal being determined to be smaller than the third threshold at the time, change the drive signal at the second controller terminal from a first logic level to a second logic level.

According to yet another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal is larger than a first threshold, determine whether the input signal remains larger than a second threshold for a time period that is longer than a first predetermined duration, and determine whether a time interval from a first time when the input signal becomes larger than a third threshold to a second time when the input signal becomes smaller than a fourth threshold is longer than a second predetermined duration. Also, the system controller is further configured to, in response to the input signal being determined to be larger than the first threshold, the input signal being determined to be larger than the second threshold for the time period that is longer than the first predetermined duration, or the time interval being determined to be longer than the second predetermined duration, determine whether the input signal is smaller than a fifth threshold, and in response to the input signal being determined to be smaller than the fifth threshold, change the drive signal at the second controller terminal from a first logic level to a second logic level.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal is larger than a first threshold at a first time. Moreover, the generating a drive signal based at least in part on the input signal to turn on or off a transistor in order to affect a current associated with a secondary winding of the power conversion system includes, in response to the input signal being determined to be larger than the first threshold at the first time, determining whether the input signal is smaller than a second threshold at a second time, and in response to the input signal being determined to be smaller than the second threshold at the second time, changing the drive signal from a first logic level to a second logic level. Also, the second time is after the first time.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal remains larger than a first threshold for a time period that is longer than a predetermined duration. Moreover, the generating a drive signal based at least in part on the input signal to turn on or off a transistor in order to affect a current associated with a secondary winding of the power conversion system includes, in response to the input signal being determined to have remained larger than the first threshold for the time period that is longer than the predetermined duration, determining whether the input signal is smaller than a second threshold at a time following the time period, and in response to the input signal being determined to be smaller than the second threshold at the time, changing the drive signal from a first logic level to a second logic level.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether a time interval from a first time when the input signal becomes larger than a first threshold to a second time when the input signal becomes smaller than a second threshold is longer than a predetermined duration. Moreover, the generating a drive signal based at least in part on the input signal to turn on or off a transistor in order to affect a current associated with a secondary winding of the power conversion system includes, in response to the time interval being determined to be longer than the predetermined duration, determining whether the input signal is smaller than a third threshold at a time following the time interval, and in response to the input signal being determined to be smaller than the third threshold at the time, change the drive signal from a first logic level to a second logic level.

According to yet another embodiment, a method for regulating a power conversion system includes receive an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal is larger than a first threshold, determining whether the input signal remains larger than a second threshold for a time period that is longer than a first predetermined duration, and determining whether a time interval from a first time when the input signal becomes larger than a third threshold to a second time when the input signal becomes smaller than a fourth threshold is longer than a second predetermined duration. Moreover, the generating a drive signal based at least in part on the input signal to turn on or off a transistor in order to affect a current associated with a secondary winding of the power conversion system includes, in response to the input signal being determined to be larger than the first threshold, the input signal being determined to be larger than the second threshold for the time period that is longer than the first predetermined duration, or the time interval being determined to be longer than the second predetermined duration, determining whether the input signal is smaller than a fifth threshold, and in response to the input signal being determined to be smaller than the fifth threshold, changing the drive signal from a first logic level to a second logic level.

According to yet another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and in response to the input signal not being determined to remain larger than the first threshold for the first time period that is equal to or longer than the first predetermined duration, operate with a first mechanism. Moreover, operating with the first mechanism, the system controller is further configured to determine whether the input signal remains smaller than a second threshold for a second time period that is equal to or longer than a second predetermined duration, and in response to the input signal being determined to remain smaller than the second threshold for the second time period that is equal to or longer than the second predetermined duration, change the drive signal at the second controller terminal from a first logic level to a second logic level. The first predetermined duration is larger than zero, and the second predetermined duration is larger than zero.

According to yet another embodiment, a system controller for regulating a power converter includes a first controller terminal and a second controller terminal. The system controller is configured to receive an input signal at the first controller terminal, and generate a drive signal at the second controller terminal based at least in part on the input signal to turn on or off a transistor in order to affect a current associated with a secondary winding of the power converter. Additionally, the system controller is further configured to determine whether the input signal remains smaller than or equal to a first threshold and larger than a second threshold for a first time period that is equal to or longer than a first predetermined duration, the second threshold being smaller than the first threshold, and in response to the input signal not being determined to remain smaller than or equal to the first threshold and larger than the second threshold for the first time period that is equal to or longer than the first predetermined duration, operate with a first mechanism. Moreover, operating with the first mechanism, the system controller is further configured to determine whether the input signal remains smaller than a third threshold for a second time period that is equal to or longer than a second predetermined duration, and in response to the input signal being determined to remain smaller than the third threshold for the second time period that is equal to or longer than the second predetermined duration, change the drive signal at the second controller terminal from a first logic level to a second logic level. The first predetermined duration is larger than zero, and the second predetermined duration is larger than zero.

According to yet another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. The second threshold is smaller than the first threshold, and the second predetermined duration is longer than the first predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. Also, operating with the first mechanism, the system controller is further configured to determine whether the input signal remains smaller than a third threshold for a third time period that is equal to or longer than a third predetermined duration, and in response to the input signal being determined to remain smaller than the third threshold for the third time period that is equal to or longer than the third predetermined duration, change the drive signal at the second controller terminal from a first logic level to a second logic level. The first predetermined duration is larger than zero, the second predetermined duration is larger than zero, and the third predetermined duration is larger than zero.

According yet another embodiment, a system controller for regulating a power converter includes a first controller terminal and a second controller terminal. The system controller is configured to receive an input signal at the first controller terminal, and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. The second threshold is smaller than the first threshold, and the second predetermined duration is longer than the first predetermined duration. The first predetermined duration is larger than zero, and the second predetermined duration is larger than zero. The first threshold changes with the input signal in magnitude, and the second threshold changes with the input signal in magnitude.

According to yet another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. The second threshold is smaller than the first threshold, and the second predetermined duration is longer than the first predetermined duration. The first predetermined duration is larger than zero, the second predetermined duration is larger than zero, the first predetermined duration changes with the input signal in magnitude, and the second predetermined duration changes with the input signal in magnitude.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; and in response to the input signal not being determined to remain larger than the first threshold for the first time period that is equal to or longer than the first predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a second threshold for a second time period that is equal to or longer than a second predetermined duration; and in response to the input signal being determined to remain smaller than the second threshold for the second time period that is equal to or longer than the second predetermined duration, changing the drive signal from a first logic level to a second logic level. The first predetermined duration is larger than zero, and the second predetermined duration is larger than zero.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains smaller than or equal to a first threshold and larger than a second threshold for a first time period that is equal to or longer than a first predetermined duration, the second threshold being smaller than the first threshold; and in response to the input signal not being determined to remain smaller than or equal to the first threshold and larger than the second threshold for the first time period that is equal to or longer than the first predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a third threshold for a second time period that is equal to or longer than a second predetermined duration; and in response to the input signal being determined to remain smaller than the third threshold for the second time period that is equal to or longer than the second predetermined duration, changing the drive signal from a first logic level to a second logic level. The first predetermined duration is larger than zero, and the second predetermined duration is larger than zero.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration, the second threshold being smaller than the first threshold, the second predetermined duration being longer than the first predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a third threshold for a third time period that is equal to or longer than a third predetermined duration; and in response to the input signal being determined to remain smaller than the third threshold for the third time period that is equal to or longer than the third predetermined duration, changing the drive signal from a first logic level to a second logic level. The first predetermined duration is larger than zero, the second predetermined duration is larger than zero, and the third predetermined duration is larger than zero.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The second threshold is smaller than the first threshold, and the second predetermined duration is longer than the first predetermined duration. The first predetermined duration is larger than zero, and the second predetermined duration is larger than zero. The first threshold changes with the input signal in magnitude, and the second threshold changes with the input signal in magnitude.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The second threshold is smaller than the first threshold, and the second predetermined duration is longer than the first predetermined duration. The first predetermined duration is larger than zero, the second predetermined duration is larger than zero, the first predetermined duration changes with the input signal in magnitude, and the second predetermined duration changes with the input signal in magnitude.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 2(B) is a simplified conventional timing diagram for the flyback power conversion system as shown in FIG. 2(A) that operates in the discontinuous conduction mode (DCM).

5. DETAILED DESCRIPTION OF THE INVENTION

The present invention is directed to integrated circuits. More particularly, the invention provides systems and methods with output detection and synchronized rectifying mechanisms. Merely by way of example, the invention has been applied to a power conversion system. But it would be recognized that the invention has a much broader range of applicability.

Figure 1:
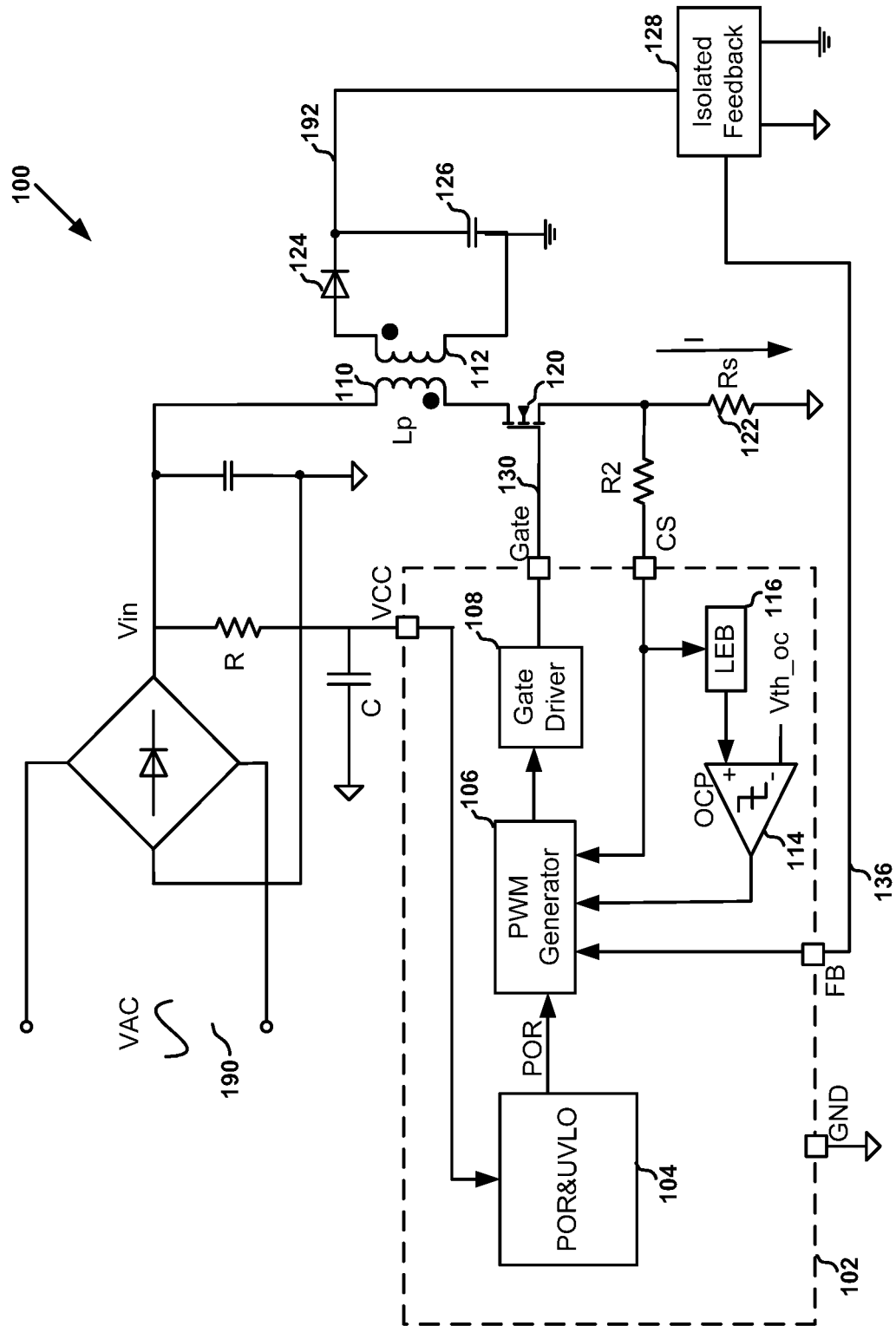
FIG. 1 is a simplified diagram showing a conventional flyback power conversion system.
Figure 2A:
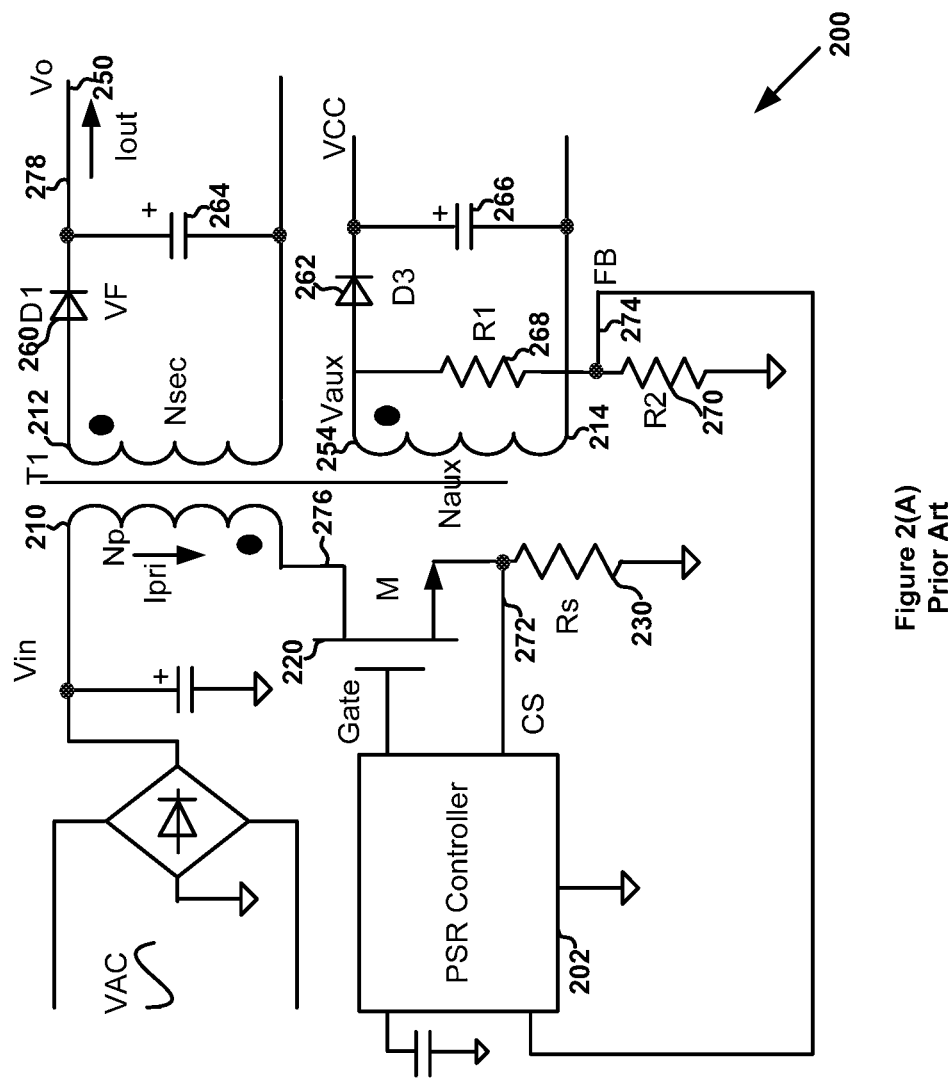
FIG. 2(A) is a simplified diagram showing another conventional flyback power conversion system.
Figure 3:
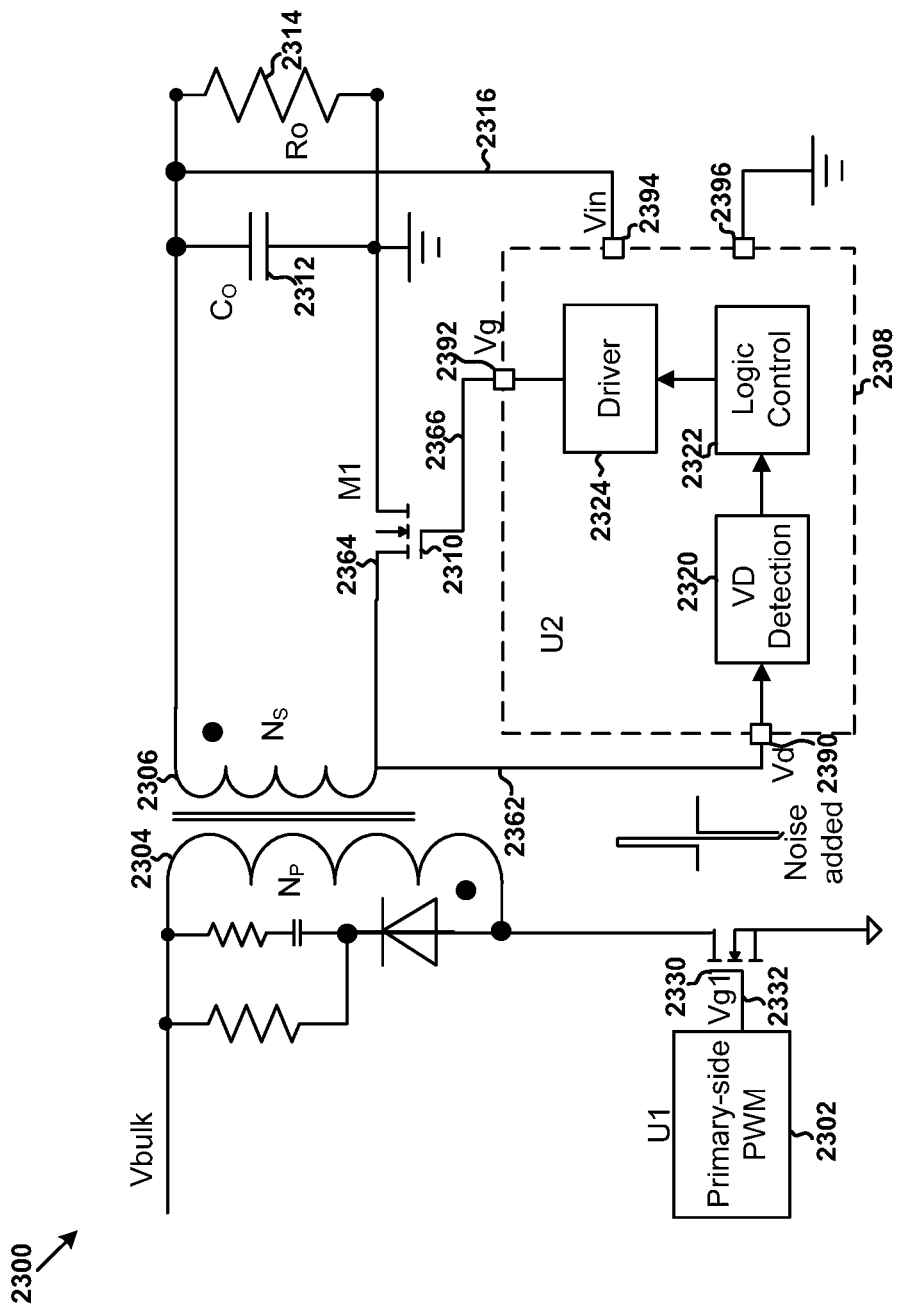
FIG. 3 is a simplified diagram showing a conventional power conversion system with a secondary-side synchronization rectifier (SR).
Figure 4A:
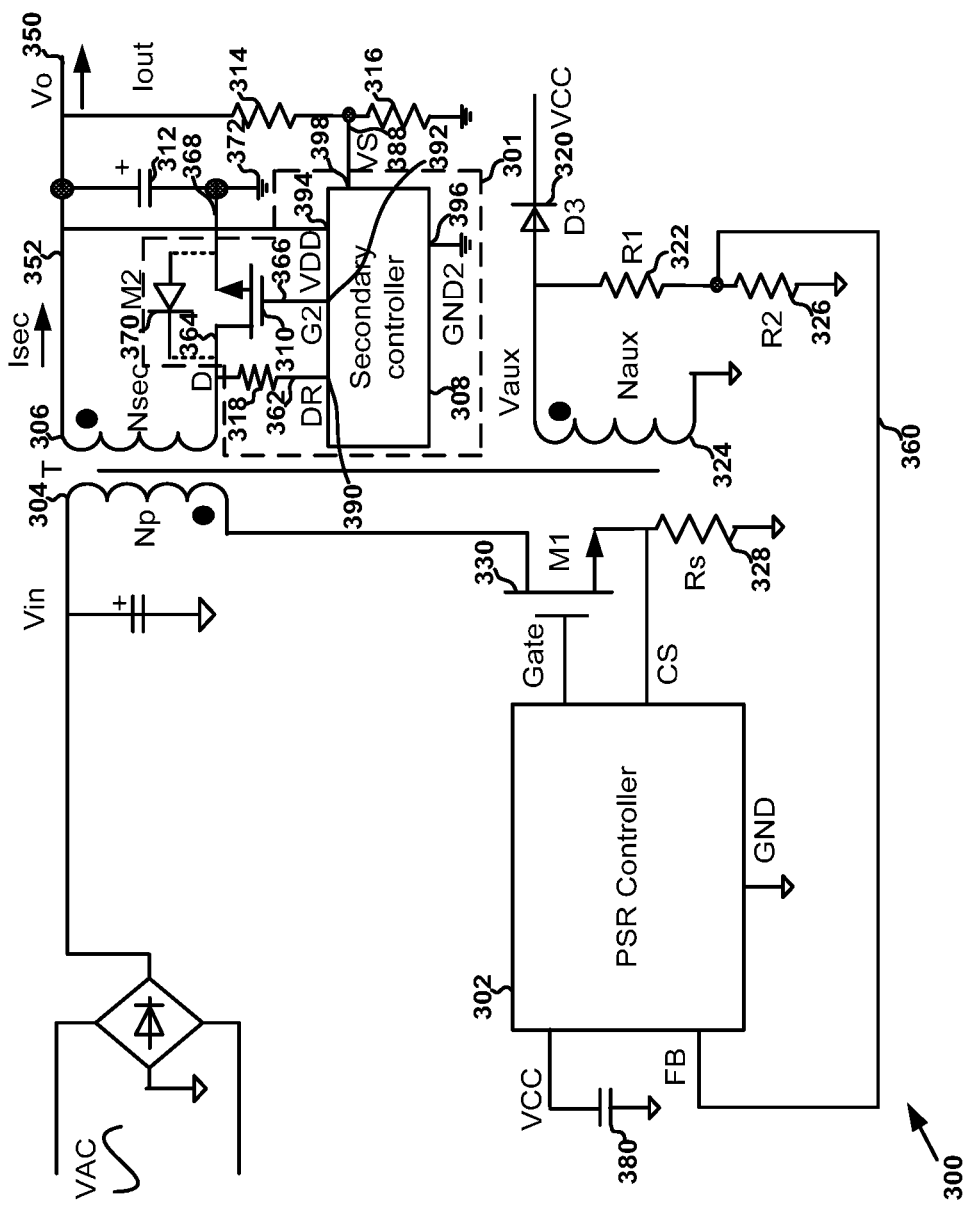
FIG. 4(A) is a simplified diagram showing a power conversion system with a rectifying circuit according to an embodiment of the present invention.

FIG. 4(A) is a simplified diagram showing a power conversion system with a rectifying circuit according to an embodiment of the present invention. This diagram is merely an example, which should not unduly limit the scope of the claims. One of ordinary skill in the art would recognize many variations, alternatives, and modifications. The power conversion system 300 includes a controller 302, a primary winding 304, a secondary winding 306, an auxiliary winding 324, a rectifying circuit 301, a diode 320, a current sensing resistor 328, capacitors 312 and 380, resistors 314, 316, 322 and 326, and a power switch 330. The rectifying circuit 301 includes a secondary controller 308, a resistor 318 and a transistor 310. The secondary controller 308 includes terminals 390, 392, 394, 396 and 398. For example, the transistor 310 is a MOSFET. In another example, the power switch 330 is a transistor.

According to one embodiment, when the power switch 330 is closed (e.g., on), the energy is stored in the transformer that includes the primary winding 304 and the secondary winding 306. For example, when the power switch 330 is open (e.g., off), the stored energy is transferred to the secondary side, and the voltage of the auxiliary winding 324 maps an output voltage 350 on the secondary side. In another example, the controller 302 receives a feedback signal 360 from a voltage divider that includes the resistors 322 and 326 for output voltage regulation. In yet another example, during the process of energy transfer (e.g., a demagnetization process), the transistor 310 is turned on and at least part of a secondary current 352 flows through the transistor 310. In yet another example, a turn-on resistance of the transistor 310 is very small (e.g., in the range of tens of milli-ohms). In yet another example, the voltage drop on the transistor 310 when conducting is much smaller than a voltage drop on a rectifying diode (e.g., the diode 124 or the diode 260), and thus the power loss of the power conversion system 300 is greatly reduced compared with the system 100 or the system 200.

According to another embodiment, at the end of the energy transfer process (e.g., the demagnetization process), the secondary current 352 has a low value (e.g., nearly zero). For example, the transistor 310 is turned off to prevent a residual current flowing from an output terminal 351 to ground through the transistor 310. In another example, the power switch 330 remains off (e.g., open) when the transistor 310 is on. In yet another example, the secondary controller 308 receives a voltage signal 362 (e.g., $V_{DR}$) indicative of a voltage at a terminal 364 of the transistor 310 (e.g., a drain terminal of the transistor 310), and provides a signal 366 (e.g., at terminal G2) to drive the transistor 310.

As discussed above and further emphasized here, FIG. 4(A) is merely an example, which should not unduly limit the scope of the claims. One of ordinary skill in the art would recognize many variations, alternatives, and modifications. For example, the controller 302 and the secondary controller 308 are on different chips. In another example, the secondary controller 308 and the transistor 310 are on different chips which are parts of a multi-chip package. In yet another example, the secondary controller 308 and the transistor 310 are integrated on a same chip.

Figure 4B:
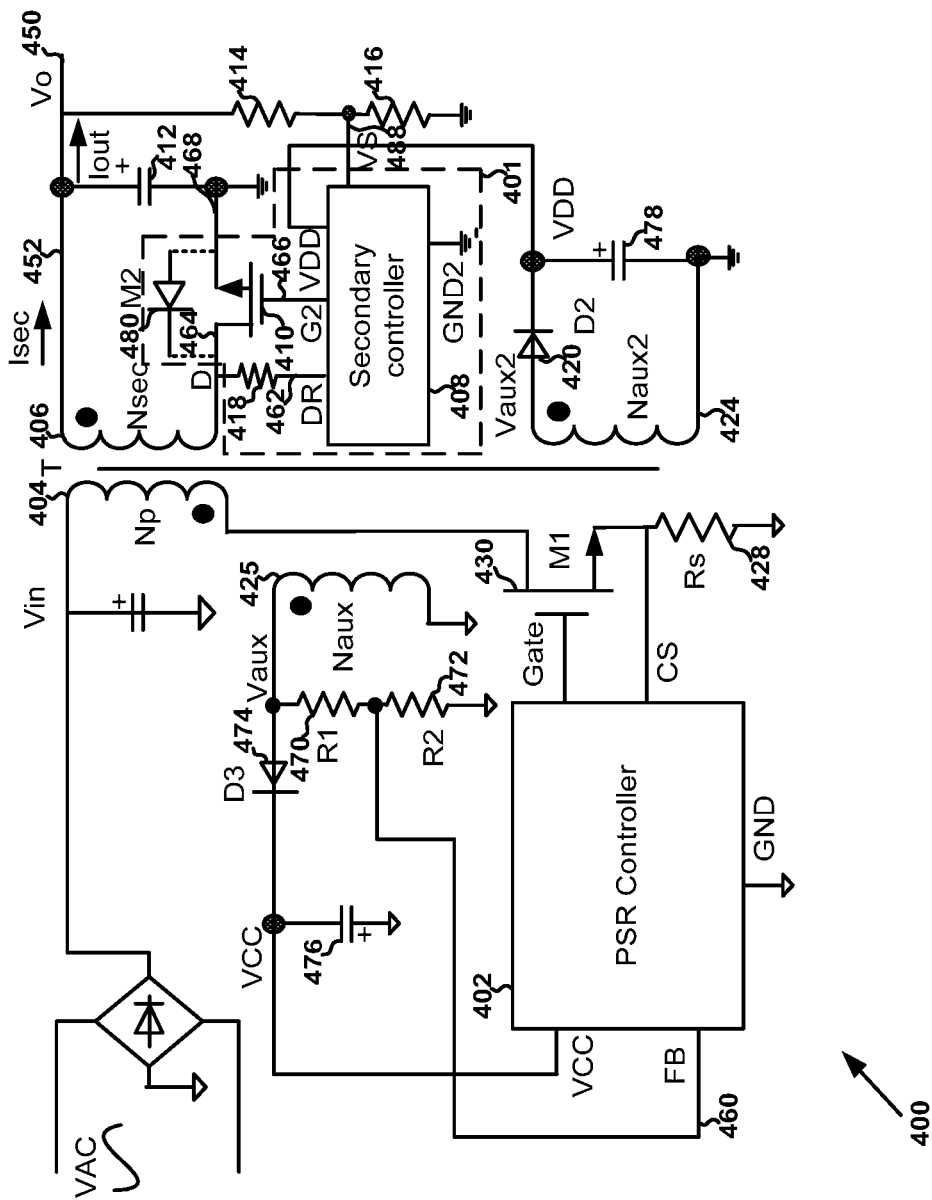
FIG. 4(B) is a simplified diagram showing a power conversion system with a rectifying circuit according to another embodiment of the present invention.

FIG. 4(B) is a simplified diagram showing a power conversion system with a rectifying circuit according to another embodiment of the present invention. This diagram is merely an example, which should not unduly limit the scope of the claims. One of ordinary skill in the art would recognize many variations, alternatives, and modifications. The power conversion system 400 includes a controller 402, a primary winding 404, a secondary winding 406, a first auxiliary winding 424, a second auxiliary winding 425, a rectifying circuit 401, diodes 420 and 474, capacitors 412, 476 and 478, a current sensing resistor 428, resistors 414, 416, 470 and 472, and a power switch 430. The rectifying circuit 401 includes a secondary controller 408, a resistor 418 and a transistor 410. For example, the transistor 410 is a MOSFET. In another example, the power switch 430 is a transistor. In yet another example, the rectifying circuit 401 is the same as the rectifying circuit 301.

According to one embodiment, when the power switch 430 is closed (e.g., on), the energy is stored in the transformer that includes the primary winding 404 and the secondary winding 406. For example, when the power switch 430 is open (e.g., off), the stored energy is transferred to the secondary side, and the voltage of the second auxiliary winding 425 maps an output voltage 450 on the secondary side. In another example, the controller 402 receives a feedback signal 460 from a voltage divider that includes the resistors 470 and 472 for output voltage regulation. In another example, during the process of energy transfer (e.g., a demagnetization process), the transistor 410 is turned on and at least part of a secondary current 452 flows through the transistor 410. In yet another example, a turn-on resistance of the transistor 410 is very small (e.g., in the range of tens of milli-ohms).

According to another embodiment, at the end of the energy transfer process (e.g., the demagnetization process), the secondary current 452 has a low value (e.g., nearly zero). For example, the transistor 410 is turned off to prevent a reversal current from flowing from an output terminal to ground through the transistor 410. In another example, the power switch 430 remains off (e.g., open) when the transistor 410 is on. In yet another example, the secondary controller 408 receives (e.g., at terminal DR) a voltage signal 462 indicative of a voltage at a terminal 464 of the transistor 410 (e.g., a drain terminal of the transistor 410), and provides a signal 466 (e.g., at terminal G2) to drive the transistor 410.

As discussed above and further emphasized here, FIG. 4(B) is merely an example, which should not unduly limit the scope of the claims. One of ordinary skill in the art would recognize many variations, alternatives, and modifications. For example, the controller 402 and the secondary controller 408 are on different chips. In another example, the secondary controller 408 and the transistor 410 are on different chips which are part of a multi-chip package. In yet another example, the secondary controller 408 and the transistor 410 are integrated on a same chip.

Figure 5:
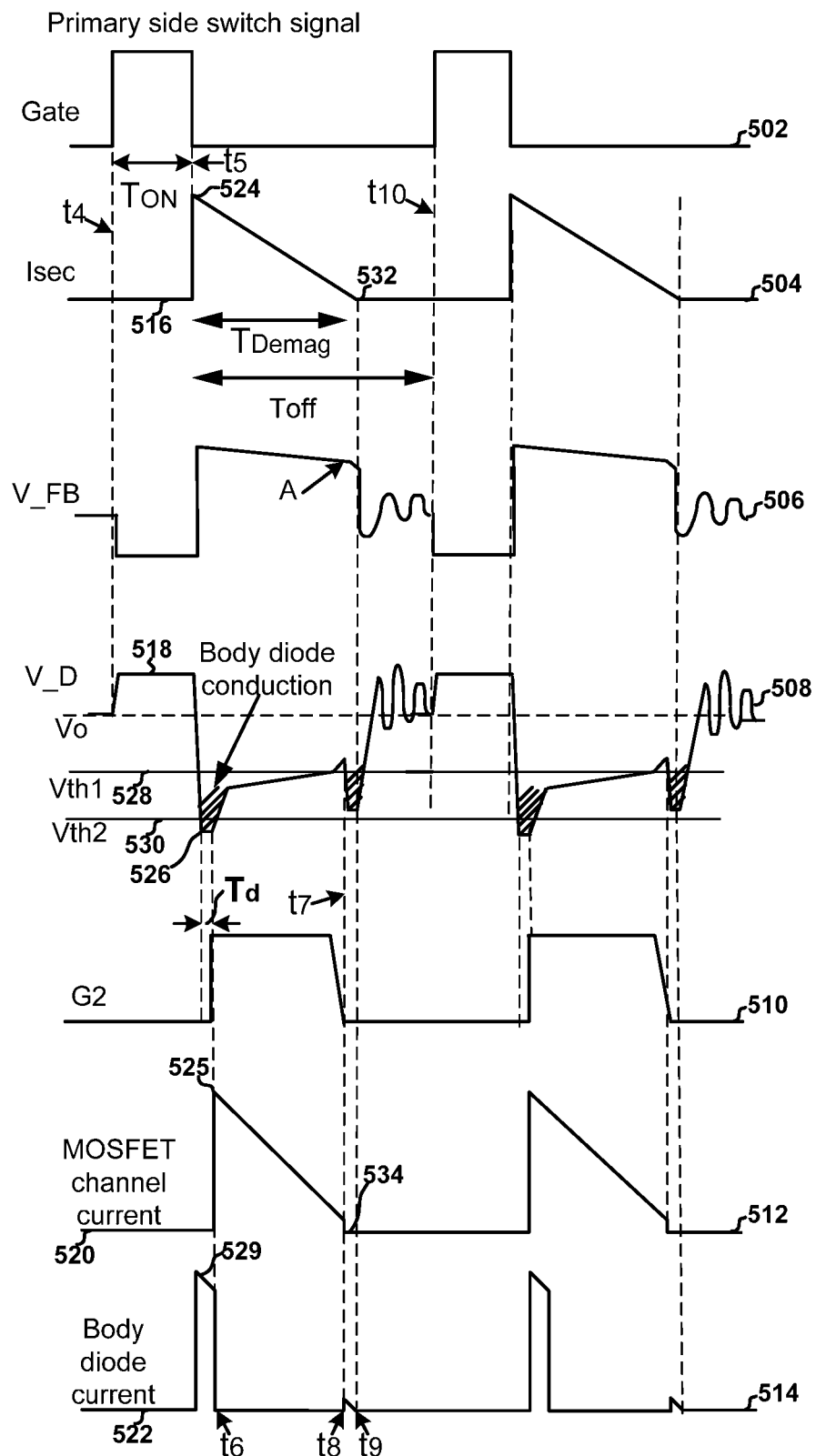
FIG. 5 is a simplified timing diagram for the power conversion system as shown in FIG. 4(A) operating in the discontinuous conduction mode (DCM) according to an embodiment of the present invention.

FIG. 5 is a simplified timing diagram for the power conversion system 300 as shown in FIG. 4(A) operating in the discontinuous conduction mode (DCM) according to an embodiment of the present invention. This diagram is merely an example, which should not unduly limit the scope of the claims. One of ordinary skill in the art would recognize many variations, alternatives, and modifications. For example, the waveform 502 represents the power switch 330 being turned on or off as a function of time, the waveform 504 represents the secondary current 352 as a function of time, and the waveform 506 represents the feedback signal 360 as a function of time. In addition, the waveform 508 represents the voltage signal 362 (e.g., at terminal DR) as a function of time, the waveform 510 represents the signal 366 (e.g., at terminal G2) as a function of time, the waveform 512 represents a channel current 368 that flows through the transistor 310 as a function of time, and the waveform 514 represents a body-diode current 370 that flows through a body diode of the transistor 310 (e.g., a parasitic diode) as a function of time.

For example, a switching period of the switch 330 includes an on-time period during which the switch 330 is closed (e.g., on) and an off-time period during which the switch 330 is open (e.g., off). In another example, as shown in FIG. 5, an on-time period of the switch 330 (e.g., $T_{on}$) starts at time $t_4$ and ends at time $t_5$, and an off-time period of the switch 330 (e.g., $T_{off}$) starts at the time $t_5$ and ends at time $t_9$. A demagnetization period associated with the transformer including the primary winding 304 and the secondary winding 306 (e.g., $T_{demag}$) starts at the time $t_5$ and ends at time $t_8$. In yet another example, $t_4 \leq t_5 \leq t_6 \leq t_7 \leq t_8 \leq t_9$.

According to one embodiment, during the on-time period (e.g., $T_{on}$), the switch 330 is closed (e.g., being turned on) as shown by the waveform 502, and the energy is stored in the transformer that includes the primary winding 304 and the secondary winding 306. For example, the secondary current 352 has a low value 516 (e.g., nearly zero) as shown by the waveform 504. In another example, the voltage signal 362 (e.g., $V_{DR}$) received by the secondary controller 308 has a value 518 which is higher than zero (e.g., as shown by the waveform 508). In yet another example, the signal 366 is at a logic low level (e.g., as shown by the waveform 510), and the transistor 310 is off. In yet another example, during the on-time period (e.g., $T_{on}$), the channel current 368 has a low value 520 (e.g., nearly zero as shown by the waveform 512) and the body-diode current 370 has a low value 522 (e.g., nearly zero as shown by the waveform 514).

According to another embodiment, at the end of the on-time period (e.g., at $t_5$), the switch 330 is open (e.g., off) as shown by the waveform 502, and the energy is transferred to the secondary side. For example, the secondary current 352 increases from the value 516 to a value 524 (e.g., at $t_5$) as shown by the waveform 504. In another example, the voltage signal 362 (e.g., $V_{DR}$) decreases from the value 518 to a value 526 (e.g., as shown by the waveform 508). In yet another example, the value 526 is lower than both a first threshold voltage 528 (e.g., $V_{th1}$) and a second threshold voltage 530 (e.g., $V_{th2}$). In yet another example, both the first threshold voltage 528 (e.g., $V_{th1}$) and the second threshold voltage 530 (e.g., $V_{th2}$) are lower than a ground voltage 372 (e.g., zero volt). In yet another example, the body diode of the transistor 310 begins to conduct, and the body-diode current 370 increases from the value 522 to a value 529 (e.g., as shown by the waveform 514). Thereafter, the signal 366 changes from the logic low level to a logic high level (e.g., at $t_6$ as shown by the waveform 510) and the transistor 310 is turned on in certain embodiments. For example, the channel current 368 increases from the value 520 to a value 525 (e.g., at $t_6$ as shown by the waveform 512). In another example, there is a delay (e.g., $T_d$) between the time at which the voltage signal 362 (e.g., $V_{DR}$) decreases from the value 518 to a value 526 and the time at which the signal 366 changes from the logic low level to the logic high level. In yet another example, the delay (e.g., $T_d$) is zero.

According to yet another embodiment, during the demagnetization period (e.g., $T_{demag}$), the switch 330 remains open (e.g., off) as shown by the waveform 502. For example, the secondary current 352 decreases from the value 524 as shown by the waveform 504. In another example, if the voltage signal 362 (e.g., $V_{DR}$) is larger than the first threshold voltage 528 (e.g., at $t_7$ as shown by the waveform 508), the signal 366 changes from the logic high level to the logic low level (e.g., as shown by the waveform 510). In yet another example, the voltage signal 362 (e.g., $V_{DR}$) decreases to become lower than the first threshold voltage 528 again (e.g., at $t_8$ as shown by the waveform 508). In yet another example, the transistor 310 is turned off, and the channel current 368 decreases to a low value 534 (e.g., nearly zero as shown by the waveform 512). In yet another example, the body-diode current 370 flows through the body diode of the transistor 310, and decreases to a low value (e.g., nearly zero at $t_9$ as shown by the waveform 514). In yet another example, the demagnetization period ends at the time $t_9$. In yet another example, immediately after the time $t_9$, the voltage signal 362 increases as shown by a rising edge in the waveform 508, and such a rising edge, even if detected, is not used for determining the switching frequency of the power conversion system 300 (e.g., the load conditions). In yet another example, the secondary current 352 is equal to a sum of the channel current 368 and the body-diode current 370. Thus, a combination of part of the waveform 512 (e.g., between $t_5$ and $t_9$) and part of the waveform 514 (e.g., between $t_5$ and $t_9$) is equal to part of the waveform 504 (e.g., between $t_5$ and $t_9$) in certain embodiments.

According to yet another embodiment of the present invention, FIG. 5 is a simplified timing diagram for the power conversion system 400 shown in FIG. 4(B) operating in the discontinuous conduction mode (DCM). For example, the waveform 502 represents the power switch 430 being turned on or off as a function of time, the waveform 504 represents the secondary current 452 as a function of time, and the waveform 506 represents the feedback signal 460 as a function of time. In addition, the waveform 508 represents the voltage signal 462 (e.g., at terminal DR) as a function of time, the waveform 510 represents the signal 466 (e.g., at terminal G2) as a function of time, the waveform 512 represents a channel current 468 that flows through the transistor 410 as a function of time, and the waveform 514 represents a body-diode current 480 that flows through a body diode of the transistor 410 (e.g., a parasitic diode) as a function of time.

As discussed above and further emphasized here, FIG. 5 is merely an example, which should not unduly limit the scope of the claims. One of ordinary skill in the art would recognize many variations, alternatives, and modifications. For example, the power conversion system 300 shown in FIG. 4(A) or the power conversion system 400 shown in FIG. 4(B) operating in other modes, such as a continuous conduction mode and the critical conduction mode (e.g., the quasi-resonant mode), can also implement the scheme as illustrated in FIG. 5.

In certain embodiments, the scheme as illustrated in FIG. 5 is implemented in the continuous conduction mode. For example, if the secondary controller 308 detects a falling edge of the signal 362 (e.g., $V_{DR}$), the secondary controller 308 changes the signal 366 to turn on the transistor 310. In another example, the controller 302 turns on the transistor 330 before the demagnetization period ends (e.g., the secondary current 352 being larger than zero), and in response the signal 362 (e.g., $V_{DR}$) increases. In yet another example, the secondary controller 308 detects a rising edge of the signal 362 and changes the signal 366 to turn off the transistor 310.

Figure 6:
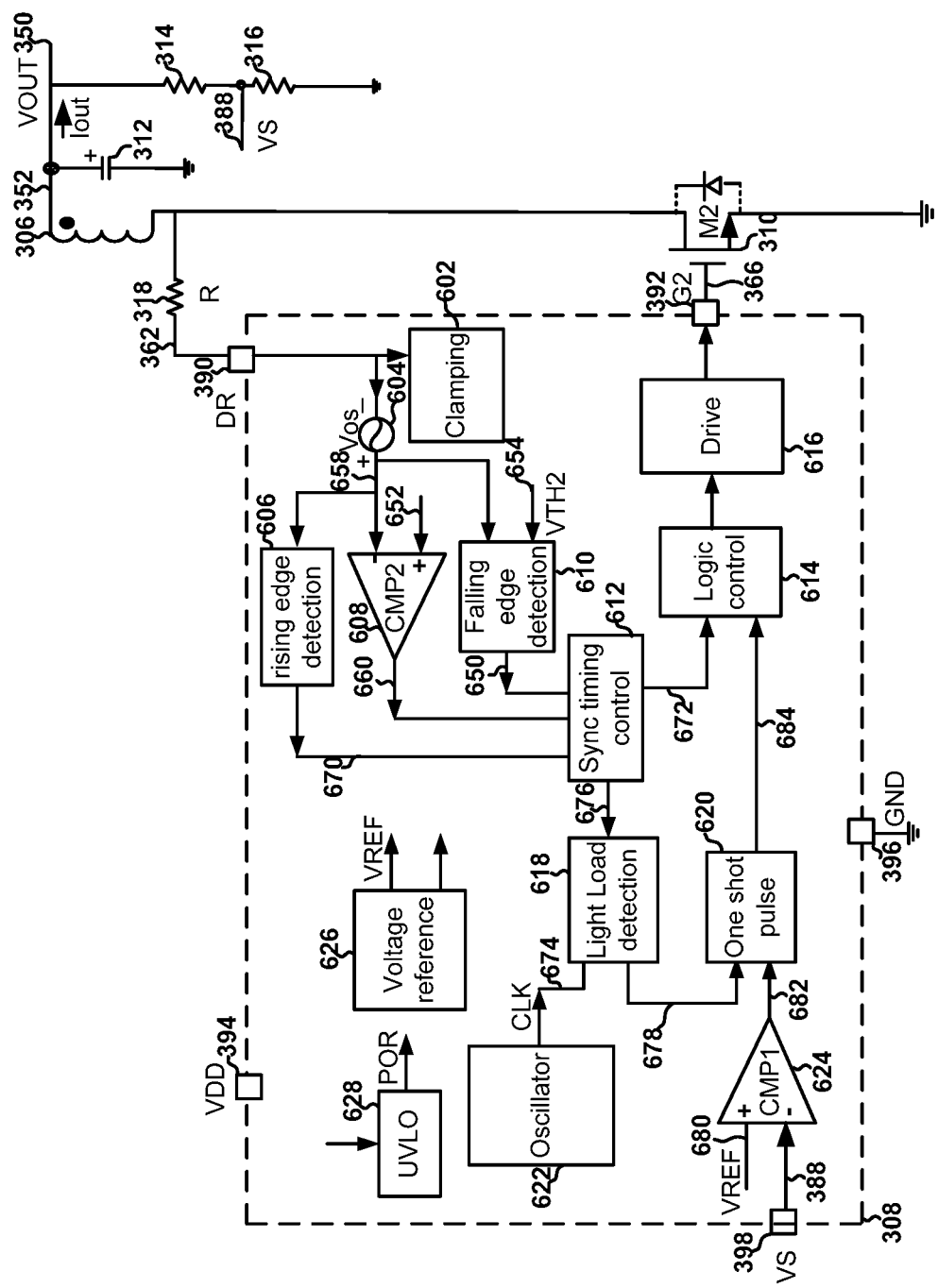
FIG. 6 is a simplified diagram showing certain components of the secondary controller as part of the power conversion system as shown in FIG. 4(A) according to an embodiment of the present invention.

FIG. 6 is a simplified diagram showing certain components of the secondary controller 308 as part of the power conversion system 300 according to an embodiment of the present invention. This diagram is merely an example, which should not unduly limit the scope of the claims. One of ordinary skill in the art would recognize many variations, alternatives, and modifications. The secondary controller 308 includes a clamping component 602, an offset component 604, a rising-edge detection component 606, comparators 608 and 624, a falling-edge detection component 610, a timing controller 612, a logic control component 614, a gate driver 616, a light-load detector 618, a signal generator 620, an oscillator 622, an under-voltage-lockout component 628, and a reference-signal generator 626. For example, some components of the secondary controller 308 are used for synchronized rectifying, including the clamping component 602, the offset component 604, the rising-edge detection component 606, the comparator 608, the falling-edge detection component 610, the timing controller 612, the logic control component 614, and the gate driver 616. In another example, certain components of the secondary controller 308 are used for output voltage detection and control, including the light-load detector 618, the signal generator 620, the oscillator 622, the reference-signal generator 626, the logic control component 614, and the gate driver 616. In yet another example, the components of the secondary controller 308 that are used for synchronized rectifying and the components of the secondary controller 308 that are used for output voltage detection and control are integrated on a same chip.

Figure 7:
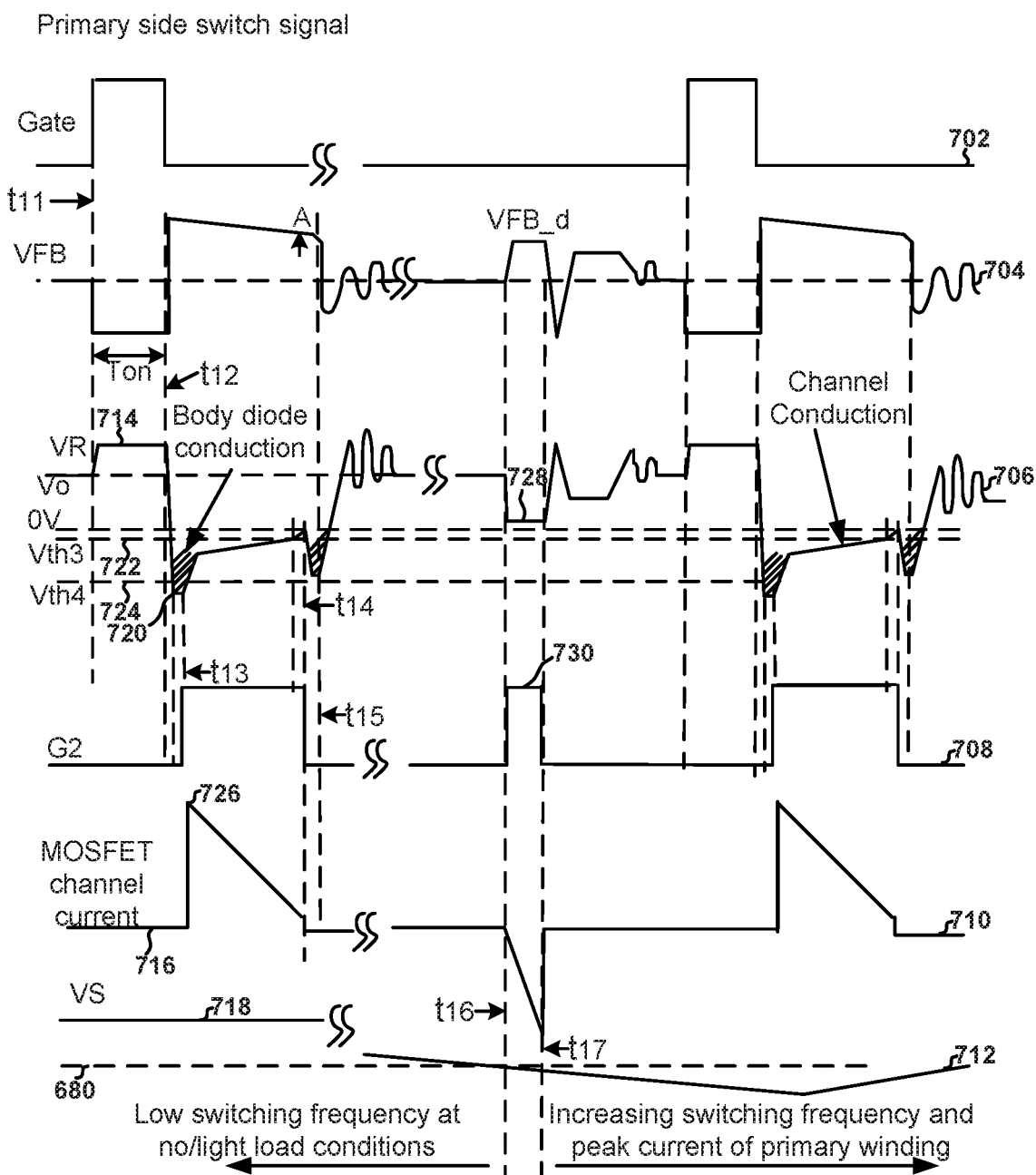
FIG. 7 is a simplified timing diagram for the power conversion system as shown in FIG. 4(A) that includes the secondary controller as shown in FIG. 6 and operates in the discontinuous conduction mode (DCM) according to an embodiment of the present invention.

FIG. 7 is a simplified timing diagram for the power conversion system 300 that includes the secondary controller 308 as shown in FIG. 6 and operates in the discontinuous conduction mode (DCM) according to an embodiment of the present invention. This diagram is merely an example, which should not unduly limit the scope of the claims. One of ordinary skill in the art would recognize many variations, alternatives, and modifications. For example, the waveform 702 represents the power switch 330 being turned on or off as a function of time, the waveform 704 represents the feedback signal 360 as a function of time, and the waveform 706 represents the voltage signal 362 (e.g., at terminal 390) as a function of time. In addition, the waveform 708 represents the signal 366 (e.g., at terminal 392) as a function of time, the waveform 710 represents a channel current 368 that flows through the transistor 310 as a function of time, and the waveform 712 represents a voltage signal 388 (e.g., at terminal 398) that indicates the output voltage 350 as a function of time.

According to one embodiment, the clamping component 602 receives the voltage signal 362 (e.g., $V_{DR}$) from the terminal 390 (e.g., terminal DR). For example, the rising-edge detection component 606, the comparator 608 and the falling edge detection component 610 receive a signal 658 which is equal to the voltage signal 362 modified by the offset component 604. In another example, the rising-edge detection component 606, the comparator 608 and the falling-edge detection component 610 output signals 670, 660 and 650 respectively based on at least information associated with the signal 658. In yet another example, the timing controller 612 receives the signals 670, 660 and 650 and outputs a signal 672 to the logic controller 614 in order to drive the transistor 310. The offset component 604 is omitted in some embodiments.

According to another embodiment, before time $t_{16}$, the power conversion system 300 is under no/light load conditions and the switching frequency of the system 300 is kept low (e.g., lower than a threshold). For example, during an on-time period (e.g., between time $t_{11}$ and time $t_{12}$), the switch 330 is closed (e.g., being turned on) as shown by the waveform 702, and the energy is stored in the transformer that includes the primary winding 304 and the secondary winding 306. In another example, the voltage signal 362 (e.g., at terminal DR) has a value 714 (e.g., as shown by the waveform 706), and is clamped by the clamping component 602. In yet another example, the signal 366 (e.g., at terminal G2) is at a logic low level (e.g., as shown by the waveform 708), and the transistor 310 is off. In yet another example, during the on-time period (e.g., $T_{on}$), the channel current 368 has a low value 716 (e.g., nearly zero as shown by the waveform 710). In yet another example, the voltage signal 388 (e.g., $V_s$) has a value 718 (e.g., as shown by the waveform 712).

According to yet another embodiment, at the end of the on-time period (e.g., at $t_{12}$), the switch 330 is open (e.g., off) as shown by the waveform 702, and the energy is transferred to the secondary side. For example, the voltage signal 362 decreases from the value 714 to a value 720 (e.g., as shown by the waveform 706). In yet another example, the value 720 is lower than both a third threshold voltage 722 (e.g., $V_{th3}$) and a fourth threshold voltage 724 (e.g., $V_{th4}$). In yet another example, both the third threshold voltage 722 (e.g., $V_{th3}$) and the fourth threshold voltage 724 (e.g., $V_{th4}$) are lower than a ground voltage 372. In yet another example, the body diode of the transistor 310 begins to conduct, and the body-diode current 370 increases in magnitude. Thereafter, the signal 366 changes from the logic low level to a logic high level (e.g., at $t_{13}$ as shown by the waveform 708), and the transistor 310 is turned on in certain embodiments. For example, the third threshold voltage 722 (e.g., $V_{th3}$) and the fourth threshold voltage 724 (e.g., $V_{th4}$) are the same as the first threshold voltage 528 and the second threshold voltage 530, respectively.

According to yet another embodiment, when the voltage signal 362 decreases from the value 714 to the value 720 (e.g., as shown by the waveform 706), the falling-edge detection component 610 detects the drop of the voltage signal 362 and changes the signal 650 in order to turn on the transistor 310. For example, in response, the channel current 368 increases from the value 716 to a value 726 (e.g., at $t_{13}$ as shown by the waveform 710). In another example, a voltage drop between the drain terminal and the source terminal of the transistor 310 is determined based on the following equation:

$$V_{DS\_M2} = -I_{sec} \times R_{ds\_on} \quad \text{(Equation 1)}$$

where $V_{DS\_M2}$ represents the voltage drop between the drain terminal and the source terminal of the transistor 310, $I_{sec}$ represents the secondary current 352, and $R_{ds\_on}$ represents a turn-on resistance of the transistor 310.

Because the turn-on resistance of the transistor 310 is very small, the magnitude of the voltage drop between the drain terminal and the source terminal of the transistor 310 is much smaller than a forward voltage of a rectifying diode (e.g., the diode 124 or the diode 260), according to certain embodiments. For example, when the secondary current 352 becomes very small (e.g., approximately zero), the voltage drop between the drain terminal and the source terminal of the transistor 310 becomes very small in magnitude, and the voltage signal 362 is very small in magnitude. In another example, if the signal 658 is larger than the reference signal 652 in magnitude, the comparator 608 changes the signal 660 in order to turn off the transistor 310. In yet another example, the signal 366 changes from the logic high level to the logic low level (e.g., at $t_{14}$ as shown by the waveform 708) and the transistor 310 is turned off. In yet another example, the body diode of the transistor 310 begins to conduct again, and the body-diode current 370 decreases in magnitude (e.g., eventually to nearly zero at $t_{15}$). Thus, the energy is completely delivered to the output in some embodiments.

In one embodiment, the secondary controller 308 continuously monitors the output voltage 350 through the signal 388 (e.g., $V_s$). For example, the comparator 624 receives a reference signal 680 and the signal 388 (e.g., $V_s$) and outputs a signal 682. In another example, the light-load detector 618 receives a clock signal from the oscillator 622 and a signal 676 from the timing controller 612. In yet another example, the signal 676 indicates certain switching events (e.g., rising edges or falling edges) in the signal 362. In yet another example, the light-load detector 618 outputs a signal 678 which indicates the switching frequency of the power conversion system 300. In yet another example, the signal generator 620 receives the signal 678 and the signal 682 and outputs a signal 684 to the logic control component 614 in order to affect the status of the transistor 310.

In another embodiment, if the output voltage 350 drops below a threshold level in any conditions, for example, when the output load conditions changes from no/light load conditions to full load conditions (e.g., between $t_{16}$ and $t_{17}$), the output voltage 350 decreases (e.g., below a threshold level). For example, if the signal 388 (e.g., $V_s$) changes from a first value larger than the reference signal 680 in magnitude to a second value lower than the reference signal 680 in magnitude (e.g., at $t_{16}$ as shown by the waveform 712), the comparator 624 generates a pulse in the signal 682 in order to turn on the transistor 310 during a short time period. In some embodiments, if the signal 678 indicates that the power conversion system 300 is under no/light load conditions, the signal generator 620 outputs a pulse in the signal 684, and in response the gate driver 616 generates a pulse 730 in the signal 366 (e.g., as shown by the waveform 708). For example, the signal 362 (e.g., at terminal DR) decreases to a value 728 (e.g., between $t_{16}$ and $t_{17}$ as shown by the waveform 706). In yet another example, the transistor 310 is turned on during a pulse period associated with the pulse 730 in the signal 366, and the channel current 368 flows in a different direction (e.g., from the output capacitor 312 through the transistor 310 to ground) as shown by the waveform 710. In yet another example, the feedback signal 360 increases in magnitude, and forms a pulse (e.g., between $t_{16}$ and $t_{17}$ as shown by the waveform 704). The controller 302 detects the pulse of the feedback signal 360 and, in response, increases the peak current of the primary winding 304 and the switching frequency in order to deliver more energy to the secondary side according to certain embodiments. For example, the output voltage 350 and the voltage signal 388 increase in magnitude eventually (e.g., at $t_{18}$ as shown by the waveform 712).

As discussed above and further emphasized here, FIG. 6 and FIG. 7 are merely examples, which should not unduly limit the scope of the claims. One of ordinary skill in the art would recognize many variations, alternatives, and modifications. For example, the secondary controller 408 is the same as the secondary controller 308 as shown in FIG. 6.

In certain embodiments, FIG. 7 is a simplified timing diagram for the power conversion system 400 that includes the secondary controller 408 and operates in the discontinuous conduction mode (DCM). For example, the waveform 702 represents the power switch 430 being turned on or off as a function of time, the waveform 704 represents the feedback signal 460 as a function of time, and the waveform 706 represents the voltage signal 462 as a function of time. In addition, the waveform 708 represents the signal 466 as a function of time, the waveform 710 represents a channel current 468 that flows through the transistor 410 as a function of time, and the waveform 712 represents a voltage signal 488 that indicates the output voltage 450 as a function of time.

In some embodiments, the secondary controller 308 as part of the power conversion system 300 or the secondary controller 408 as part of the power conversion system 400 operating in other modes, such as a continuous conduction mode and the critical conduction mode (e.g., the quasi-resonant mode), can also implement the scheme as illustrated in FIG. 6 and FIG. 7.

According to another embodiment, a system controller for regulating a power conversion system includes a first controller terminal and a second controller terminal. The system controller is configured to receive at least an input signal at the first controller terminal, and generate a gate drive signal at the second controller terminal based on at least information associated with the input signal to turn on or off a transistor in order to affect a current associated with a secondary winding of the power conversion system. The system controller is further configured to, if the input signal is larger than a first threshold, generate the gate drive signal at a first logic level to turn off the transistor, and if the input signal changes from a first value larger than a second threshold to a second value smaller than the second threshold, change the gate drive signal from the first logic level to a second logic level to turn on the transistor. For example, the system is implemented according to FIG. 4(A), FIG. 4(B), FIG. 5, FIG. 6, and/or FIG. 7.

According to another embodiment, a system controller for regulating a power conversion system includes a first controller terminal and a second controller terminal. The system controller is configured to receive at least an input signal at the first controller terminal, the input signal being proportional to an output voltage associated with a secondary winding of the power conversion system, and generate a gate drive signal at the second controller terminal based on at least information associated with the input signal to turn on or off a transistor in order to affect a current associated with the secondary winding of the power conversion system. The system controller is further configured to, only if the input signal changes from a first value larger than a first threshold to a second value smaller than the first threshold, generate a pulse of the gate drive signal to turn on the transistor during a pulse period associated with the pulse. For example, the system is implemented according to at least FIG. 4(A), FIG. 4(B), FIG. 6, and/or FIG. 7.

According to yet another embodiment, a system controller for regulating a power conversion system includes a first comparator, a signal detector, and a driving component. The first comparator is configured to receive an input signal and output a first comparison signal based on at least information associated with the input signal. The signal detector is configured to receive the input signal and output a first detection signal based on at least information associated with the input signal. The driving component is configured to output a gate drive signal based on at least information associated with the first comparison signal and the first detection signal to turn on or off a transistor in order to affect a current associated with a secondary winding of the power conversion system. The comparator is further configured to determine whether the input signal is larger than a first threshold. The signal detector is further configured to determine whether the input signal changes from a first value larger than a second threshold to a second value smaller than the second threshold. The driving component is further configured to, if the first comparison signal indicates the input signal is larger than the first threshold, generate the gate drive signal at a first logic level to turn off the transistor, and if the first detection signal indicates the input signal changes from the first value larger than the second threshold to the second value smaller than the second threshold, change the gate drive signal from the first logic level to a second logic level to turn on the transistor. For example, the system is implemented according to FIG. 4(A), FIG. 4(B), FIG. 5, FIG. 6, and/or FIG. 7.

In one embodiment, a system controller for regulating a power conversion system includes a comparator, a pulse signal generator, and a driving component. A comparator is configured to receive an input signal and output a comparison signal based on at least information associated with the input signal. The pulse signal generator is configured to receive at least the comparison signal and generate a pulse signal based on at least information associated with the comparison signal. The driving component is configured to receive the pulse signal and generate a gate drive signal based on at least information associated with the pulse signal to turn on or off a transistor in order to affect a current associated with the secondary winding of the power conversion system. The comparator is further configured to determine whether the input signal is larger than or smaller than a threshold. The pulse signal generator is further configured to, only if the comparison signal indicates the input signal changes from a first value larger than the threshold to a second value smaller than the threshold, generate a first pulse of the pulse signal. The driving component is further configured to, in response to the first pulse of the pulse signal, generate a second pulse of the gate drive signal to turn on the transistor during a pulse period associated with the second pulse. For example, the system is implemented according to at least FIG. 4(A), FIG. 4(B), FIG. 6, and/or FIG. 7.

In another embodiment, a method for regulating a power conversion system includes receiving at least an input signal, processing information associated with the input signal, and generating a gate drive signal based on at least information associated with the input signal to turn on or off a transistor in order to affect a current associated with a secondary winding of the power conversion system. The process for generating a gate drive signal based on at least information associated with the input signal to turn on or off a transistor in order to affect a current associated with a secondary winding of the power conversion system includes, if the input signal is larger than a first threshold, generating the gate drive signal at a first logic level to turn off the transistor, and if the input signal changes from a first value larger than a second threshold to a second value smaller than the second threshold, changing the gate drive signal from the first logic level to a second logic level to turn on the transistor. For example, the method is implemented according to FIG. 4(A), FIG. 4(B), FIG. 5, FIG. 6, and/or FIG. 7.

In yet another embodiment, a method for regulating a power conversion system includes receiving at least an input signal, the input signal being proportional to an output voltage associated with a secondary winding of the power conversion system, processing information associated with the input signal, and generating a gate drive signal based on at least information associated with the input signal to turn on or off a transistor in order to affect a current associated with the secondary winding of the power conversion system. The process for generating a gate drive signal based on at least information associated with the input signal to turn on or off a transistor in order to affect a current associated with the secondary winding of the power conversion system includes, only if the input signal changes from a first value larger than a first threshold to a second value smaller than the first threshold, generating a pulse of the gate drive signal to turn on the transistor during a pulse period associated with the pulse. For example, the method is implemented according to at least FIG. 4(A), FIG. 4(B), FIG. 6, and/or FIG. 7.

In yet another embodiment, a method for regulating a power conversion system includes receiving an input signal, processing information associated with the input signal, and determining whether the input signal is larger than a first threshold. The method further includes generating a comparison signal based on at least information associated with the input signal, determining whether the input signal changes from a first value larger than a second threshold to a second value smaller than the second threshold, and generating a detection signal based on at least information associated with the input signal. In addition, the method includes outputting a gate drive signal based on at least information associated with the comparison signal and the detection signal to turn on or off a transistor in order to affect a current associated with a secondary winding of the power conversion system. The process for outputting a gate drive signal based on at least information associated with the comparison signal and the detection signal to turn on or off a transistor in order to affect a current associated with a secondary winding of the power conversion system includes, if the comparison signal indicates the input signal is larger than the first threshold, generating the gate drive signal at a first logic level to turn off the transistor, and if the detection signal indicates the input signal changes from the first value larger than the second threshold to the second value smaller than the second threshold, changing the gate drive signal from the first logic level to a second logic level to turn on the transistor. For example, the method is implemented according to FIG. 4(A), FIG. 4(B), FIG. 5, FIG. 6, and/or FIG. 7.

In yet another embodiment, a method for regulating a power conversion system includes receiving an input signal, processing information associated with the input signal, and determining whether the input signal is larger than or smaller than a threshold. The method further includes generating a comparison signal based on at least information associated with the first input signal, receiving the comparison signal, and processing information associated with the comparison signal. In addition, the method includes generating a pulse signal based on at least information associated with the comparison signal, receiving the pulse signal, processing information associated with the pulse signal, and generating a gate drive signal based on at least information associated with the pulse signal to turn on or off a transistor in order to affect a current associated with the secondary winding of the power conversion system. The process for generating a pulse signal based on at least information associated with the comparison signal includes, only if the comparison signal indicates the input signal changes from a first value larger than the threshold to a second value smaller than the threshold, generating a first pulse of the pulse signal. The process for generating a gate drive signal based on at least information associated with the pulse signal to turn on or off a transistor in order to affect a current associated with the secondary winding of the power conversion system includes, in response to the first pulse of the pulse signal, generate a second pulse of the gate drive signal to turn on the transistor during a pulse period associated with the second pulse. For example, the method is implemented according to at least FIG. 4(A), FIG. 4(B), FIG. 6, and/or FIG. 7.

Figure 8:
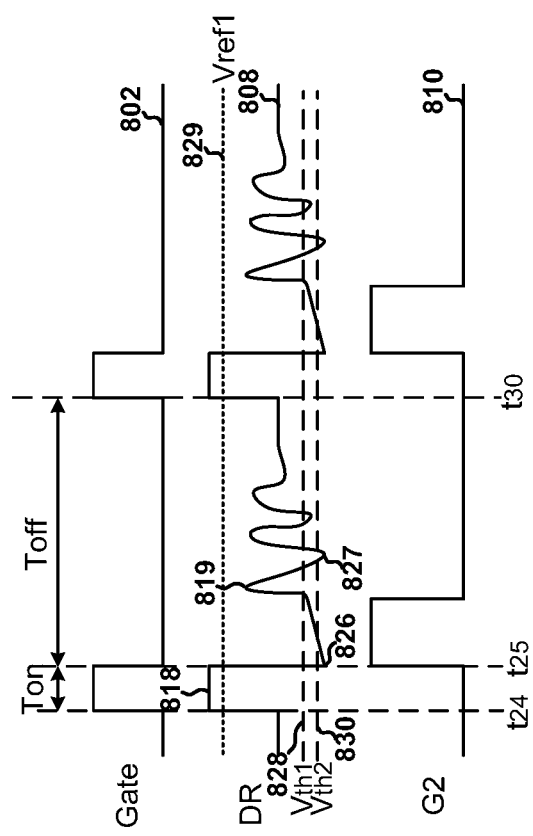
FIG. 8 is a simplified timing diagram for the power conversion system 300 as shown in FIG. 4(A) operating in the discontinuous conduction mode (DCM) according to another embodiment of the present invention.

FIG. 8 is a simplified timing diagram for the power conversion system 300 as shown in FIG. 4(A) operating in the discontinuous conduction mode (DCM) according to another embodiment of the present invention. This diagram is merely an example, which should not unduly limit the scope of the claims. One of ordinary skill in the art would recognize many variations, alternatives, and modifications. For example, the waveform 802 represents the power switch 330 being turned on or off as a function of time, the waveform 808 represents the voltage signal 362 (e.g., $V_{DR}$ at terminal DR) as a function of time, and the waveform 810 represents the signal 366 (e.g., at terminal G2) as a function of time.

As shown in FIG. 8, the secondary controller 308 receives the voltage signal 362 (e.g., $V_{DR}$) at the terminal 390, and determines whether the voltage signal 362 exceeds a first reference voltage 829 (e.g., $V_{ref1}$) according to some embodiments. For example, the first reference voltage 829 (e.g., $V_{ref1}$) is higher than a first threshold voltage 828 (e.g., $V_{th1}$), and the first threshold voltage 828 (e.g., $V_{th1}$) is higher than a second threshold voltage 830 (e.g., $V_{th2}$). In another example, the first reference voltage 829 (e.g., $V_{ref1}$) is higher than the ground voltage 372 (e.g., zero volt), and both the first threshold voltage 828 (e.g., $V_{th1}$) and the second threshold voltage 830 (e.g., $V_{th2}$) are lower than the ground voltage 372 (e.g., zero volt). In yet another example, the first reference voltage 829 (e.g., $V_{ref1}$) is equal to about 15 V.

In one embodiment, if the voltage signal 362 has been determined by the secondary controller 308 to exceed the first reference voltage 829, the secondary controller 308, in response to the voltage signal 362 (e.g., $V_{DR}$) decreasing from a value higher than the first reference voltage 829 to a value lower than both the first threshold voltage 828 (e.g., $V_{th1}$) and the second threshold voltage 830 (e.g., $V_{th2}$), changes the signal 366 from a logic low level to a logic high level in order to turn on the transistor 310. In another embodiment, if the voltage signal 362 has not been determined by the secondary controller 308 to exceed the first reference voltage 829, the secondary controller 308 does not change the signal 366 from the logic low level to the logic high level even if the voltage signal 362 (e.g., $V_{DR}$) decreasing to a value that is lower than both the first threshold voltage 828 (e.g., $V_{th1}$) and the second threshold voltage 830 (e.g., $V_{th2}$), so that the transistor 310 remains off.

For example, a switching period of the switch 330 includes an on-time period during which the switch 330 is closed (e.g., on) and an off-time period during which the switch 330 is open (e.g., off). In another example, as shown in FIG. 8, an on-time period of the switch 330 (e.g., $T_{on}$) starts at time $t_{24}$ and ends at time $t_{25}$, and an off-time period of the switch 330 (e.g., $T_{off}$) starts at the time $t_{25}$ and ends at time $t_{30}$. In yet another example, a demagnetization period (e.g., $T_{demag}$) associated with the transformer including the primary winding 304 and the secondary winding 306 starts at the time $t_{25}$ and ends before or at the time $t_{30}$. In yet another example, $t_{24} \leq t_{25} \leq t_{30}$.

In one embodiment, during the on-time period (e.g., $T_{on}$), the switch 330 is closed (e.g., being turned on) as shown by the waveform 802, and the energy is stored in the transformer that includes the primary winding 304 and the secondary winding 306. For example, the secondary current 352 has a low value (e.g., nearly zero). In another example, the voltage signal 362 (e.g., $V_{DR}$) received by the secondary controller 308 has a value 818 which is higher than zero (e.g., as shown by the waveform 808). In yet another example, the signal 366 is at the logic low level (e.g., as shown by the waveform 810), and the transistor 310 is off. In yet another example, during the on-time period (e.g., $T_{on}$), the channel current 368 of the transistor 310 has a low value (e.g., nearly zero) and the body-diode current 370 of the transistor 310 has a low value (e.g., nearly zero).

In another embodiment, at the end of the on-time period (e.g., at the time $t_{25}$), the switch 330 is open (e.g., being turned off) as shown by the waveform 802, and the energy is transferred to the secondary side. For example, the secondary current 352 increases (e.g., at the time $t_{25}$). In another example, the voltage signal 362 (e.g., $V_{DR}$) decreases from the value 818 to a value 826 (e.g., as shown by the waveform 808). In yet another example, the value 826 is lower than both the first threshold voltage 828 (e.g., $V_{th1}$) and the second threshold voltage 830 (e.g., $V_{th2}$). In yet another example, both the first threshold voltage 828 (e.g., $V_{th1}$) and the second threshold voltage 830 (e.g., $V_{th2}$) are lower than the ground voltage 372 (e.g., zero volt). In yet another example, the first threshold voltage 828 (e.g., $V_{th1}$) is equal to about −300 mV, and the second threshold voltage 830 (e.g., $V_{th2}$) is equal to about −10 mV. In yet another example, the body diode 374 of the transistor 310 begins to conduct, and the body-diode current 370 of the body diode 374 increases.

According to certain embodiments, the secondary controller 308 receives the voltage signal 362 (e.g., $V_{DR}$) at the terminal 390, and determines whether the voltage signal 362 exceeds the first reference voltage 829 (e.g., $V_{ref1}$). In one embodiment, the first reference voltage 829 (e.g., $V_{ref1}$) is higher than the first threshold voltage 828 (e.g., $V_{th1}$), and the first threshold voltage 828 (e.g., $V_{th1}$) is higher than the second threshold voltage 830 (e.g., $V_{th2}$). For example, the first reference voltage 829 (e.g., $V_{ref1}$) is equal to about 15 V. In another embodiment, if the voltage signal 362 (e.g., the value 818) has been determined to exceed the first reference voltage 829 (e.g., between the time $t_{24}$ and the time $t_{25}$ as shown by the waveform 808), the secondary controller 308, in response to the voltage signal 362 (e.g., $V_{DR}$) decreasing from a value (e.g., the value 818) higher than the first reference voltage 829 to a value (e.g., the value 826) lower than both the first threshold voltage 828 (e.g., $V_{th1}$) and the second threshold voltage 830 (e.g., $V_{th2}$), changes the signal 366 from the logic low level to the logic high level (e.g., at the time $t_{25}$ as shown by the waveform 810, or at a time after the time $t_{25}$) in order to turn on the transistor 310. In yet another embodiment, if the voltage signal 362 (e.g., the value 818) has been determined to exceed the first reference voltage 829 (e.g., between the time $t_{24}$ and the time $t_{25}$ as shown by the waveform 808), the secondary controller 308, in response to the voltage signal 362 (e.g., $V_{DR}$) decreasing from a value (e.g., the value 818) higher than the first reference voltage 829 to a value (e.g., the value 826) lower than the second threshold voltage 830 (e.g., $V_{th2}$), changes the signal 366 from the logic low level to the logic high level (e.g., at the time $t_{25}$ as shown by the waveform 810, or at a time after the time $t_{25}$) in order to turn on the transistor 310.

For example, there is a delay (e.g., $T_d$) between the time at which the voltage signal 362 (e.g., $V_{DR}$) decreases from the value 818 to the value 826 and the time at which the signal 366 changes from the logic low level to the logic high level. In another example, the delay (e.g., $T_d$) is zero. In yet another example, after the transistor 310 is turned on, the channel current 368 of the transistor 310 increases. In yet another example, the secondary current 352 is equal to a sum of the channel current 368 and the body-diode current 370.

In yet another embodiment, if the voltage signal 362 has not been determined to exceed the first reference voltage 829, the secondary controller 308 keeps the signal 366 at the logic low level in order to keep the transistor 310 to be turned off, regardless of whether the voltage signal 362 (e.g., $V_{DR}$) decreases to a value lower than both the first threshold voltage 828 (e.g., $V_{th1}$) and the second threshold voltage 830 (e.g., $V_{th2}$). In yet another embodiment, if the voltage signal 362 has not been determined to exceed the first reference voltage 829, the secondary controller 308 keeps the signal 366 at the logic low level in order to keep the transistor 310 to be turned off, regardless of whether the voltage signal 362 (e.g., $V_{DR}$) decreases to a value lower than the second threshold voltage 830 (e.g., $V_{th2}$).

According to one embodiment, during the demagnetization period, the switch 330 remains open (e.g., off) as shown by the waveform 802. For example, the secondary current 352 decreases. In another example, if the voltage signal 362 (e.g., $V_{DR}$) becomes larger than the first threshold voltage 828 (e.g., as shown by the waveform 808), the signal 366 changes from the logic high level to the logic low level (e.g., as shown by the waveform 810). In yet another example, the transistor 310 is turned off, and the channel current 368 of the transistor 310 decreases to a low value (e.g., nearly zero). In yet another example, the body-diode current 370 of the transistor 310 flows through the body diode 374 of the transistor 310, and then decreases to a low value. In yet another example, the demagnetization period ends before the time $t_{30}$. In yet another example, immediately after the end of the demagnetization period, the voltage signal 362 increases to a value 819 as shown by a rising edge in the waveform 808.

According to some embodiments, the secondary controller 308 receives the voltage signal 362 (e.g., $V_{DR}$) at the terminal 390, and determines whether the voltage signal 362 exceeds a first reference voltage 829 (e.g., $V_{ref1}$). In one embodiment, the first reference voltage 829 (e.g., $V_{ref1}$) is higher than the first threshold voltage 828 (e.g., $V_{th1}$), and the first threshold voltage 828 (e.g., $V_{th1}$) is higher than the second threshold voltage 830 (e.g., $V_{th2}$). For example, the first reference voltage 829 (e.g., $V_{ref1}$) is equal to about 15 V. In another embodiment, if the voltage signal 362 (e.g., the value 819) has not been determined to exceed the first reference voltage 829 (e.g., after the time $t_{25}$ but before the time $t_{30}$ as shown by the waveform 808), the secondary controller 308 does not change the signal 366 from the logic low level to the logic high level even if the voltage signal 362 (e.g., $V_{DR}$) decreasing to a value (e.g., the value 827) that is lower than both the first threshold voltage 828 (e.g., $V_{th1}$) and the second threshold voltage 830 (e.g., $V_{th2}$), so that the transistor 310 remains off.

According to yet another embodiment of the present invention, FIG. 8 is a simplified timing diagram for the power conversion system 400 as shown in FIG. 4(B) operating in the discontinuous conduction mode (DCM). For example, the waveform 802 represents the power switch 430 being turned on or off as a function of time, the waveform 808 represents the voltage signal 462 (e.g., at terminal DR) as a function of time, and the waveform 810 represents the signal 466 (e.g., at terminal G2) as a function of time.

As discussed earlier, in one embodiment, if the voltage signal 362 (e.g., $V_{DR}$) becomes larger than the first threshold voltage 828 (e.g., as shown by the waveform 808), the signal 366 changes from the logic high level to the logic low level (e.g., as shown by the waveform 810) in order to turn off the transistor 310. For example, such hard turn-off of the transistor 310 often generates ringing at the drain of the transistor 310 because the left-over energy in the transformer that includes the primary winding 304 and the secondary winding 306 goes out through the parasitic body diode 374 of the transistor 310 and resonant with the parasitic capacitor of the transistor 310 and the inductance of the transformer. In another example, these resonant rings (e.g., rings as shown by the waveform 808 before the time $t_{30}$) can reach a value (e.g., the value 827) that is lower than both the first threshold voltage 828 (e.g., $V_{th1}$) and the second threshold voltage 830 (e.g., $V_{th2}$).

Also as discussed earlier, in another embodiment, the secondary controller 308 determines whether the voltage signal 362 (e.g., $V_{DR}$) exceeds the first reference voltage 829 (e.g., $V_{ref1}$), and based on the result of this determination, further decides whether to turn off the transistor 310 in response to the voltage signal 362 (e.g., $V_{DR}$) decreasing to a value that is lower than both the first threshold voltage 828 (e.g., $V_{th1}$) and the second threshold voltage 830 (e.g., $V_{th2}$). For example, if the AC input voltage on the primary side has a large amplitude, the value 818 of the voltage signal 362 is higher than the value 819 of the voltage signal 362 as shown by the waveform 808; therefore, the first reference voltage 829 (e.g., $V_{ref1}$) can be selected to be smaller than the value 818 but larger than the value 819, in order to avoid mis-triggering the secondary controller 308 by the resonant rings (e.g., rings as shown by the waveform 808 before the time $t_{30}$). In another example, such mis-triggering may result in non-synchronization of the secondary-side rectifier and instability of the output voltage 350.

As discussed above and further emphasized here, FIG. 8 is merely an example, which should not unduly limit the scope of the claims. One of ordinary skill in the art would recognize many variations, alternatives, and modifications. For example, the power conversion system 300 as shown in FIG. 4(A) or the power conversion system 400 as shown in FIG. 4(B) operating in other modes, such as a continuous conduction mode and the critical conduction mode (e.g., the quasi-resonant mode), can also implement the scheme as illustrated in FIG. 8.

According to certain embodiments, the scheme as illustrated in FIG. 8 is implemented in the continuous conduction mode. In one embodiment, if the voltage signal 362 has been determined by the secondary controller 308 to exceed the first reference voltage 829, the secondary controller 308, in response to the voltage signal 362 (e.g., $V_{DR}$) decreasing from a value higher than the first reference voltage 829 to a value lower than both the first threshold voltage 828 (e.g., $V_{th1}$) and the second threshold voltage 830 (e.g., $V_{th2}$), changes the signal 366 from the logic low level to the logic high level in order to turn on the transistor 310. In another embodiment, if the voltage signal 362 has not been determined by the secondary controller 308 to exceed the first reference voltage 829, the secondary controller 308 does not change the signal 366 from the logic low level to the logic high level even if the voltage signal 362 (e.g., $V_{DR}$) decreasing to a value that is lower than both the first threshold voltage 828 (e.g., $V_{th1}$) and the second threshold voltage 830 (e.g., $V_{th2}$), so that the transistor 310 remains off. In yet another embodiment, the controller 302 turns on the transistor 330 before the demagnetization period ends (e.g., the controller 302 turns on the transistor 330 before the secondary current 352 drops to zero), and in response, the signal 362 (e.g., $V_{DR}$) increases. In yet another example, the secondary controller 308 detects a rising edge of the signal 362 and changes the signal 366 to turn off the transistor 310.

Figure 9:
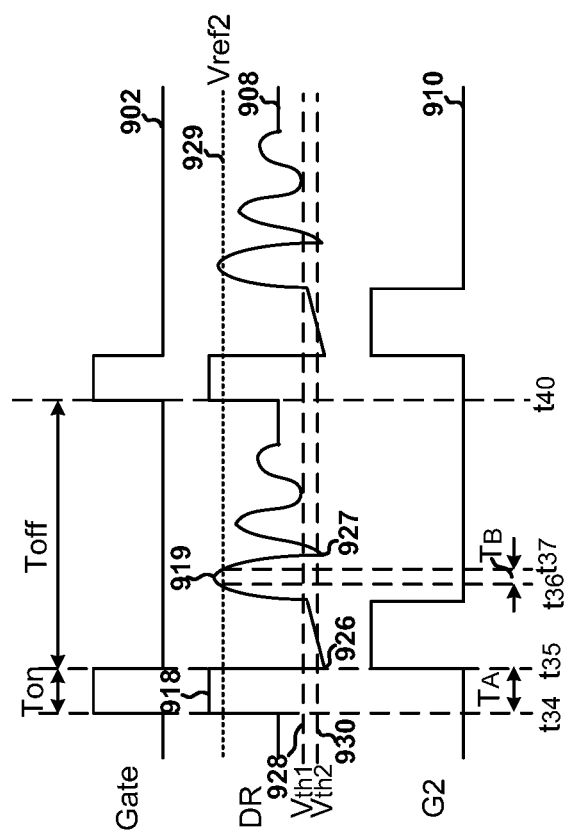
FIG. 9 is a simplified timing diagram for the power conversion system 300 as shown in FIG. 4(A) operating in the discontinuous conduction mode (DCM) according to yet another embodiment of the present invention.

FIG. 9 is a simplified timing diagram for the power conversion system 300 as shown in FIG. 4(A) operating in the discontinuous conduction mode (DCM) according to yet another embodiment of the present invention. This diagram is merely an example, which should not unduly limit the scope of the claims. One of ordinary skill in the art would recognize many variations, alternatives, and modifications. For example, the waveform 902 represents the power switch 330 being turned on or off as a function of time, the waveform 908 represents the voltage signal 362 (e.g., $V_{DR}$ at terminal DR) as a function of time, and the waveform 910 represents the signal 366 (e.g., at terminal G2) as a function of time.

As shown in FIG. 9, the secondary controller 308 receives the voltage signal 362 (e.g., $V_{DR}$) at the terminal 390, and determines whether the voltage signal 362 exceeds the second reference voltage 929 (e.g., $V_{ref2}$) according to some embodiments. In one embodiment, if the voltage signal 362 is determined to exceed the second reference voltage 929 (e.g., $V_{ref2}$), the secondary controller 308 further determines the time duration when the voltage signal 362 remains exceeding the second reference voltage 929 (e.g., $V_{ref2}$), and determines whether the time duration is longer than a first threshold time period (e.g., $T_{th1}$). For example, the second reference voltage 929 (e.g., $V_{ref2}$) is lower than the first reference voltage 829 (e.g., $V_{ref1}$) that has been shown in FIG. 8. In another example, the second reference voltage 929 (e.g., $V_{ref2}$) is higher than the ground voltage 372 (e.g., zero volt), and both the first threshold voltage 928 (e.g., $V_{th1}$) and the second threshold voltage 930 (e.g., $V_{th2}$) are lower than the ground voltage 372 (e.g., zero volt).

In another embodiment, if the time duration when the voltage signal 362 remains exceeding the second reference voltage 929 (e.g., $V_{ref2}$) is determined to be longer than the first threshold time period (e.g., $T_{th1}$), the secondary controller 308, in response to the voltage signal 362 (e.g., $V_{DR}$) decreasing from a value higher than the second reference voltage 929 to a value lower than both the first threshold voltage 928 (e.g., $V_{th1}$) and the second threshold voltage 930 (e.g., $V_{th2}$), changes the signal 366 from the logic low level to the logic high level in order to turn on the transistor 310. In yet another embodiment, if the time duration when the voltage signal 362 remains exceeding the second reference voltage 929 (e.g., $V_{ref2}$) is not determined to be longer than the first threshold time period (e.g., $T_{th1}$), the secondary controller 308 does not change the signal 366 from the logic low level to the logic high level even if the voltage signal 362 (e.g., $V_{DR}$) decreasing to a value that is lower than both the first threshold voltage 928 (e.g., $V_{th1}$) and the second threshold voltage 930 (e.g., $V_{th2}$), so that the transistor 310 remains off.

For example, a switching period of the switch 330 includes an on-time period during which the switch 330 is closed (e.g., on) and an off-time period during which the switch 330 is open (e.g., off). In another example, as shown in FIG. 9, an on-time period of the switch 330 (e.g., $T_{on}$) starts at time $t_{34}$ and ends at time $t_{35}$, and an off-time period of the switch 330 (e.g., $T_{off}$) starts at the time $t_{35}$ and ends at time $t_{40}$. In yet another example, a demagnetization period (e.g., $T_{demag}$) associated with the transformer including the primary winding 304 and the secondary winding 306 starts at the time $t_{35}$ and ends before or at the time $t_{40}$. In yet another example, $t_{34} \leq t_{35} \leq t_{40}$.

In one embodiment, during the on-time period (e.g., $T_{on}$), the switch 330 is closed (e.g., being turned on) as shown by the waveform 902, and the energy is stored in the transformer that includes the primary winding 304 and the secondary winding 306. For example, the secondary current 352 has a low value (e.g., nearly zero). In another example, the voltage signal 362 (e.g., $V_{DR}$) received by the secondary controller 308 has a value 918 which is higher than zero (e.g., as shown by the waveform 908). In yet another example, the signal 366 is at the logic low level (e.g., as shown by the waveform 910), and the transistor 310 is off. In yet another example, during the on-time period (e.g., $T_{on}$), the channel current 368 of the transistor 310 has a low value (e.g., nearly zero) and the body-diode current 370 of the transistor 310 has a low value (e.g., nearly zero).

In another embodiment, at the end of the on-time period (e.g., at the time $t_{35}$), the switch 330 is open (e.g., being turned off) as shown by the waveform 902, and the energy is transferred to the secondary side. For example, the secondary current 352 increases (e.g., at the time $t_{35}$). In another example, the voltage signal 362 (e.g., $V_{DR}$) decreases from the value 918 to a value 926 (e.g., as shown by the waveform 908). In yet another example, the value 926 is lower than both the first threshold voltage 928 (e.g., $V_{th1}$) and the second threshold voltage 930 (e.g., $V_{th2}$). In yet another example, both the first threshold voltage 928 (e.g., $V_{th1}$) and the second threshold voltage 930 (e.g., $V_{th2}$) are lower than the ground voltage 372 (e.g., zero volt). In yet another example, the first threshold voltage 928 (e.g., $V_{th1}$) is equal to about −300 mV, and the second threshold voltage 930 (e.g., $V_{th2}$) is equal to about −10 mV. In yet another example, the body diode 374 of the transistor 310 begins to conduct, and the body-diode current 370 of the body diode 374 increases.

According to certain embodiments, the secondary controller 308 receives the voltage signal 362 (e.g., $V_{DR}$) at the terminal 390, and determines whether the voltage signal 362 exceeds the second reference voltage 929 (e.g., $V_{ref2}$). In one embodiment, if the voltage signal 362 is determined to exceed (e.g., at the time $t_{34}$) the second reference voltage 929 (e.g., $V_{ref2}$), the secondary controller 308 further determines the time duration (e.g., the time duration $T_A$ from the time $t_{34}$ to the time $t_{35}$) when the voltage signal 362 remains exceeding the second reference voltage 929 (e.g., $V_{ref2}$), and determines whether the time duration (e.g., the time duration $T_A$) is longer than a first threshold time period (e.g., $T_{th1}$). For example, the second reference voltage 929 (e.g., $V_{ref2}$) is lower than the first reference voltage 829 (e.g., $V_{ref1}$) that has been shown in FIG. 8. In another embodiment, if the time duration (e.g., the time duration $T_A$) is determined to be longer than the first threshold time period (e.g., $T_{th1}$), the secondary controller 308, in response to the voltage signal 362 (e.g., $V_{DR}$) decreasing from a value (e.g., the value 918) higher than the second reference voltage 929 to a value (e.g., the value 926) lower than both the first threshold voltage 928 (e.g., $V_{th1}$) and the second threshold voltage 930 (e.g., $V_{th2}$), changes the signal 366 from the logic low level to the logic high level (e.g., at the time $t_{35}$ as shown by the waveform 910, or at a time after $t_{35}$) in order to turn on the transistor 310. In yet another embodiment, if the time duration (e.g., the time duration $T_A$) is determined to be longer than the first threshold time period (e.g., $T_{th1}$), the secondary controller 308, in response to the voltage signal 362 (e.g., $V_{DR}$) decreasing from a value (e.g., the value 918) higher than the second reference voltage 929 to a value (e.g., the value 926) lower than the second threshold voltage 930 (e.g., $V_{th2}$), changes the signal 366 from the logic low level to the logic high level (e.g., at the time $t_{35}$ as shown by the waveform 910, or at a time after $t_{35}$) in order to turn on the transistor 310.

For example, the time duration $T_A$ is longer than the first threshold time period $T_{th1}$. In another example, the first threshold voltage 928 (e.g., $V_{th1}$) is the same as the first threshold voltage 828 (e.g., $V_{th1}$) that has been shown in FIG. 8, and the second threshold voltage 930 (e.g., $V_{th2}$) is the same as the second threshold voltage 830 (e.g., $V_{th2}$) that has been shown in FIG. 8. In another example, there is a delay (e.g., $T_d$) between the time at which the voltage signal 362 (e.g., $V_{DR}$) decreases from the value 918 to the value 926 and the time at which the signal 366 changes from the logic low level to the logic high level. In yet another example, the delay (e.g., $T_d$) is zero.

In yet another embodiment, after the transistor 310 is turned on, the channel current 368 of the transistor 310 increases. In yet another embodiment, the secondary current 352 is equal to a sum of the channel current 368 and the body-diode current 370.

In yet another embodiment, if the time duration (e.g., the time duration $T_A$) is not determined to be longer than the first threshold time period (e.g., $T_{th1}$), the secondary controller 308 keeps the signal 366 at the logic low level in order to keep the transistor 310 to be turned off, regardless of whether the voltage signal 362 (e.g., $V_{DR}$) decreases to a value lower than both the first threshold voltage 928 (e.g., $V_{th1}$) and the second threshold voltage 930 (e.g., $V_{th2}$). In yet another embodiment, if the time duration (e.g., the time duration $T_A$) is not determined to be longer than the first threshold time period (e.g., $T_{th1}$), the secondary controller 308 keeps the signal 366 at the logic low level in order to keep the transistor 310 to be turned off, regardless of whether the voltage signal 362 (e.g., $V_{DR}$) decreases to a value lower than the second threshold voltage 930 (e.g., $V_{th2}$).

According to one embodiment, during the demagnetization period, the switch 330 remains open (e.g., off) as shown by the waveform 902. For example, the secondary current 352 decreases. In another example, if the voltage signal 362 (e.g., $V_{DR}$) becomes larger than the first threshold voltage 928 (e.g., as shown by the waveform 908), the signal 366 changes from the logic high level to the logic low level (e.g., as shown by the waveform 910). In yet another example, the transistor 310 is turned off, and the channel current 368 of the transistor 310 decreases to a low value (e.g., nearly zero). In yet another example, the body-diode current 370 of the transistor 310 flows through the body diode 374 of the transistor 310, and then decreases to a low value. In yet another example, the demagnetization period ends before the time $t_{40}$. In yet another example, immediately after the end of the demagnetization period, the voltage signal 362 increases to a value 919 as shown by a rising edge in the waveform 908.

According to certain embodiments, the secondary controller 308 receives the voltage signal 362 (e.g., $V_{DR}$) at the terminal 390, and determines whether the voltage signal 362 exceeds the second reference voltage 929 (e.g., $V_{ref2}$). In one embodiment, if the voltage signal 362 is determined to exceed (e.g., at time $t_{36}$) the second reference voltage 929 (e.g., $V_{ref2}$), the secondary controller 308 further determines the time duration (e.g., the time duration $T_B$ from the time $t_{36}$ to time $t_{37}$) when the voltage signal 362 remains exceeding the second reference voltage 929 (e.g., $V_{ref2}$), and determines whether the time duration (e.g., the time duration $T_B$) is longer than a first threshold time period (e.g., $T_{th1}$). In another embodiment, if the time duration (e.g., the time duration $T_B$) is not determined to be longer than the first threshold time period (e.g., $T_{th1}$), the secondary controller 308 does not change the signal 366 from the logic low level to the logic high level even if the voltage signal 362 (e.g., $V_{DR}$) decreasing to a value (e.g., the value 927) that is lower than both the first threshold voltage 928 (e.g., $V_{th1}$) and the second threshold voltage 930 (e.g., $V_{th2}$), so that the transistor 310 remains off. For example, the time duration $T_B$ is shorter than the first threshold time period $T_{th1}$.

According to yet another embodiment of the present invention, FIG. 9 is a simplified timing diagram for the power conversion system 400 as shown in FIG. 4(B) operating in the discontinuous conduction mode (DCM). For example, the waveform 902 represents the power switch 430 being turned on or off as a function of time, the waveform 908 represents the voltage signal 462 (e.g., at terminal DR) as a function of time, and the waveform 910 represents the signal 466 (e.g., at terminal G2) as a function of time.

As discussed earlier, in one embodiment, if the voltage signal 362 (e.g., $V_{DR}$) becomes larger than the first threshold voltage 928 (e.g., as shown by the waveform 908), the signal 366 changes from the logic high level to the logic low level (e.g., as shown by the waveform 910) in order to turn off the transistor 310. For example, such hard turn-off of the transistor 310 often generates ringing at the drain of the transistor 310 because the left-over energy in the transformer that includes the primary winding 304 and the secondary winding 306 goes out through the parasitic body diode 374 of the transistor 310 and resonant with the parasitic capacitor of the transistor 310 and the inductance of the transformer. In another example, these resonant rings (e.g., rings as shown by the waveform 908 before the time $t_{40}$) can reach a value (e.g., the value 927) that is lower than both the first threshold voltage 928 (e.g., $V_{th1}$) and the second threshold voltage 930 (e.g., $V_{th2}$).

Also as discussed earlier, in another embodiment, the secondary controller 308 determines whether the time duration when the voltage signal 362 remains exceeding the second reference voltage 929 (e.g., $V_{ref2}$) is longer than the first threshold time period (e.g., $T_{th1}$). For example, based on the result of this determination, the secondary controller 308 further decides whether to turn off the transistor 310 in response to the voltage signal 362 (e.g., $V_{DR}$) decreasing to a value that is lower than both the first threshold voltage 928 (e.g., $V_{th1}$) and the second threshold voltage 930 (e.g., $V_{th2}$).

In another example, if the AC input voltage on the primary side has a small amplitude, the value 918 of the voltage signal 362 and the value 919 of the voltage signal 362 as shown by the waveform 908 are approximately equal; therefore, it is difficult to select a value for the first reference voltage 829 (e.g., $V_{ref1}$) that is smaller than the value 918 but larger than the value 919, but a value for the second reference voltage 929 (e.g., $V_{ref2}$) can be selected so that the time duration when the voltage signal 362 remains exceeding the second reference voltage 929 (e.g., $V_{ref2}$) can be used to avoid mis-triggering the secondary controller 308 by the resonant rings (e.g., rings as shown by the waveform 908 before the time $t_{40}$). In another example, such mis-triggering may result in non-synchronization of the secondary-side rectifier and instability of the output voltage 350.

As discussed above and further emphasized here, FIG. 9 is merely an example, which should not unduly limit the scope of the claims. One of ordinary skill in the art would recognize many variations, alternatives, and modifications. For example, the power conversion system 300 as shown in FIG. 4(A) or the power conversion system 400 as shown in FIG. 4(B) operating in other modes, such as a continuous conduction mode and the critical conduction mode (e.g., the quasi-resonant mode), can also implement the scheme as illustrated in FIG. 9.

According to certain embodiments, the scheme as illustrated in FIG. 9 is implemented in the continuous conduction mode. In one embodiment, if the time duration when the voltage signal 362 remains exceeding the second reference voltage 929 (e.g., $V_{ref2}$) is determined to be longer than the first threshold time period (e.g., $T_{th1}$), the secondary controller 308, in response to the voltage signal 362 (e.g., $V_{DR}$) decreasing from a value higher than the second reference voltage 929 to a value lower than both the first threshold voltage 928 (e.g., $V_{th1}$) and the second threshold voltage 930 (e.g., $V_{th2}$), changes the signal 366 from the logic low level to the logic high level in order to turn on the transistor 310. In another embodiment, if the time duration when the voltage signal 362 remains exceeding the second reference voltage 929 (e.g., $V_{ref2}$) is not determined to be longer than the first threshold time period (e.g., $T_{th1}$), the secondary controller 308 does not change the signal 366 from the logic low level to the logic high level even if the voltage signal 362 (e.g., $V_{DR}$) decreasing to a value that is lower than both the first threshold voltage 928 (e.g., $V_{th1}$) and the second threshold voltage 930 (e.g., $V_{th2}$), so that the transistor 310 remains off. In yet another embodiment, the controller 302 turns on the transistor 330 before the demagnetization period ends (e.g., the controller 302 turns on the transistor 330 before the secondary current 352 drops to zero), and in response, the signal 362 (e.g., $V_{DR}$) increases. In yet another example, the secondary controller 308 detects a rising edge of the signal 362 and changes the signal 366 to turn off the transistor 310.

According to some embodiments, as shown in FIG. 9, the secondary controller 308 receives the voltage signal 362 (e.g., $V_{DR}$) at the terminal 390, and determines whether the voltage signal 362 is lower than the first reference voltage 829 (e.g., $V_{ref1}$) but exceeds the second reference voltage 929 (e.g., $V_{ref2}$). In one embodiment, if the voltage signal 362 is determined to be lower than the first reference voltage 829 (e.g., $V_{ref1}$) but to exceed the second reference voltage 929 (e.g., $V_{ref2}$), the secondary controller 308 further determines the time duration when the voltage signal 362 remains lower than the first reference voltage 829 (e.g., $V_{ref1}$) but exceeding the second reference voltage 929 (e.g., $V_{ref2}$), and determines whether the time duration is longer than the first threshold time period (e.g., $T_{th1}$). In another embodiment, if the time duration when the voltage signal 362 remains lower than the first reference voltage 829 (e.g., $V_{ref1}$) but exceeding the second reference voltage 929 (e.g., $V_{ref2}$) is determined to be longer than the first threshold time period (e.g., $T_{th1}$), the secondary controller 308, in response to the voltage signal 362 (e.g., $V_{DR}$) decreasing from a value higher than the second reference voltage 929 to a value lower than both the first threshold voltage 928 (e.g., $V_{th1}$) and the second threshold voltage 930 (e.g., $V_{th2}$), changes the signal 366 from the logic low level to the logic high level in order to turn on the transistor 310. In yet another embodiment, if the time duration when the voltage signal 362 remains lower than the first reference voltage 829 (e.g., $V_{ref1}$) but exceeding the second reference voltage 929 (e.g., $V_{ref2}$) is not determined to be longer than the first threshold time period (e.g., $T_{th1}$), the secondary controller 308 does not change the signal 366 from the logic low level to the logic high level even if the voltage signal 362 (e.g., $V_{DR}$) decreasing to a value that is lower than both the first threshold voltage 928 (e.g., $V_{th1}$) and the second threshold voltage 930 (e.g., $V_{th2}$), so that the transistor 310 remains off.

Figure 10:
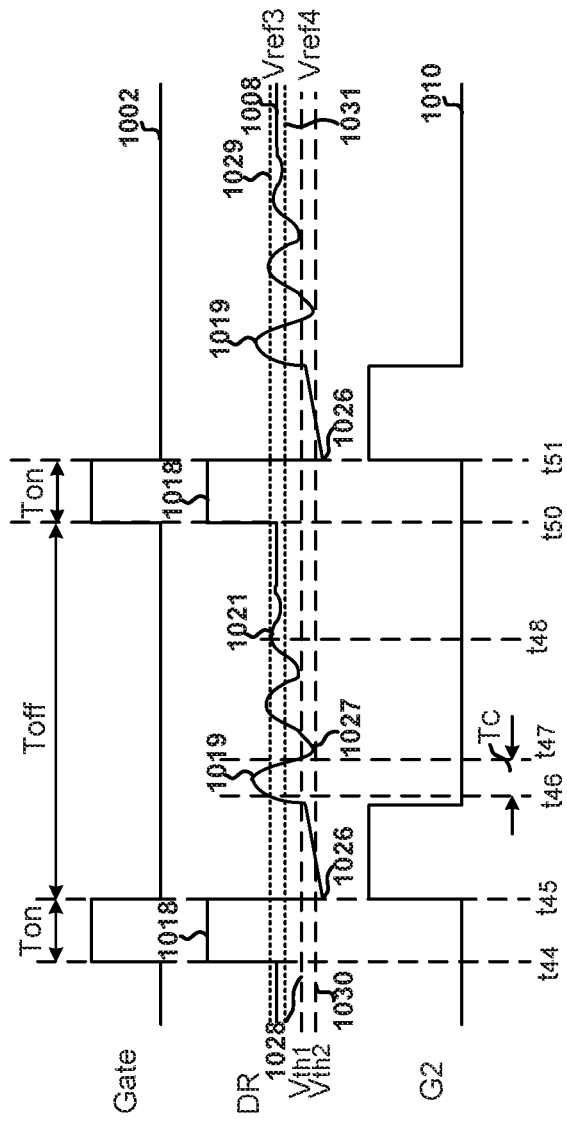
FIG. 10 is a simplified timing diagram for the power conversion system 300 as shown in FIG. 4(A) operating in the discontinuous conduction mode (DCM) according to yet another embodiment of the present invention.

FIG. 10 is a simplified timing diagram for the power conversion system 300 as shown in FIG. 4(A) operating in the discontinuous conduction mode (DCM) according to yet another embodiment of the present invention. This diagram is merely an example, which should not unduly limit the scope of the claims. One of ordinary skill in the art would recognize many variations, alternatives, and modifications. For example, the waveform 1002 represents the power switch 330 being turned on or off as a function of time, the waveform 1008 represents the voltage signal 362 (e.g., $V_{DR}$ at terminal DR) as a function of time, and the waveform 1010 represents the signal 366 (e.g., at terminal G2) as a function of time.

As shown in FIG. 10, the secondary controller 308 receives the voltage signal 362 (e.g., $V_{DR}$) at the terminal 390, determines the time duration from the time when the voltage signal 362 exceeds a third reference voltage 1029 (e.g., $V_{ref3}$) to the time when the voltage signal 362 drops below a fourth reference voltage 1031 (e.g., $V_{ref4}$), and further determines whether the time duration is longer than a second threshold time period (e.g., $T_{th2}$). In one embodiment, if the time duration is determined to be longer than the second threshold time period (e.g., $T_{th2}$), the secondary controller 308, in response to the voltage signal 362 (e.g., $V_{DR}$) decreasing from a value higher than the third reference voltage 1029 to a value lower than both a first threshold voltage 1028 (e.g., $V_{th1}$) and a second threshold voltage 1030 (e.g., $V_{th2}$), changes the signal 366 from the logic low level to the logic high level in order to turn on the transistor 310. In another embodiment, if the time duration is not determined to be longer than the second threshold time period (e.g., $T_{th2}$), the secondary controller 308 does not change the signal 366 from the logic low level to the logic high level even if the voltage signal 362 (e.g., $V_{DR}$) decreasing to a value that is lower than both the first threshold voltage 1028 (e.g., $V_{th1}$) and the second threshold voltage 1030 (e.g., $V_{th2}$), so that the transistor 310 remains off.

For example, a switching period of the switch 330 includes an on-time period during which the switch 330 is closed (e.g., on) and an off-time period during which the switch 330 is open (e.g., off). In another example, as shown in FIG. 10, an on-time period of the switch 330 (e.g., $T_{on}$) starts at time $t_{44}$ and ends at time $t_{45}$, or starts at time $t_{50}$ and ends at time $t_{51}$. In yet another example, as shown in FIG. 10, an off-time period of the switch 330 (e.g., $T_{off}$) starts at the time $t_{45}$ and ends at the time $t_{50}$. In yet another example, a demagnetization period (e.g., $T_{demag}$) associated with the transformer including the primary winding 304 and the secondary winding 306 starts at the time $t_{45}$ and ends before or at the time $t_{50}$. In yet another example, $t_{44} \leq t_{45} \leq t_{50} \leq t_{51}$.

In one embodiment, during the on-time period (e.g., $T_{on}$), the switch 330 is closed (e.g., being turned on) as shown by the waveform 1002, and the energy is stored in the transformer that includes the primary winding 304 and the secondary winding 306. For example, the secondary current 352 has a low value (e.g., nearly zero). In another example, the voltage signal 362 (e.g., $V_{DR}$) received by the secondary controller 308 has a value 1018 which is higher than zero (e.g., as shown by the waveform 1008). In yet another example, the signal 366 is at the logic low level (e.g., as shown by the waveform 1010), and the transistor 310 is off. In yet another example, during the on-time period (e.g., $T_{on}$), the channel current 368 of the transistor 310 has a low value (e.g., nearly zero) and the body-diode current 370 of the transistor 310 has a low value (e.g., nearly zero).

In another embodiment, at the end of the on-time period (e.g., at the time $t_{45}$ or at the time $t_{51}$), the switch 330 is open (e.g., being turned off) as shown by the waveform 1002, and the energy is transferred to the secondary side. For example, the secondary current 352 increases (e.g., at the time $t_{45}$ or at the time $t_{51}$). In another example, the voltage signal 362 (e.g., $V_{DR}$) decreases from the value 1018 to a value 1026 (e.g., as shown by the waveform 1008). In yet another example, the value 1026 is lower than both the first threshold voltage 1028 (e.g., $V_{th1}$) and the second threshold voltage 1030 (e.g., $V_{th2}$). In yet another example, both the first threshold voltage 1028 (e.g., $V_{th1}$) and the second threshold voltage 1030 (e.g., $V_{th2}$) are lower than the ground voltage 372 (e.g., zero volt). In yet another example, the first threshold voltage 1028 (e.g., $V_{th1}$) is equal to about −300 mV, and the second threshold voltage 1030 (e.g., $V_{th2}$) is equal to about −10 mV. In yet another example, the body diode 374 of the transistor 310 begins to conduct, and the body-diode current 370 of the body diode 374 increases.

According to some embodiments, the secondary controller 308 receives the voltage signal 362 (e.g., $V_{DR}$) at the terminal 390, determines the time duration (e.g., time duration $T_C$) from the time (e.g., time $t_{46}$) when the voltage signal 362 exceeds the third reference voltage 1029 (e.g., $V_{ref3}$) to the time (e.g., time $t_{47}$) when the voltage signal 362 drops below the fourth reference voltage 1031 (e.g., $V_{ref4}$), and further determines whether the time duration (e.g., the time duration $T_C$) is longer than the second threshold time period (e.g., $T_{th2}$). For example, the fourth reference voltage 1031 (e.g., $V_{ref4}$) is lower than the third reference voltage 1029 (e.g., $V_{ref1}$), which is lower than the first reference voltage 829 (e.g., $V_{ref1}$) that has been shown in FIG. 8 and is also lower than the second reference voltage 929 (e.g., $V_{ref2}$) that has been shown in FIG. 9. In another example, the third reference voltage 1029 (e.g., $V_{ref3}$) is higher than the fourth reference voltage 1031 (e.g., $V_{ref4}$), the fourth reference voltage 1031 (e.g., $V_{ref4}$) is higher than the first threshold voltage 1028 (e.g., $V_{th1}$), and the first threshold voltage 1028 (e.g., $V_{th1}$) is higher than the second threshold voltage 1030 (e.g., $V_{th2}$). In yet another example, both the third reference voltage 1029 (e.g., $V_{ref3}$) and the fourth reference voltage 1031 (e.g., $V_{ref4}$) are higher than the ground voltage 372 (e.g., zero volt), and both the first threshold voltage 1028 (e.g., $V_{th1}$) and the second threshold voltage 1030 (e.g., $V_{th2}$) are lower than the ground voltage 372 (e.g., zero volt). In yet another example, the time duration $T_C$ is shorter than the second threshold time period $T_{th2}$.

In one embodiment, if the time duration (e.g., the time duration $T_C$) is not determined to be longer than the second threshold time period (e.g., $T_{th2}$), the secondary controller 308 does not change the signal 366 from the logic low level to the logic high level even if the voltage signal 362 (e.g., $V_{DR}$) decreasing to a value (e.g., a value 1027) that is lower than both the first threshold voltage 1028 (e.g., $V_{th1}$) and the second threshold voltage 1030 (e.g., $V_{th2}$), so that the transistor 310 remains off. For example, the first threshold voltage 1028 (e.g., $V_{th1}$) is the same as the first threshold voltage 928 (e.g., $V_{th1}$) that has been shown in FIG. 9 and is also the same as the first threshold voltage 828 (e.g., $V_{th1}$) that has been shown in FIG. 8. In another example, the second threshold voltage 1030 (e.g., $V_{th2}$) is the same as the second threshold voltage 930 (e.g., $V_{th2}$) that has been shown in FIG. 9 and is also the same as the second threshold voltage 830 (e.g., $V_{th2}$) that has been shown in FIG. 8.

According to certain embodiments, the secondary controller 308 receives the voltage signal 362 (e.g., $V_{DR}$) at the terminal 390, determines the time duration (e.g., time duration $T_D$) from the time (e.g., time $t_{48}$) when the voltage signal 362 exceeds the third reference voltage 1029 (e.g., $V_{ref3}$) to the time (e.g., the time $t_{51}$) when the voltage signal 362 drops below the fourth reference voltage 1031 (e.g., $V_{ref4}$), and further determines whether the time duration (e.g., the time duration $T_D$) is longer than the second threshold time period (e.g., $T_{th2}$). In one embodiment, if the time duration (e.g., the time duration $T_D$) is determined to be longer than the second threshold time period (e.g., $T_{th2}$), the secondary controller 308, in response to the voltage signal 362 (e.g., $V_{DR}$) decreasing from a value (e.g., the value 1018) higher than the third reference voltage 1029 to a value (e.g., the value 1026) lower than both the first threshold voltage 1028 (e.g., $V_{th1}$) and the second threshold voltage 1030 (e.g., $V_{th2}$), changes the signal 366 from the logic low level to the logic high level (e.g., at the time $t_{51}$ as shown by the waveform 1010, or at a time after $t_{51}$) in order to turn on the transistor 310. In another embodiment, if the time duration (e.g., the time duration $T_D$) is determined to be longer than the second threshold time period (e.g., $T_{th2}$), the secondary controller 308, in response to the voltage signal 362 (e.g., $V_{DR}$) decreasing from a value (e.g., the value 1018) higher than the third reference voltage 1029 to a value (e.g., the value 1026) lower than the second threshold voltage 1030 (e.g., $V_{th2}$), changes the signal 366 from the logic low level to the logic high level (e.g., at the time $t_{51}$ as shown by the waveform 1010, or at a time after $t_{51}$) in order to turn on the transistor 310.

For example, the time duration $T_D$ is longer than the second threshold time period $T_{th2}$. In another example, there is a delay (e.g., $T_d$) between the time at which the voltage signal 362 (e.g., $V_{DR}$) decreases from the value 1018 to the value 1026 and the time at which the signal 366 changes from the logic low level to the logic high level. In yet another example, the delay (e.g., $T_d$) is zero. In another embodiment, after the transistor 310 is turned on, the channel current 368 of the transistor 310 increases. In yet another embodiment, the secondary current 352 is equal to a sum of the channel current 368 and the body-diode current 370.

In yet another embodiment, if the time duration (e.g., the time duration $T_D$) is not determined to be longer than the second threshold time period (e.g., $T_{th2}$), the secondary controller 308 keeps the signal 366 at the logic low level in order to keep the transistor 310 to be turned off, regardless of whether the voltage signal 362 (e.g., $V_{DR}$) decreases to a value lower than both the first threshold voltage 1028 (e.g., $V_{th1}$)) and the second threshold voltage 1030 (e.g., $V_{th2}$). In yet another embodiment, if the time duration (e.g., the time duration $T_D$) is not determined to be longer than the second threshold time period (e.g., $T_{th2}$), the secondary controller 308 keeps the signal 366 at the logic low level in order to keep the transistor 310 to be turned off, regardless of whether the voltage signal 362 (e.g., $V_{DR}$) decreases to a value lower than the second threshold voltage 1030 (e.g., $V_{th2}$).

According to one embodiment, during the demagnetization period, the switch 330 remains open (e.g., off) as shown by the waveform 1002. For example, the secondary current 352 decreases. In another example, if the voltage signal 362 (e.g., $V_{DR}$) becomes larger than the first threshold voltage 1028 (e.g., as shown by the waveform 1008), the signal 366 changes from the logic high level to the logic low level (e.g., as shown by the waveform 1010). In yet another example, the transistor 310 is turned off, and the channel current 368 of the transistor 310 decreases to a low value (e.g., nearly zero). In yet another example, the body-diode current 370 of the transistor 310 flows through the body diode 374 of the transistor 310, and then decreases to a low value. In yet another example, the demagnetization period starts at the time $t_{45}$ and ends before the time $t_{50}$, or starts at the time $t_{51}$. In yet another example, immediately after the end of the demagnetization period, the voltage signal 362 increases to a value 1019 as shown by a rising edge in the waveform 1008.

According to another embodiment of the present invention, FIG. 10 is a simplified timing diagram for the power conversion system 400 as shown in FIG. 4(B) operating in the discontinuous conduction mode (DCM). For example, the waveform 1002 represents the power switch 430 being turned on or off as a function of time, the waveform 1008 represents the voltage signal 462 (e.g., at terminal DR) as a function of time, and the waveform 1010 represents the signal 466 (e.g., at terminal G2) as a function of time.

As discussed earlier, in one embodiment, if the voltage signal 362 (e.g., $V_{DR}$) becomes larger than the first threshold voltage 1028 (e.g., as shown by the waveform 1008), the signal 366 changes from the logic high level to the logic low level (e.g., as shown by the waveform 1010) in order to turn off the transistor 310. For example, such hard turn-off of the transistor 310 often generates ringing at the drain of the transistor 310 because the left-over energy in the transformer that includes the primary winding 304 and the secondary winding 306 goes out through the parasitic body diode 374 of the transistor 310 and resonant with the parasitic capacitor of the transistor 310 and the inductance of the transformer. In another example, these resonant rings (e.g., rings as shown by the waveform 1008 before the time $t_{50}$) can reach a value (e.g., the value 927) that is lower than both the first threshold voltage 1028 (e.g., $V_{th1}$) and the second threshold voltage 1030 (e.g., $V_{th2}$).

Also as discussed earlier, in another embodiment, the secondary controller 308 determines whether the time duration from the time when the voltage signal 362 exceeds the third reference voltage 1029 (e.g., $V_{ref3}$) to the time when the voltage signal 362 drops below the fourth reference voltage 1031 (e.g., $V_{ref4}$) is longer than the second threshold time period (e.g., $T_{th2}$). For example, based on the result of this determination, the secondary controller 308 further decides whether to turn off the transistor 310 in response to the voltage signal 362 (e.g., $V_{DR}$) decreasing to a value that is lower than both the first threshold voltage 928 (e.g., $V_{th1}$) and the second threshold voltage 930 (e.g., $V_{th2}$). In another example, if the power conversion system 300 is under light load or no load conditions, the time duration $T_A$ (e.g., $T_{on}$) may become shorter than the first threshold time period (e.g., $T_{th1}$), resulting in missing of the pulse firing and/or non-synchronization, but such resonant ring pattern can be detected as shown in FIG. 10.

As discussed above and further emphasized here, FIG. 10 is merely an example, which should not unduly limit the scope of the claims. One of ordinary skill in the art would recognize many variations, alternatives, and modifications. For example, the power conversion system 300 as shown in FIG. 4(A) or the power conversion system 400 as shown in FIG. 4(B) operating in other modes, such as a continuous conduction mode and the critical conduction mode (e.g., the quasi-resonant mode), can also implement the scheme as illustrated in FIG. 10.

According to certain embodiments, the scheme as illustrated in FIG. 10 is implemented in the continuous conduction mode. In one embodiment, if the time duration from the time when the voltage signal 362 exceeds the third reference voltage 1029 (e.g., $V_{ref3}$) to the time when the voltage signal 362 drops below the fourth reference voltage 1031 (e.g., $V_{ref4}$) is determined to be longer than the second threshold time period (e.g., $T_{th2}$), the secondary controller 308, in response to the voltage signal 362 (e.g., $V_{DR}$) decreasing from a value higher than the third reference voltage 1029 to a value lower than both the first threshold voltage 1028 (e.g., $V_{th1}$) and the second threshold voltage 1030 (e.g., $V_{th2}$), changes the signal 366 from the logic low level to the logic high level in order to turn on the transistor 310. In another embodiment, if the time duration from the time when the voltage signal 362 exceeds the third reference voltage 1029 (e.g., $V_{ref3}$) to the time when the voltage signal 362 drops below the fourth reference voltage 1031 (e.g., $V_{ref4}$) is not determined to be longer than the second threshold time period (e.g., $T_{th2}$), the secondary controller 308 does not change the signal 366 from the logic low level to the logic high level even if the voltage signal 362 (e.g., $V_{DR}$) decreasing to a value that is lower than both the first threshold voltage 1028 (e.g., $V_{th1}$) and the second threshold voltage 1030 (e.g., $V_{th2}$), so that the transistor 310 remains off. In yet another embodiment, the controller 302 turns on the transistor 330 before the demagnetization period ends (e.g., the controller 302 turns on the transistor 330 before the secondary current 352 drops to zero), and in response, the signal 362 (e.g., $V_{DR}$) increases. In yet another example, the secondary controller 308 detects a rising edge of the signal 362 and changes the signal 366 to turn off the transistor 310.

According to certain embodiments, as shown in FIG. 10, the secondary controller 308 receives the voltage signal 362 (e.g., $V_{DR}$) at the terminal 390, determines the time duration from the time when the voltage signal 362 is lower than both the first reference voltage 829 (e.g., $V_{ref1}$) and the second reference voltage 929 (e.g., $V_{ref2}$) but exceeds a third reference voltage 1029 (e.g., $V_{ref3}$) to the time when the voltage signal 362 drops below a fourth reference voltage 1031 (e.g., $V_{ref4}$), and further determines whether the time duration is longer than a second threshold time period (e.g., $T_{th2}$). For example, $V_{ref1} > V_{ref2} > V_{ref3} > V_{ref4}$. In one embodiment, if the time duration is determined to be longer than the second threshold time period (e.g., $T_{th2}$), the secondary controller 308, in response to the voltage signal 362 (e.g., $V_{DR}$) decreasing from a value higher than the third reference voltage 1029 to a value lower than both the first threshold voltage 1028 (e.g., $V_{th1}$) and the second threshold voltage 1030 (e.g., $V_{th2}$), changes the signal 366 from the logic low level to the logic high level in order to turn on the transistor 310. In another embodiment, if the time duration is not determined to be longer than the second threshold time period (e.g., $T_{th2}$), the secondary controller 308 does not change the signal 366 from the logic low level to the logic high level even if the voltage signal 362 (e.g., $V_{DR}$) decreasing to a value that is lower than both the first threshold voltage 1028 (e.g., $V_{th1}$) and the second threshold voltage 1030 (e.g., $V_{th2}$), so that the transistor 310 remains off.

Figure 11:
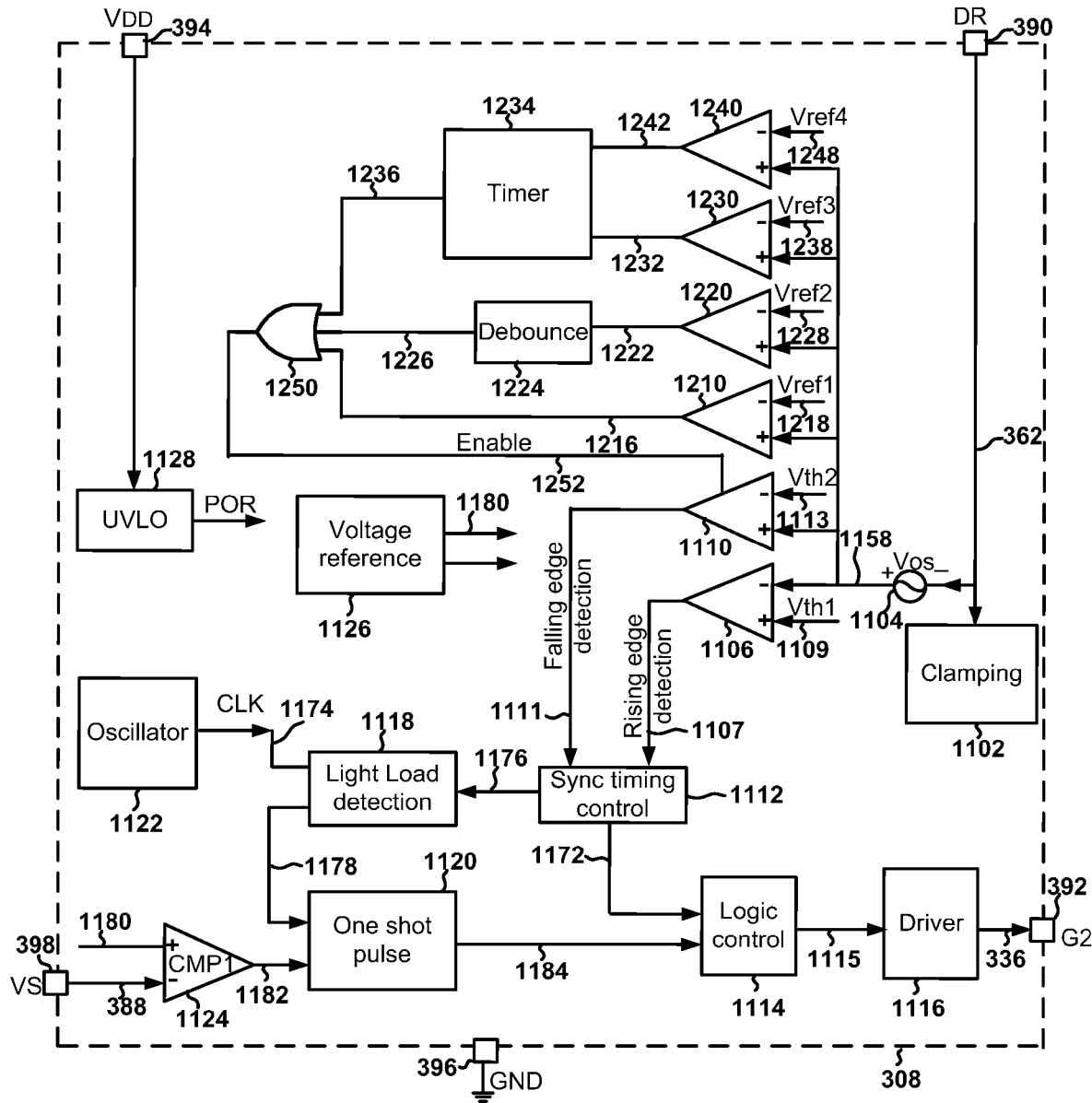
FIG. 11 is a simplified diagram showing certain components of the secondary controller 308 as part of the power conversion system 300 according to another embodiment of the present invention.

FIG. 11 is a simplified diagram showing certain components of the secondary controller 308 as part of the power conversion system 300 according to another embodiment of the present invention. This diagram is merely an example, which should not unduly limit the scope of the claims. One of ordinary skill in the art would recognize many variations, alternatives, and modifications. The secondary controller 308 includes a clamping component 1102, an offset component 1104, a rising-edge detection component 1106, comparators 1124, 1210, 1220, 1230, and 1240, a falling-edge detection component 1110, a timing controller 1112, a logic control component 1114, a gate driver 1116, a light-load detector 1118, a signal generator 1120, an oscillator 1122, an under-voltage-lockout component 1128, and a reference-signal generator 1126, an OR gate 1250, a debounce component 1224, and a timer component 1234. For example, some components of the secondary controller 308 are used for synchronized rectifying, including the clamping component 1102, the offset component 1104, the rising-edge detection component 1106, the comparators 1124, 1210, 1220, 1230, and 1240, the falling-edge detection component 1110, the timing controller 1112, the logic control component 1114, the gate driver 1116, the OR gate 1250, the debounce component 1224, and the timer component 1234. In another example, certain components of the secondary controller 308 are used for output voltage detection and control, including the light-load detector 1118, the signal generator 1120, the oscillator 1122, the reference-signal generator 1126, the logic control component 1114, and the gate driver 1116. In yet another example, the components of the secondary controller 308 that are used for synchronized rectifying and the components of the secondary controller 308 that are used for output voltage detection and control are integrated on a same chip.

In one embodiment, the clamping component 1102 receives the voltage signal 362 (e.g., $V_{DR}$) from the terminal 390 (e.g., terminal DR). For example, the voltage signal 362 (e.g., $V_{DR}$) is clamped by the clamping component 1102. In another example, the clamping component 1102 is removed from the secondary controller 308. In another embodiment, the rising-edge detection component 1106, the comparators 1210, 1220, 1230, and 1240, and the falling-edge detection component 1110 receive a signal 1158 which is equal to the voltage signal 362 modified by the offset component 1104. For example, the offset component 604 is omitted, and the signal 1158 is the same as the signal 362. In another example, the rising-edge detection component 1106 includes a comparator, and the falling-edge detection component 1110 includes a comparator.

In another embodiment, the comparator 1210 receives the signal 1158 and a first reference voltage 1218 (e.g., the first reference voltage 829), and outputs a signal 1216 to the OR gate. For example, if the signal 1158 is larger than the first reference voltage 1218 (e.g., the first reference voltage 829), the signal 1216 is at a logic high level. In another example, if the signal 1158 is smaller than the first reference voltage 1218 (e.g., the first reference voltage 829), the signal 1216 is at a logic low level. In yet another embodiment, the comparator 1220 receives the signal 1158 and a second reference voltage 1228 (e.g., the second reference voltage 929), and outputs a signal 1222 to the debounce component 1224. For example, if the signal 1158 is larger than the second reference voltage 1228 (e.g., the second reference voltage 929), the signal 1222 is at a logic high level. In another example, if the signal 1158 is smaller than the second reference voltage 1228 (e.g., the second reference voltage 929), the signal 1222 is at a logic low level.

In yet another embodiment, the comparator 1230 receives the signal 1158 and a third reference voltage 1238 (e.g., the third reference voltage 1029), and outputs a signal 1232 to the timer component 1234. For example, if the signal 1158 is larger than the third reference voltage 1238 (e.g., the third reference voltage 1029), the signal 1232 is at a logic high level. In another example, if the signal 1158 is smaller than the third reference voltage 1238 (e.g., the third reference voltage 1029), the signal 1232 is at a logic low level. In yet another embodiment, the comparator 1240 receives the signal 1158 and a fourth reference voltage 1248 (e.g., the fourth reference voltage 1031), and outputs a signal 1242 to the timer component 1234. For example, if the signal 1158 is larger than the fourth reference voltage 1248 (e.g., the fourth reference voltage 1031), the signal 1242 is at a logic high level. In another example, if the signal 1158 is smaller than the fourth reference voltage 1248 (e.g., the fourth reference voltage 1031), the signal 1242 is at a logic low level.

According to one embodiment, the debounce component 1224 receives the signal 1222 from the comparator 1220, determines whether the signal 1222 indicates that the signal 1158 remains to be larger than the second reference voltage 1228 (e.g., the second reference voltage 929) for a time duration that is longer than a first threshold time period (e.g., $T_{th1}$), and outputs a signal 1226 to the OR gate 1250. For example, if the debounce component 1224 determines that the signal 1222 indicates that the signal 1158 remains to be larger than the second reference voltage 1228 (e.g., the second reference voltage 929) for a time duration that is longer than the first threshold time period (e.g., $T_{th1}$), the debounce component 1224 generates the signal 1226 at a logic high level. In another example, if the debounce component 1224 determines that the signal 1222 does not indicate that the signal 1158 remains to be larger than the second reference voltage 1228 (e.g., the second reference voltage 929) for a time duration that is longer than the first threshold time period (e.g., $T_{th1}$), the debounce component 1224 generates the signal 1226 at a logic low level.

According to another embodiment, the timer component 1234 receives the signal 1232 from the comparator 1230 and the signal 1242 from the comparator 1240, and outputs a signal 1236 to the OR gate 1250. For example, the timer component 1234 determines a time duration from the time when the voltage signal 1158 exceeds the third reference voltage 1238 (e.g., the third reference voltage 1029) to the time when the voltage signal 1158 drops below the fourth reference voltage 1248 (e.g., the fourth reference voltage 1031). In another example, if the determined time duration is longer than a second threshold time period (e.g., $T_{th2}$), the timer component 1234 generates the signal 1236 at a logic high level. In yet another example, if the determined time duration is not longer than the second threshold time period (e.g., $T_{th2}$), the timer component 1234 generates the signal 1236 at a logic low level.

According to yet another embodiment, the OR gate 1250 receives the signals 1216, 1226, and 1236 from the comparator 1210, the debounce component 1224, and the timer component 1234 respectively, and outputs a signal 1252 to the falling-edge detection component 1110 (e.g., a comparator). For example, if any of the signals 1216, 1226, and 1236 is at a logic high level, the OR gate generates the signal 1252 at a logic high level. In another example, if none of the signals 1216, 1226, and 1236 is at the logic high level, the OR gates generates the signal 1252 at a logic low level.

In one embodiment, the falling-edge detection component 1110 (e.g., a comparator) receives the signal 1252 from the OR gate 1250, and outputs a signal 1111 to the timing controller 1112. For example, if the signal 1252 is at a logic high level, the falling-edge detection component 1110 (e.g., a comparator) is enabled for falling edge detection; and if the signal 1252 is at a logic low level, the falling-edge detection component 1110 (e.g., a comparator) is not enabled (e.g., is in standby) for falling edge detection. In another example, if the falling-edge detection component 1110 (e.g., a comparator) is enabled, the falling-edge detection component 1110 changes the signal 1111 from a logic high level to a logic low level if the signal 1158 becomes smaller than a second threshold voltage 1113 (e.g., the second threshold voltage 830, the second threshold voltage 930, and/or the second threshold voltage 1030). In yet another example, if the falling-edge detection component 1110 (e.g., a comparator) is not enabled, the falling-edge detection component 1110 keeps the signal 1111 at a logic high level regardless of whether the signal 1158 becomes smaller than the second threshold voltage 1113.

In another embodiment, the rising-edge detection component 1106 (e.g., a comparator) outputs a signal 1107 to the timing controller 1112. For example, the rising-edge detection component 1106 changes the signal 1107 from a logic high level to a logic low level if the signal 1158 becomes larger than a first threshold voltage 1109 (e.g., the first threshold voltage 828, the first threshold voltage 928, and/or the first threshold voltage 1028). In another example, the first threshold voltage 1109 is larger than the second threshold voltage 1113 in magnitude.

In yet another embodiment, the timing controller 1112 receives the signals 1107 and 1111 and outputs a signal 1172 to the logic controller 1114. For example, the logic controller 1114 outputs a signal 1115 to the gate driver 1116. In another example, the gate driver 1116 provides the signal 366 (e.g., at terminal G2) to drive the transistor 310. For example, in response to the signal 1107 changing from a logic high level to a logic low level, the gate driver 1116 changes the signal 366 from a logic high level to a logic low level in order to turn off the transistor 310. In another example, if the signal 1111 changes from the logic high level to the logic low level, the gate driver 1116 changes the signal 366 from a logic low level to a logic high level in order to turn on the transistor 310.

According to one embodiment, the secondary controller 308 continuously monitors the output voltage 350 through the signal 388 (e.g., $V_s$). For example, the comparator 1124 receives a reference signal 1180 and the signal 388 (e.g., $V_s$) and outputs a signal 1182. In another example, the light-load detector 1118 receives a clock signal 1174 from the oscillator 1122 and a signal 1176 from the timing controller 1112. In yet another example, the signal 1176 indicates certain switching events (e.g., rising edges or falling edges) in the signal 362. In yet another example, the light-load detector 1118 outputs a signal 1178 which indicates the switching frequency of the power conversion system 300. In yet another example, the signal generator 1120 receives the signal 1178 and the signal 1182 and outputs a signal 1184 to the logic control component 1114 in order to affect the status of the transistor 310.

In another embodiment, if the output voltage 350 drops below a threshold level in any conditions, for example, when the output load conditions changes from no/light load conditions to full load conditions, the output voltage 350 decreases (e.g., below a threshold level). For example, if the signal 388 (e.g., $V_s$) changes from a first value larger than the reference signal 1180 in magnitude to a second value lower than the reference signal 1180 in magnitude, the signal generator 1120 generates a pulse in the signal 1184 in order to turn on the transistor 310 during a short time period.

According to some embodiments, if the signal 1178 indicates that the power conversion system 300 is under no/light load conditions, the signal generator 620, in response to the signal 388 (e.g., $V_s$) changing from a first value larger than the reference signal 1180 in magnitude to a second value lower than the reference signal 1180 in magnitude, outputs a pulse in the signal 1184. For example, in response to the pulse in the signal 1184, the gate driver 1116 generates a pulse 730 in the signal 366. In another example, the transistor 310 is turned on during a pulse period associated with the pulse 730 in the signal 366, and the channel current 368 flows in a different direction (e.g., from the output capacitor 312 through the transistor 310 to ground). In yet another example, the feedback signal 360 increases in magnitude, and forms a pulse. According to certain embodiments, the controller 302 detects the pulse of the feedback signal 360 and, in response, increases the peak current of the primary winding 304 and the switching frequency in order to deliver more energy to the secondary side. For example, the output voltage 350 and the voltage signal 388 increase in magnitude eventually.

As discussed above and further emphasized here, FIG. 11 is merely an example, which should not unduly limit the scope of the claims. One of ordinary skill in the art would recognize many variations, alternatives, and modifications. For example, the comparators 1230 and 1240 and the timer component 1234 are removed from the secondary controller 308, and the OR gate 1250 receives the signals 1216 and 1226 and outputs the signal 1252 to the falling-edge detection component 1110 (e.g., a comparator). In another example, the comparator 1220 and the debounce component 1224 are removed from the secondary controller 308, and the OR gate 1250 receives the signals 1216 and 1236 and outputs the signal 1252 to the falling-edge detection component 1110 (e.g., a comparator). In yet another example, the comparator 1210 is removed from the secondary controller 308, and the OR gate 1250 receives the signals 1226 and 1236 and outputs the signal 1252 to the falling-edge detection component 1110 (e.g., a comparator).

In yet another example, the comparators 1220, 1230 and 1240, the debounce component 1224, the timer component 1234, and the OR gate 1250 are removed from the secondary controller 308, and the signal 1216 is used as the signal 1252 and received by the falling-edge detection component 1110 (e.g., a comparator). In yet another example, the comparators 1210, 1230 and 1240, the timer component 1234, and the OR gate 1250 are removed from the secondary controller 308, and the signal 1226 is used as the signal 1252 and received by the falling-edge detection component 1110 (e.g., a comparator). In yet another example, the comparators 1210 and 1220, the debounce component 1224, and the OR gate 1250 are removed from the secondary controller 308, and the signal 1236 is used as the signal 1252 and received by the falling-edge detection component 1110 (e.g., a comparator).

Figure 12:
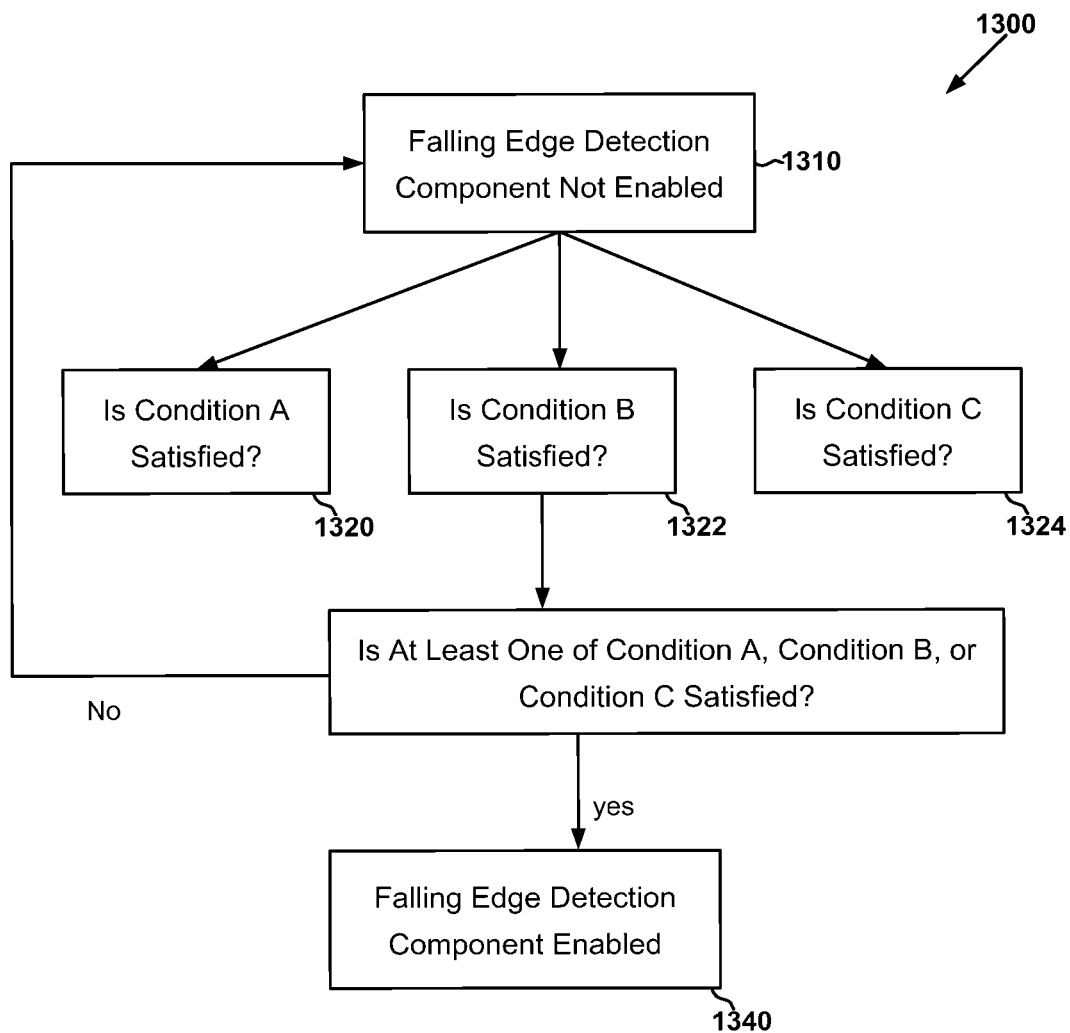
FIG. 12 is a simplified diagram showing a method for enabling the falling-edge detection component 1110 of the secondary controller 308 as part of the power conversion system 300 according to one embodiment of the present invention.

FIG. 12 is a simplified diagram showing a method for enabling the falling-edge detection component 1110 of the secondary controller 308 as part of the power conversion system 300 according to one embodiment of the present invention. This diagram is merely an example, which should not unduly limit the scope of the claims. One of ordinary skill in the art would recognize many variations, alternatives, and modifications. The method 1300 includes a process 1310 for keeping the falling-edge detection component 1110 not enabled, a process 1320 for determining whether condition A is satisfied, a process 1322 for determining whether condition B is satisfied, a process 1324 for determining whether condition C is satisfied, a process 1330 for determining whether at least one of condition A, condition B, or condition C is satisfied, and a process 1340 for enabling the falling-edge detection component 1110.

At the process 1310, the falling-edge detection component 1110 remains not enabled (e.g., remains in standby). For example, if the signal 1252 is at a logic low level, the falling-edge detection component 1110 (e.g., a comparator) is not enabled (e.g., is in standby) for falling edge detection. In another example, if the falling-edge detection component 1110 (e.g., a comparator) is not enabled, the falling-edge detection component 1110 keeps the signal 1111 at a logic high level regardless of whether the signal 1158 becomes smaller than the second threshold voltage 1113.

At the process 1320, it is determined whether condition A is satisfied, wherein the condition A requires that the signal 1158 is larger than the first reference voltage 1218 (e.g., the first reference voltage 829). For example, if the signal 1158 is larger than the first reference voltage 1218 (e.g., the first reference voltage 829), the condition A is determined satisfied. In another example, the process 1320 is performed by the comparator 1210.

At the process 1322, it is determined whether condition B is satisfied, wherein the condition B requires that the signal 1158 remains to be larger than the second reference voltage 1228 (e.g., the second reference voltage 929) for a time duration that is longer than the first threshold time period (e.g., $T_{th1}$). For example, if the signal 1158 remains to be larger than the second reference voltage 1228 (e.g., the second reference voltage 929) for a time duration that is longer than the first threshold time period (e.g., $T_{th1}$), the condition B is determined satisfied. In another example, the process 1322 is performed by the comparator 1220 and the debounce component 1224.

At the process 1324, it is determined whether condition C is satisfied, wherein the condition C requires that a time duration from the time when the voltage signal 1158 exceeds the third reference voltage 1238 (e.g., the third reference voltage 1029) to the time when the voltage signal 1158 drops below the fourth reference voltage 1248 (e.g., the fourth reference voltage 1031) is longer than the second threshold time period (e.g., $T_{th2}$). For example, if a time duration from the time when the voltage signal 1158 exceeds the third reference voltage 1238 (e.g., the third reference voltage 1029) to the time when the voltage signal 1158 drops below the fourth reference voltage 1248 (e.g., the fourth reference voltage 1031) is longer than the second threshold time period (e.g., $T_{th2}$), the condition C is determined satisfied. In another example, the process 1324 is performed by the comparators 1230 and 1240 and the timer component 1234.

According to certain embodiments, the second reference voltage 1228 (e.g., the second reference voltage 929) is smaller than the first reference voltage 1218 (e.g., the first reference voltage 829), the third reference voltage 1238 (e.g., the third reference voltage 1029) is smaller than the second reference voltage 1228 (e.g., the second reference voltage 929), the fourth reference voltage 1248 (e.g., the fourth reference voltage 1031) is smaller than the third reference voltage 1238 (e.g., the third reference voltage 1029), and the second threshold voltage 1113 (e.g., the second threshold voltage 830, the second threshold voltage 930, and/or the second threshold voltage 1030) is smaller than the fourth reference voltage 1248 (e.g., the fourth reference voltage 1031). According to some embodiments, the first reference voltage 1218 (e.g., the first reference voltage 829), the second reference voltage 1228 (e.g., the second reference voltage 929), the third reference voltage 1238 (e.g., the third reference voltage 1029), and the fourth reference voltage 1248 (e.g., the fourth reference voltage 1031) each are larger than zero, and the second threshold voltage 1113 (e.g., the second threshold voltage 830, the second threshold voltage 930, and/or the second threshold voltage 1030) is smaller than zero.

At the process 1330, it is determined whether at least one of condition A, condition B, or condition C is satisfied. For example, if condition A is satisfied, at least one of condition A, condition B, or condition C is satisfied. In another example, if condition A and condition B are satisfied, at least one of condition A, condition B, or condition C is satisfied. In yet another example, the process 1330 is performed by the OR gate 1250.

According to one embodiment, if none of condition A, condition B, or condition C is satisfied, the process 1310 is performed so that the falling-edge detection component 1110 remains not enabled (e.g., remains in standby). According to another embodiment, if at least one of condition A, condition B, or condition C is satisfied, the process 1340 is performed.

For example, if the falling-edge detection component 1110 (e.g., a comparator) is not enabled, the falling-edge detection component 1110 keeps the signal 1111 at a logic high level regardless of whether the signal 1158 becomes smaller than the second threshold voltage 1113 (e.g., the second threshold voltage 830, the second threshold voltage 930, and/or the second threshold voltage 1030). In another example, if the falling-edge detection component 1110 (e.g., a comparator) is not enabled, the gate driver 1116 keeps the signal 366 at a logic low level in order to keep the transistor 310 to be turned off regardless of whether the signal 1158 becomes smaller than the second threshold voltage 1113 (e.g., the second threshold voltage 830, the second threshold voltage 930, and/or the second threshold voltage 1030).

At the process 1340, the falling-edge detection component 1110 is enabled. For example, if the falling-edge detection component 1110 (e.g., a comparator) is enabled, the falling-edge detection component 1110 changes the signal 1111 from a logic high level to a logic low level if the signal 1158 becomes smaller than the second threshold voltage 1113 (e.g., the second threshold voltage 830, the second threshold voltage 930, and/or the second threshold voltage 1030). In another example, if the signal 1111 changes from the logic high level to the logic low level, the gate driver 1116 changes the signal 366 from a logic low level to a logic high level in order to turn on the transistor 310. In yet another example, if the falling-edge detection component 1110 (e.g., a comparator) is enabled and if the signal 1158 becomes smaller than the second threshold voltage 1113 (e.g., the second threshold voltage 830, the second threshold voltage 930, and/or the second threshold voltage 1030), the gate driver 1116 changes the signal 366 from a logic low level to a logic high level in order to turn on the transistor 310.

As discussed above and further emphasized here, FIG. 12 is merely an example, which should not unduly limit the scope of the claims. One of ordinary skill in the art would recognize many variations, alternatives, and modifications. For example, if the falling-edge detection component 1110 is enabled at the process 1340, after the falling-edge detection component 1110 detects the signal 1158 becomes smaller than the second threshold voltage 1113, the falling-edge detection component 1110 becomes not enabled again so that the process 1310 is repeated. In another example, the signal 1158 is the same as the signal 362.

In one embodiment, the secondary controller 408 is the same as the secondary controller 308 as shown in FIG. 11. In another embodiment, FIG. 12 is a simplified diagram showing a method for enabling the falling-edge detection component 1110 of the secondary controller 408 as part of the power conversion system 400.

According to some embodiments, the secondary controller 308 as part of the power conversion system 300 or the secondary controller 408 as part of the power conversion system 400 operating in other modes, such as a continuous conduction mode and the critical conduction mode (e.g., the quasi-resonant mode), can also implement the scheme as illustrated in FIG. 11 and FIG. 12.

Certain embodiments of the present invention provide a rectifying circuit that can avoid false firing of switching pulses due to resonant oscillation caused by parasitical capacitance and transformer inductance. For example, the false firing of switching pulses may cause non-synchronization between the secondary-side switching control and the primary-side switching control. In another example, such non-synchronization can cause reliability issues that may result in damage of the power conversion system. Some embodiments of the present invention provide systems and methods to improve synchronization of the secondary-side switching with the primary-side switching and also improve reliability of the power conversion system. For example, a secondary controller of the present invention can identify whether the negative pulse is a true turn-on signal or is just a resonant ringing or a glitch.

According to another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal is larger than a first threshold at a first time, in response to the input signal being determined to be larger than the first threshold at the first time, determine whether the input signal is smaller than a second threshold at a second time, and in response to the input signal being determined to be smaller than the second threshold at the second time, change the drive signal at the second controller terminal from a first logic level to a second logic level. Also, the second time is after the first time. For example, the system controller is implemented according to at least FIG. 8 and/or FIG. 11.

According to yet another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal remains larger than a first threshold for a time period that is longer than a predetermined duration, and in response to the input signal being determined to have remained larger than the first threshold for the time period that is longer than the predetermined duration, determine whether the input signal is smaller than a second threshold at a time following the time period. Moreover, the system controller is further configured to, in response to the input signal being determined to be smaller than the second threshold at the time, change the drive signal at the second controller terminal from a first logic level to a second logic level. For example, the system controller is implemented according to at least FIG. 9 and/or FIG. 11.

According to yet another embodiment, a system controller for regulating a power conversion system includes a first controller terminal, and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether a time interval from a first time when the input signal becomes larger than a first threshold to a second time when the input signal becomes smaller than a second threshold is longer than a predetermined duration, and in response to the time interval being determined to be longer than the predetermined duration, determine whether the input signal is smaller than a third threshold at a time following the time interval. Also, the system controller is further configured to, in response to the input signal being determined to be smaller than the third threshold at the time, change the drive signal at the second controller terminal from a first logic level to a second logic level. For example, the system controller is implemented according to at least FIG. 10 and/or FIG. 11.

According to yet another embodiment, a system controller for regulating a power conversion system includes a first controller terminal and a second controller terminal. Additionally, the system controller is configured to receive an input signal at the first controller terminal, and generate a drive signal at the second controller terminal based at least in part on the input signal to turn on or off a transistor in order to affect a current associated with a secondary winding of the power conversion system. Moreover, the system controller is further configured to determine whether the input signal is larger than a first threshold, determine whether the input signal remains larger than a second threshold for a time period that is longer than a first predetermined duration, and determine whether a time interval from a first time when the input signal becomes larger than a third threshold to a second time when the input signal becomes smaller than a fourth threshold is longer than a second predetermined duration. Also, the system controller is further configured to, in response to the input signal being determined to be larger than the first threshold, the input signal being determined to be larger than the second threshold for the time period that is longer than the first predetermined duration, or the time interval being determined to be longer than the second predetermined duration, determine whether the input signal is smaller than a fifth threshold, and in response to the input signal being determined to be smaller than the fifth threshold, change the drive signal at the second controller terminal from a first logic level to a second logic level. For example, the system controller is implemented according to at least FIG. 11 and/or FIG. 12.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal is larger than a first threshold at a first time. Moreover, the generating a drive signal based at least in part on the input signal to turn on or off a transistor in order to affect a current associated with a secondary winding of the power conversion system includes, in response to the input signal being determined to be larger than the first threshold at the first time, determining whether the input signal is smaller than a second threshold at a second time, and in response to the input signal being determined to be smaller than the second threshold at the second time, changing the drive signal from a first logic level to a second logic level. Also, the second time is after the first time. For example, the method is implemented according to at least FIG. 8 and/or FIG. 11.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal remains larger than a first threshold for a time period that is longer than a predetermined duration. Moreover, the generating a drive signal based at least in part on the input signal to turn on or off a transistor in order to affect a current associated with a secondary winding of the power conversion system includes, in response to the input signal being determined to have remained larger than the first threshold for the time period that is longer than the predetermined duration, determining whether the input signal is smaller than a second threshold at a time following the time period, and in response to the input signal being determined to be smaller than the second threshold at the time, changing the drive signal from a first logic level to a second logic level. For example, the method is implemented according to at least FIG. 9 and/or FIG. 11.

According to yet another embodiment, a method for regulating a power conversion system includes receiving an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether a time interval from a first time when the input signal becomes larger than a first threshold to a second time when the input signal becomes smaller than a second threshold is longer than a predetermined duration. Moreover, the generating a drive signal based at least in part on the input signal to turn on or off a transistor in order to affect a current associated with a secondary winding of the power conversion system includes, in response to the time interval being determined to be longer than the predetermined duration, determining whether the input signal is smaller than a third threshold at a time following the time interval, and in response to the input signal being determined to be smaller than the third threshold at the time, change the drive signal from a first logic level to a second logic level. For example, the method is implemented according to at least FIG. 10 and/or FIG. 11.

According to yet another embodiment, a method for regulating a power conversion system includes receive an input signal, processing information associated with the input signal, and generating a drive signal based at least in part on the input signal to turn on or off a transistor in order to affect a current associated with a secondary winding of the power conversion system. Additionally, the processing information associated with the input signal includes determining whether the input signal is larger than a first threshold, determining whether the input signal remains larger than a second threshold for a time period that is longer than a first predetermined duration, and determining whether a time interval from a first time when the input signal becomes larger than a third threshold to a second time when the input signal becomes smaller than a fourth threshold is longer than a second predetermined duration. Moreover, the generating a drive signal based at least in part on the input signal to turn on or off a transistor in order to affect a current associated with a secondary winding of the power conversion system includes, in response to the input signal being determined to be larger than the first threshold, the input signal being determined to be larger than the second threshold for the time period that is longer than the first predetermined duration, or the time interval being determined to be longer than the second predetermined duration, determining whether the input signal is smaller than a fifth threshold, and in response to the input signal being determined to be smaller than the fifth threshold, changing the drive signal from a first logic level to a second logic level. For example, the method is implemented according to at least FIG. 11 and/or FIG. 12.

Figure 13:
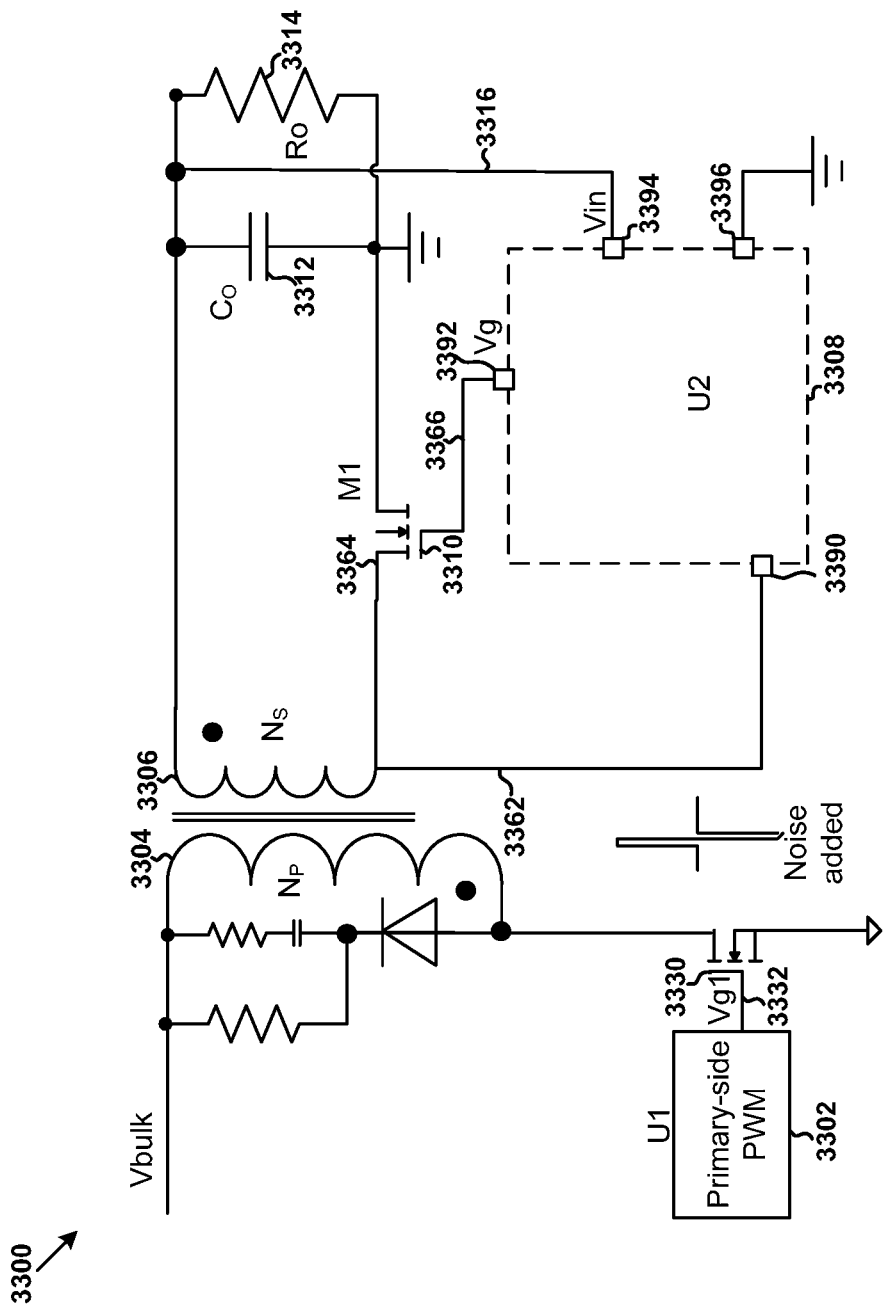
FIG. 13 is a simplified diagram showing a power conversion system with a secondary-side synchronization rectifier (SR) according to an embodiment of the present invention.

FIG. 13 is a simplified diagram showing a power conversion system with a secondary-side synchronization rectifier (SR) according to an embodiment of the present invention. This diagram is merely an example, which should not unduly limit the scope of the claims. One of ordinary skill in the art would recognize many variations, alternatives, and modifications. The power conversion system 3300 (e.g., a flyback power converter) includes a primary-side pulse-width-modulation (PWM) controller 3302, a primary winding 3304, a secondary winding 3306, a secondary-side synchronization rectifier (SR) controller 3308, a transistor 3310 (e.g., a MOSFET), an output capacitive load 3312, an output resistive load 3314, and a power switch 3330 (e.g., a transistor). The secondary-side synchronization rectifier (SR) controller 3308 includes terminals 3390, 3392, 3394 and 3396.

In one embodiment, the terminal 3390 receives a voltage signal 3362 indicative of a voltage at a terminal 3364 of the transistor 3310 (e.g., a drain terminal of the transistor 3310), and the terminal 3392 outputs a drive signal 3366 to the transistor 3310 (e.g., a MOSFET). In another embodiment, the terminal 3394 receives a voltage signal 3316 indicative an output voltage that is received by the output capacitive load 3312 and the output resistive load 3314. In yet another embodiment, the terminal 3396 is biased to the secondary-side ground.

According to some embodiments, the primary-side pulse-width-modulation (PWM) controller 3302 generates a drive signal 3332 and outputs the drive signal 3332 to the power switch 3330 (e.g., a transistor), and the secondary-side synchronization rectifier (SR) controller 3308 generates the drive signal 3366 and outputs the drive signal 3366 to the transistor 3310 (e.g., a MOSFET).

In one embodiment, the secondary-side synchronization rectifier (SR) controller 3308 detects the voltage signal 3362 indicative of the voltage at the terminal 3364 of the transistor 3310 (e.g., a drain terminal of the transistor 3310), and provides the drive signal 3366 to decide turning on or off of the transistor 3310. In another embodiment, the secondary-side synchronization rectifier (SR) controller 3308 determines whether to use a slow turn-on mechanism or a fast turn-on mechanism.

Figure 14:
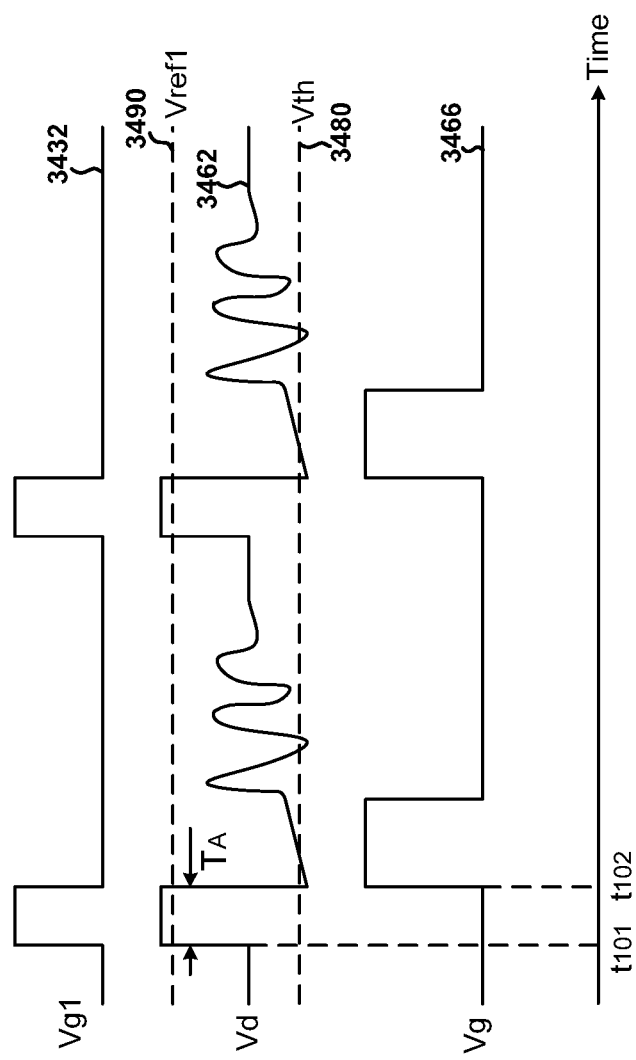
FIG. 14 is a simplified diagram showing one or more predetermined conditions for turn-on mechanism of the secondary-side synchronization rectifier (SR) controller as shown in FIG. 13 to change from slow turn-on mechanism to fast turn-on mechanism according to an embodiment of the present invention.
Figure 15:
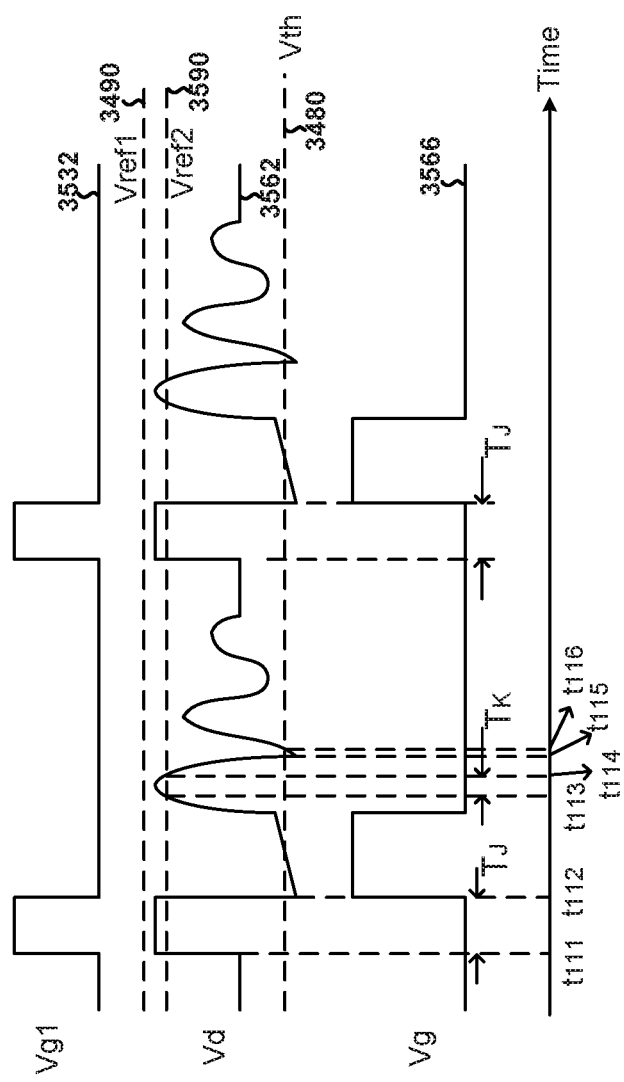
FIG. 15 is a simplified diagram showing one or more predetermined conditions for turn-on mechanism of the secondary-side synchronization rectifier (SR) controller as shown in FIG. 13 to change from slow turn-on mechanism to fast turn-on mechanism according to another embodiment of the present invention.

According to one embodiment, if the secondary-side synchronization rectifier (SR) controller 3308 determines to use the fast turn-on mechanism, the secondary-side synchronization rectifier (SR) controller 3308 detects whether the voltage signal 3362 becomes smaller than a threshold voltage (e.g., $V_{th}$). For example, under the fast turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 immediately changes the drive signal 3366 from a logic low level to a logic high level; and if the secondary-side synchronization rectifier (SR) controller 3308 detects that the voltage signal 3362 does not become smaller than the threshold voltage (e.g., $V_{th}$), the secondary-side synchronization rectifier (SR) controller 3308 does not change the drive signal 3366 from the logic low level to the logic high level. In another example, if the drive signal 3366 is not changed from the logic low level to the logic high level under the fast turn-on mechanism, the turn-on mechanism for the secondary-side synchronization rectifier (SR) controller 3308 remains to be the fast turn-on mechanism, until in response to the drive signal 3366 is changed from the logic low level to the logic high level under the fast turn-on mechanism, the turn-on mechanism for the secondary-side synchronization rectifier (SR) controller 3308 changes from the fast turn-on mechanism to the slow turn-on mechanism. In yet another example, if the drive signal 3366 is changed from the logic low level to the logic high level under the fast turn-on mechanism, the turn-on mechanism for the secondary-side synchronization rectifier (SR) controller 3308 changes from the fast turn-on mechanism back to the slow turn-on mechanism and remains to be the slow turn-on mechanism as the default turn-on mechanism, until in response to one or more predetermined conditions being satisfied (e.g., as shown in FIG. 14, FIG. 15, and/or FIG. 16), the turn-on mechanism for the secondary-side synchronization rectifier (SR) controller 3308 changes from the slow turn-on mechanism to the fast turn-on mechanism.

According to another embodiment, if the secondary-side synchronization rectifier (SR) controller 3308 determines to use the slow turn-on mechanism, the secondary-side synchronization rectifier (SR) controller 3308 detects whether the voltage signal 3362 becomes smaller than the threshold voltage (e.g., $V_{th}$). For example, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 does not immediately changes the drive signal 3366 from the logic low level to the logic high level. In another example, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 detects whether the voltage signal 3362 remains smaller than the threshold voltage (e.g., $V_{th}$) for a time duration that is equal to or larger than a predetermined period of time, and if the voltage signal 3362 remains smaller than the threshold voltage (e.g., $V_{th}$) for the time duration that is equal to or larger than the predetermined period of time, the secondary-side synchronization rectifier (SR) controller 3308 then changes the drive signal 3366 from the logic low level to the logic high level. In yet another example, under the slow turn-on mechanism, if the secondary-side synchronization rectifier (SR) controller 3308 detects that the voltage signal 3362 does not remain smaller than the threshold voltage (e.g., $V_{th}$) for the time duration that is equal to or larger than the predetermined period of time, the secondary-side synchronization rectifier (SR) controller 3308 does not change the drive signal 3366 from the logic low level to the logic high level. In yet another example, regardless of whether the drive signal 3366 is changed or not changed from the logic low level to the logic high level under the slow turn-on mechanism, the turn-on mechanism for the secondary-side synchronization rectifier (SR) controller 3308 remains to be the slow turn-on mechanism as the default turn-on mechanism, until in response to one or more predetermined conditions being satisfied (e.g., as shown in FIG. 14, FIG. 15, and/or FIG. 16), the turn-on mechanism for the secondary-side synchronization rectifier (SR) controller 3308 changes from the slow turn-on mechanism to the fast turn-on mechanism.

According to certain embodiments, under the fast turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 immediately changes the drive signal 3366 from the logic low level to the logic high level. For example, after the secondary-side synchronization rectifier (SR) controller 3308 changes the drive signal 3366 from the logic low level to the logic high level under the fast turn-on mechanism, the secondary-side synchronization rectifier (SR) controller 3308 keeps the drive signal 3366 at the logic high level and then changes the drive signal 3366 from the logic high level back to the logic low level. For example, in the continuous conduction mode (CCM), the secondary-side synchronization rectifier (SR) controller 3308 predicts the timing for changing the drive signal 3366 from the logic high level back to the logic low level. In another example, in the discontinuous conduction mode (DCM), the secondary-side synchronization rectifier (SR) controller 3308 changes the drive signal 3366 from the logic high level back to the logic low level when the current flowing between the source terminal of the transistor 3310 and the drain terminal of the transistor 3310 reaches zero in magnitude.

According to some embodiments, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 detects whether the voltage signal 3362 remains smaller than the threshold voltage (e.g., $V_{th}$) for a time duration that is equal to or larger than a predetermined period of time, and if the voltage signal 3362 remains smaller than the threshold voltage (e.g., $V_{th}$) for the time duration that is equal to or larger than the predetermined period of time, the secondary-side synchronization rectifier (SR) controller 3308 then changes the drive signal 3366 from the logic low level to the logic high level. For example, after the secondary-side synchronization rectifier (SR) controller 3308 changes the drive signal 3366 from the logic low level to the logic high level under the slow turn-on mechanism, the secondary-side synchronization rectifier (SR) controller 3308 keeps the drive signal 3366 at the logic high level and then changes the drive signal 3366 from the logic high level back to the logic low level. For example, in the continuous conduction mode (CCM), the secondary-side synchronization rectifier (SR) controller 3308 predicts the timing for changing the drive signal 3366 from the logic high level back to the logic low level. In another example, in the discontinuous conduction mode (DCM), the secondary-side synchronization rectifier (SR) controller 3308 changes the drive signal 3366 from the logic high level back to the logic low level when the current flowing between the source terminal of the transistor 3310 and the drain terminal of the transistor 3310 reaches zero in magnitude.

According to certain embodiments, the default turn-on mechanism for the secondary-side synchronization rectifier (SR) controller 3308 is the slow turn-on mechanism. In one embodiment, if one or more predetermined conditions are satisfied (e.g., as shown in FIG. 14, FIG. 15, and/or FIG. 16), the turn-on mechanism for the secondary-side synchronization rectifier (SR) controller 3308 changes from the slow turn-on mechanism to the fast turn-on mechanism. For example, under the fast turn-on mechanism, if the secondary-side synchronization rectifier (SR) controller 3308 detects that the voltage signal 3362 becomes smaller than a threshold voltage (e.g., $V_{th}$), the secondary-side synchronization rectifier (SR) controller 3308 generates, without delay, the drive signal 3366 to turn on the transistor 3310. In another example, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism and remains to be the slow turn-on mechanism as the default turn-on mechanism, until in response to one or more predetermined conditions being satisfied (e.g., as shown in FIG. 14, FIG. 15, and/or FIG. 16), the turn-on mechanism for the secondary-side synchronization rectifier (SR) controller 3308 changes from the slow turn-on mechanism to the fast turn-on mechanism.

In another embodiment, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 further detects whether the voltage signal 3362 remains smaller than the threshold voltage during at least a debounce time duration (e.g. 400 ns) and if the voltage signal 3362 remains smaller than the threshold voltage during at least the debounce time duration (e.g. 400 ns), the secondary-side synchronization rectifier (SR) controller 3308 generates the drive signal 3366 to turn on the transistor 3310. For example, if the voltage signal 3362 does not remain smaller than the threshold voltage (e.g., $V_{th}$) during at least the debounce time duration (e.g. 400 ns), the secondary-side synchronization rectifier (SR) controller 3308 does not generate the drive signal 3366 to turn on the transistor 3310. In another example, regardless of whether the drive signal 3366 is generated or not generated to turn on the transistor 3310 under the slow turn-on mechanism, the turn-on mechanism for the secondary-side synchronization rectifier (SR) controller 3308 remains to be the slow turn-on mechanism as the default turn-on mechanism, until in response to one or more predetermined conditions being satisfied (e.g., as shown in FIG. 14, FIG. 15, and/or FIG. 16), the turn-on mechanism for the secondary-side synchronization rectifier (SR) controller 3308 changes from the slow turn-on mechanism to the fast turn-on mechanism. In yet another example, the slow turn-on mechanism is used to filter out noise disturbance to the voltage signal 3362.

Figure 16:
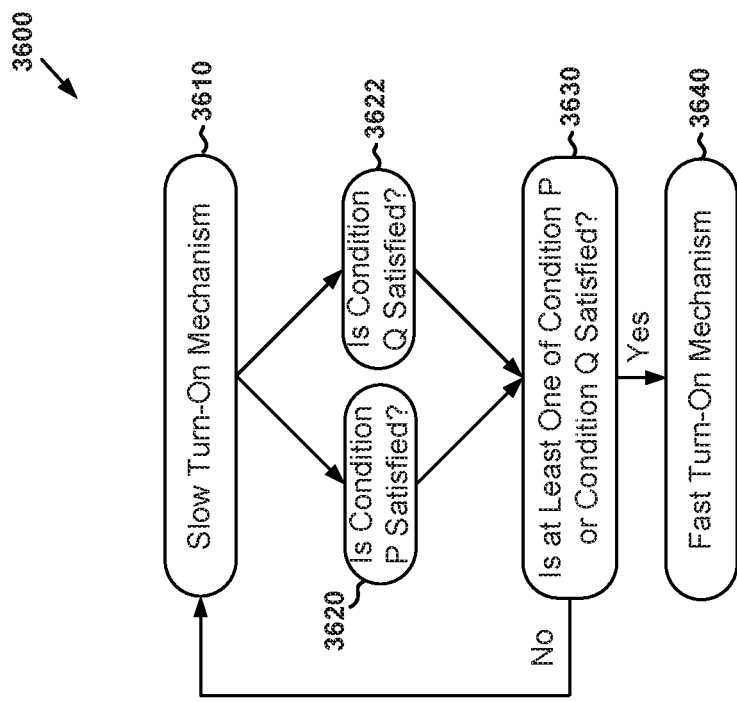
FIG. 16 is a simplified diagram showing a method for the secondary-side synchronization rectifier (SR) controller as shown in FIG. 13 to determine a turn-on mechanism according to some embodiments of the present invention.

According to some embodiments, when the secondary-side synchronization rectifier (SR) controller 3308 is powered up, the turn-on mechanism is, at the beginning of the powering-up process, set to be the slow turn-on mechanism as its default turn-on mechanism. In one embodiment, if one or more predetermined conditions as shown in FIG. 14 are satisfied, the turn-on mechanism for the secondary-side synchronization rectifier (SR) controller 3308 changes from the slow turn-on mechanism to the fast turn-on mechanism, and then, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism as its default mechanism. In another embodiment, if one or more predetermined conditions as shown in FIG. 15 are satisfied, the turn-on mechanism for the secondary-side synchronization rectifier (SR) controller 3308 changes from the slow turn-on mechanism to the fast turn-on mechanism, and then, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism as its default mechanism. In yet another embodiment, if one or more predetermined conditions as shown in FIG. 16 are satisfied, the turn-on mechanism for the secondary-side synchronization rectifier (SR) controller 3308 changes from the slow turn-on mechanism to the fast turn-on mechanism, and then, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism as its default mechanism.

FIG. 14 is a simplified diagram showing one or more predetermined conditions for turn-on mechanism of the secondary-side synchronization rectifier (SR) controller 3308 as shown in FIG. 13 to change from slow turn-on mechanism to fast turn-on mechanism according to an embodiment of the present invention. This diagram is merely an example, which should not unduly limit the scope of the claims. One of ordinary skill in the art would recognize many variations, alternatives, and modifications. Waveform 3432 represents the drive signal 3332 as a function of time, the waveform 3462 represents the voltage signal 3362 as a function of time, and waveform 3466 represents the drive signal 3366 as a function of time.

In one embodiment, the secondary-side synchronization rectifier (SR) controller 3308 detects that the voltage signal 3362 becomes larger than a reference voltage 3490 (e.g., $V_{ref1}$) at time $t_{101}$, remains larger than the reference voltage 3490 (e.g., $V_{ref1}$) until time $t_{102}$, and becomes smaller than the reference voltage 3490 (e.g., $V_{ref1}$) at time $t_{102}$. For example, if the time duration (e.g., $T_A$) from time $t_{101}$ to time $t_{102}$ is equal to or larger than a threshold duration $T_{th1}$, the turn-on mechanism for the secondary-side synchronization rectifier (SR) controller 3308 changes from the slow turn-on mechanism to the fast turn-on mechanism. In another example, the threshold duration $T_{th1}$ represents a leading-edge debounce time (e.g., 300 ns) for a primary-side control system.

In another embodiment, under the fast turn-on mechanism, the secondary-side synchronization rectifier (SR) controller 3308 detects that the voltage signal 3362 becomes smaller than a threshold voltage 3480 (e.g., $V_{th}$) at time $t_{102}$, the secondary-side synchronization rectifier (SR) controller 3308 changes the drive signal 3366 from a logic low level to a logic high level at time $t_{102}$. For example, the threshold voltage 3480 (e.g., $V_{th}$) is smaller than the reference voltage 3490 (e.g., $V_{ref1}$). In another example, after the drive signal 3366 is changed from the logic low level to the logic high level at time $t_{102}$ under the fast turn-on mechanism, the turn-on mechanism for the secondary-side synchronization rectifier (SR) controller 3308 changes from the fast turn-on mechanism back to the slow turn-on mechanism as its default mechanism.

In yet another embodiment, after the secondary-side synchronization rectifier (SR) controller 3308 changes the drive signal 3366 from the logic low level to the logic high level at time $t_{102}$, the secondary-side synchronization rectifier (SR) controller 3308 keeps the drive signal 3366 at the logic high level and then changes the drive signal 3366 from the logic high level back to the logic low level. For example, in the continuous conduction mode (CCM), the secondary-side synchronization rectifier (SR) controller 3308 predicts the timing for changing the drive signal 3366 from the logic high level back to the logic low level. In another example, in the discontinuous conduction mode (DCM), the secondary-side synchronization rectifier (SR) controller 3308 changes the drive signal 3366 from the logic high level back to the logic low level when the current flowing between the source terminal of the transistor 3310 and the drain terminal of the transistor 3310 reaches zero in magnitude.

FIG. 15 is a simplified diagram showing one or more predetermined conditions for turn-on mechanism of the secondary-side synchronization rectifier (SR) controller 3308 as shown in FIG. 13 to change from slow turn-on mechanism to fast turn-on mechanism according to another embodiment of the present invention. This diagram is merely an example, which should not unduly limit the scope of the claims. One of ordinary skill in the art would recognize many variations, alternatives, and modifications. Waveform 3532 represents the drive signal 3332 as a function of time, the waveform 3562 represents the voltage signal 3362 as a function of time, and waveform 3566 represents the drive signal 3366 as a function of time.

In one embodiment, the secondary-side synchronization rectifier (SR) controller 3308 detects that the voltage signal 3362 becomes larger than a reference voltage 3590 (e.g., $V_{ref2}$) at time $t_{111}$, remains larger than the reference voltage 3590 (e.g., $V_{ref2}$) until time $t_{112}$, and becomes smaller than the reference voltage 3590 (e.g., $V_{ref2}$) at time $t_{112}$. For example, the reference voltage 3590 (e.g., $V_{ref2}$) is smaller than the reference voltage 3490 (e.g., $V_{ref1}$). In another example, if the time duration (e.g., $T_J$) from time $t_{111}$ to time $t_{112}$ is equal to or larger than a threshold duration $T_{th2}$, the turn-on mechanism for the secondary-side synchronization rectifier (SR) controller 3308 changes from the slow turn-on mechanism to the fast turn-on mechanism. In yet another example, the threshold duration $T_{th2}$ is longer than the threshold duration $T_{th1}$.

In another embodiment, under the fast turn-on mechanism, the secondary-side synchronization rectifier (SR) controller 3308 detects that the voltage signal 3362 becomes smaller than the threshold voltage 3480 (e.g., $V_{th}$) at time $t_{112}$, the secondary-side synchronization rectifier (SR) controller 3308 changes the drive signal 3366 from the logic low level to the logic high level at time $t_{112}$. For example, the threshold voltage 3480 (e.g., $V_{th}$) is smaller than the reference voltage 3490 (e.g., $V_{ref1}$) and the reference voltage 3590 (e.g., $V_{ref2}$). In another example, after the drive signal 3366 is changed from the logic low level to the logic high level at time $t_{112}$ under the fast turn-on mechanism, the turn-on mechanism for the secondary-side synchronization rectifier (SR) controller 3308 changes from the fast turn-on mechanism back to the slow turn-on mechanism as its default mechanism.

In yet another embodiment, after the secondary-side synchronization rectifier (SR) controller 3308 changes the drive signal 3366 from the logic low level to the logic high level at time $t_{112}$, the secondary-side synchronization rectifier (SR) controller 3308 keeps the drive signal 3366 at the logic high level and then changes the drive signal 3366 from the logic high level back to the logic low level. For example, in the continuous conduction mode (CCM), the secondary-side synchronization rectifier (SR) controller 3308 predicts the timing for changing the drive signal 3366 from the logic high level back to the logic low level. In another example, in the discontinuous conduction mode (DCM), the secondary-side synchronization rectifier (SR) controller 3308 changes the drive signal 3366 from the logic high level back to the logic low level when the current flowing between the source terminal of the transistor 3310 and the drain terminal of the transistor 3310 reaches zero in magnitude.

According to one embodiment, the secondary-side synchronization rectifier (SR) controller 3308 detects that the voltage signal 3362 becomes larger than the reference voltage 3590 (e.g., $V_{ref2}$) at time $t_{113}$, remains larger than the reference voltage 3590 (e.g., $V_{ref2}$) until time $t_{114}$, and becomes smaller than the reference voltage 3590 (e.g., $V_{ref2}$) at time $t_{114}$. For example, if the time duration (e.g., $T_K$) from time $t_{113}$ to time $t_{114}$ is smaller than the threshold duration $T_{th2}$, the turn-on mechanism for the secondary-side synchronization rectifier (SR) controller 3308 remains to be the slow turn-on mechanism.

According to another embodiment, under the slow turn-on mechanism, the secondary-side synchronization rectifier (SR) controller 3308 detects that the voltage signal 3362 becomes smaller than the threshold voltage 3480 (e.g., $V_{th}$) at time $t_{115}$, the secondary-side synchronization rectifier (SR) controller 3308 does not change the drive signal 3366 from the logic low level to the logic high level at time $t_{115}$. For example, under the slow turn-on mechanism, the secondary-side synchronization rectifier (SR) controller 3308 determines whether the voltage signal 3362 remains smaller than the threshold voltage 3480 (e.g., $V_{th}$) for a time duration that is equal to or larger than a predetermined period of time (e.g., $T_s$). In another example, the predetermined period of time (e.g., $T_s$) is larger than zero, the threshold duration $T_{th1}$ is larger than zero, and the threshold duration $T_{th2}$ is longer than zero. In yet another example, as shown in FIG. 15, the secondary-side synchronization rectifier (SR) controller 3308 detects that the voltage signal 3362 becomes larger than the threshold voltage 3480 (e.g., $V_{th}$) at time $t_{116}$, and determines that the duration from time $t_{115}$ to $t_{116}$ is shorter than the predetermined period of time (e.g., $T_s$), the secondary-side synchronization rectifier (SR) controller 3308 keeps the drive signal 3366 at the logic low level.

As discussed above and further emphasized here, FIG. 15 is merely an example, which should not unduly limit the scope of the claims. One of ordinary skill in the art would recognize many variations, alternatives, and modifications. For example, the secondary-side synchronization rectifier (SR) controller 3308 detects that the voltage signal 3362 becomes smaller than the reference voltage 3490 (e.g., $V_{ref1}$) but larger than the reference voltage 3590 (e.g., $V_{ref2}$) at time $t_{111}$, remains smaller than the reference voltage 3490 (e.g., $V_{ref1}$) but larger than the reference voltage 3590 (e.g., $V_{ref2}$) until time $t_{112}$, and becomes smaller than the reference voltage 3590 (e.g., $V_{ref2}$) at time $t_{112}$. In another example, if the time duration (e.g., $T_J$) from time $t_{111}$ to time $t_{112}$ is equal to or larger than the threshold duration $T_{th2}$, the turn-on mechanism for the secondary-side synchronization rectifier (SR) controller 3308 changes from the slow turn-on mechanism to the fast turn-on mechanism.

FIG. 16 is a simplified diagram showing a method for the secondary-side synchronization rectifier (SR) controller 3308 as shown in FIG. 13 to determine a turn-on mechanism according to some embodiments of the present invention. This diagram is merely an example, which should not unduly limit the scope of the claims. One of ordinary skill in the art would recognize many variations, alternatives, and modifications. The method 3600 includes a process 3610 for determining the turn-on mechanism to be a slow turn-on mechanism, a process 3620 for determining whether condition P is satisfied, a process 3622 for determining whether condition Q is satisfied, a process 3630 for determining whether at least one of condition P or condition Q is satisfied, and a process 3640 for determining the turn-on mechanism to be the fast turn-on mechanism.

At the process 3610, the secondary-side synchronization rectifier (SR) controller 3308 determines the turn-on mechanism to be a slow turn-on mechanism as the fault turn-on mechanism. For example, when the secondary-side synchronization rectifier (SR) controller 3308 is powered up, the turn-on mechanism is, at the beginning of the powering-up process, set to be the slow turn-on mechanism as its default turn-on mechanism.

At the process 3620, it is determined whether condition P is satisfied. For example, the condition P is that the voltage signal 3362 becomes larger than the reference voltage 3490 (e.g., $V_{ref1}$) and remains larger than the reference voltage 3490 (e.g., $V_{ref1}$) for a time duration (e.g., $T_A$) that is equal to or larger than the threshold duration $T_{th1}$. In another example, if the voltage signal 3362 becomes larger than the reference voltage 3490 (e.g., $V_{ref1}$) and remains larger than the reference voltage 3490 (e.g., $V_{ref1}$) for a time duration (e.g., $T_A$) that is equal to or larger than the threshold duration $T_{th1}$, the condition P is determined to be satisfied.

At the process 3622, it is determined whether condition Q is satisfied. For example, the condition Q is that the voltage signal 3362 becomes larger than the reference voltage 3590 (e.g., $V_{ref2}$) and remains larger than the reference voltage 3590 (e.g., $V_{ref2}$) for a time duration (e.g., $T_J$) that is equal to or larger than the threshold duration $T_{th2}$. In another example, if the voltage signal 3362 becomes larger than the reference voltage 3590 (e.g., $V_{ref2}$) and remains larger than the reference voltage 3590 (e.g., $V_{ref2}$) for a time duration (e.g., $T_J$) that is equal to or larger than the threshold duration $T_{th2}$, the condition Q is determined to be satisfied. In yet another example, the reference voltage 3590 (e.g., $V_{ref2}$) is smaller than the reference voltage 3490 (e.g., $V_{ref1}$), and the threshold duration $T_{th2}$ is longer than the threshold duration $T_{th1}$.

At the process 3630, it is determined whether at least one of condition P or condition Q is satisfied. For example, if condition P is satisfied, at least one of condition P or condition Q is satisfied. In another example, if condition Q is satisfied, at least one of condition P or condition Q is satisfied. In yet another example, if condition P and condition Q are satisfied, at least one of condition P or condition Q is satisfied.

According to one embodiment, if neither condition P nor condition Q is satisfied, the process 3610 is performed so that the turn-on mechanism of the secondary-side synchronization rectifier (SR) controller 3308 remains to be the slow turn-on mechanism as the fault turn-on mechanism. According to another embodiment, if at least one of condition P or condition Q is satisfied, the process 3640 is performed.

At the process 3640, the secondary-side synchronization rectifier (SR) controller 3308 determines the turn-on mechanism to be a fast turn-on mechanism. For example, the turn-on mechanism for the secondary-side synchronization rectifier (SR) controller 3308 changes from the slow turn-on mechanism to the fast turn-on mechanism.

In one embodiment, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 further detects whether the voltage signal 3362 remains smaller than the threshold voltage during at least a debounce time duration (e.g. 400 ns) and if the voltage signal 3362 remains smaller than the threshold voltage during at least the debounce time duration (e.g. 400 ns), the secondary-side synchronization rectifier (SR) controller 3308 generates the drive signal 3366 to turn on the transistor 3310. For example, if the voltage signal 3362 does not remain smaller than the threshold voltage (e.g., $V_{th}$) during at least the debounce time duration (e.g. 400 ns), the secondary-side synchronization rectifier (SR) controller 3308 does not generate the drive signal 3366 to turn on the transistor 3310. In another example, regardless of whether the drive signal 3366 is generated or not generated to turn on the transistor 3310 under the slow turn-on mechanism, the turn-on mechanism for the secondary-side synchronization rectifier (SR) controller 3308 remains to be the slow turn-on mechanism as the default turn-on mechanism as shown by the process 3610.

In another embodiment, under the fast turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 generates, without delay, the drive signal 3366 to turn on the transistor 3310. In another example, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism as shown by the process 3610.

As discussed above and further emphasized here, FIG. 16 is merely an example, which should not unduly limit the scope of the claims. One of ordinary skill in the art would recognize many variations, alternatives, and modifications. For example, the condition P is that the voltage signal 3362 becomes equal to or larger than the reference voltage 3490 (e.g., $V_{ref1}$) and remains equal to or larger than the reference voltage 3490 (e.g., $V_{ref1}$) for a time duration (e.g., $T_A$) that is equal to or larger than the threshold duration $T_{th1}$, and the condition Q is that the voltage signal 3362 becomes equal to or larger than the reference voltage 3590 (e.g., $V_{ref2}$) and remains equal to or larger than the reference voltage 3590 (e.g., $V_{ref2}$) for a time duration (e.g., $T_J$) that is equal to or larger than the threshold duration $T_{th2}$. In another example, the condition P is that the voltage signal 3362 becomes equal to or larger than the reference voltage 3490 (e.g., $V_{ref1}$) and remains equal to or larger than the reference voltage 3490 (e.g., $V_{ref1}$) for a time duration (e.g., $T_A$) that is larger than the threshold duration Tim, and the condition Q is that the voltage signal 3362 becomes equal to or larger than the reference voltage 3590 (e.g., $V_{ref2}$) and remains equal to or larger than the reference voltage 3590 (e.g., $V_{ref2}$) for a time duration (e.g., $T_J$) that is larger than the threshold duration $T_{th2}$. In yet another example, the condition P is that the voltage signal 3362 becomes larger than the reference voltage 3490 (e.g., $V_{ref1}$) and remains larger than the reference voltage 3490 (e.g., $V_{ref1}$) for a time duration (e.g., $T_A$) that is larger than the threshold duration $T_{th1}$, and the condition Q is that the voltage signal 3362 becomes larger than the reference voltage 3590 (e.g., $V_{ref2}$) and remains larger than the reference voltage 3590 (e.g., $V_{ref2}$) for a time duration (e.g., $T_J$) that is larger than the threshold duration $T_{th2}$.

Figure 17:
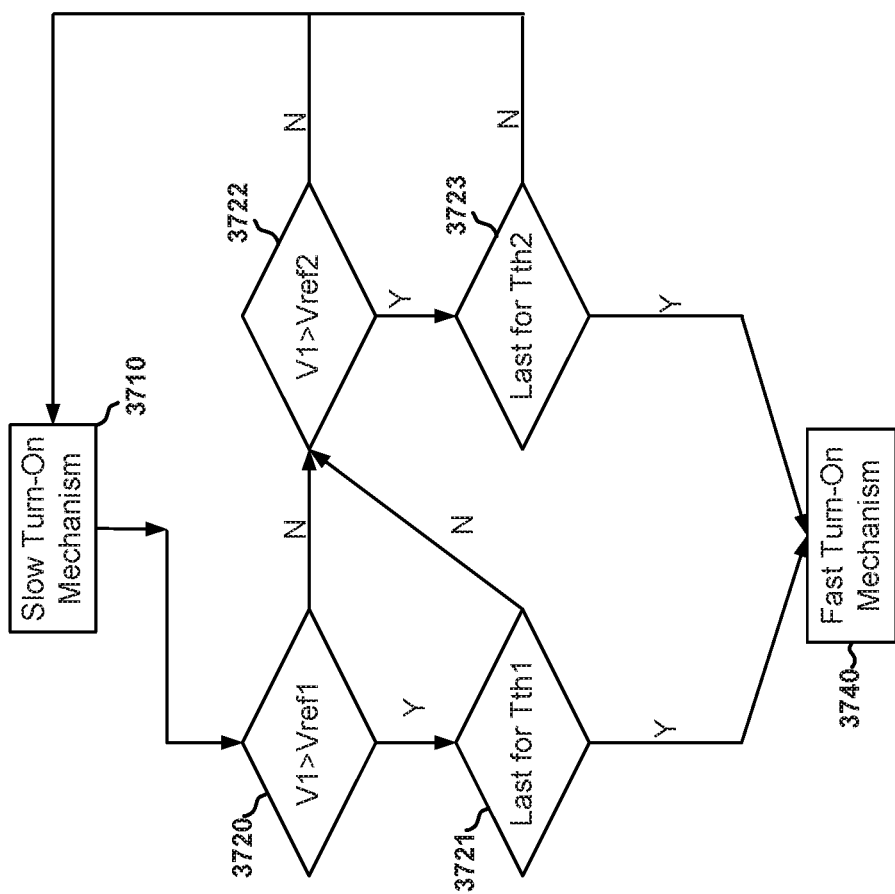
FIG. 17 is a simplified diagram showing a method for the secondary-side synchronization rectifier (SR) controller as shown in FIG. 13 to determine a turn-on mechanism according to certain embodiments of the present invention.

FIG. 17 is a simplified diagram showing a method for the secondary-side synchronization rectifier (SR) controller 3308 as shown in FIG. 13 to determine a turn-on mechanism according to certain embodiments of the present invention. This diagram is merely an example, which should not unduly limit the scope of the claims. One of ordinary skill in the art would recognize many variations, alternatives, and modifications. The method 3600 includes a process 3710 for determining the turn-on mechanism to be a slow turn-on mechanism, a process 3720 for determining whether the voltage signal 3362 becomes larger than the reference voltage 3490 (e.g., $V_{ref1}$), a process 3721 for determining whether the voltage signal 3362 remains larger than the reference voltage 3490 (e.g., $V_{ref1}$) for a time duration that is equal to or larger than the threshold duration $T_{th1}$, a process 3722 for determining whether the voltage signal 3362 becomes larger than the reference voltage 3590 (e.g., $V_{ref2}$), a process 3723 for determining whether the voltage signal 3362 remains larger than the reference voltage 3590 (e.g., $V_{ref2}$) for a time duration that is equal to or larger than the threshold duration $T_{th2}$, and a process 3740 for determining the turn-on mechanism to be the fast turn-on mechanism.

At the process 3710, the secondary-side synchronization rectifier (SR) controller 3308 determines the turn-on mechanism to be a slow turn-on mechanism as the default turn-on mechanism. For example, when the secondary-side synchronization rectifier (SR) controller 3308 is powered up, the turn-on mechanism is, at the beginning of the powering-up process, set to be the slow turn-on mechanism as its default turn-on mechanism.

At the process 3720, it is determined whether the voltage signal 3362 becomes larger than the reference voltage 3490 (e.g., $V_{ref1}$). For example, if at the process 3720, it is determined that the voltage signal 3362 does not become larger than the reference voltage 3490 (e.g., $V_{ref1}$), the process 3722 is performed. In another example, if at the process 3720, it is determined that the voltage signal 3362 becomes larger than the reference voltage 3490 (e.g., $V_{ref1}$), the process 3721 is performed.

At the process 3721, it is determined whether the voltage signal 3362 remains larger than the reference voltage 3490 (e.g., $V_{ref1}$) for a time duration that is equal to or larger than the threshold duration $T_{th1}$. For example, if at the process 3721, it is determined that the voltage signal 3362 does not remain larger than the reference voltage 3490 (e.g., $V_{ref1}$) for a time duration that is equal to or larger than the threshold duration $T_{th1}$, the process 3722 is performed. In another example, if at the process 3721, it is determined that the voltage signal 3362 remains larger than the reference voltage 3490 (e.g., $V_{ref1}$) for a time duration that is equal to or larger than the threshold duration $T_{th1}$, the process 3740 is performed.

At the process 3722, it is determined whether the voltage signal 3362 becomes larger than the reference voltage 3590 (e.g., $V_{ref2}$). For example, the reference voltage 3590 (e.g., $V_{ref2}$) is smaller than the reference voltage 3490 (e.g., $V_{ref1}$). In another example, if at the process 3722, it is determined that the voltage signal 3362 does not become larger than the reference voltage 3590 (e.g., $V_{ref2}$), the process 3710 is performed. In yet another example, if at the process 3722, it is determined that the voltage signal 3362 becomes larger than the reference voltage 3590 (e.g., $V_{ref2}$), the process 3723 is performed.

At the process 3723, it is determined whether the voltage signal 3362 remains larger than the reference voltage 3590 (e.g., $V_{ref2}$) for a time duration that is equal to or larger than the threshold duration $T_{th2}$. For example, if at the process 3723, it is determined that the voltage signal 3362 does not remain larger than the reference voltage 3590 (e.g., $V_{ref2}$) for a time duration that is equal to or larger than the threshold duration $T_{th2}$, the process 3710 is performed. In another example, if at the process 3723, it is determined that the voltage signal 3362 remains larger than the reference voltage 3590 (e.g., $V_{ref2}$) for a time duration that is equal to or larger than the threshold duration $T_{th2}$, the process 3740 is performed.

At the process 3740, the secondary-side synchronization rectifier (SR) controller 3308 determines the turn-on mechanism to be a fast turn-on mechanism. For example, the turn-on mechanism for the secondary-side synchronization rectifier (SR) controller 3308 changes from the slow turn-on mechanism to the fast turn-on mechanism.

In one embodiment, under the slow turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 further detects whether the voltage signal 3362 remains smaller than the threshold voltage during at least a debounce time duration (e.g. 400 ns) and if the voltage signal 3362 remains smaller than the threshold voltage during at least the debounce time duration (e.g. 400 ns), the secondary-side synchronization rectifier (SR) controller 3308 generates the drive signal 3366 to turn on the transistor 3310. For example, if the voltage signal 3362 does not remain smaller than the threshold voltage (e.g., $V_{th}$) during at least the debounce time duration (e.g. 400 ns), the secondary-side synchronization rectifier (SR) controller 3308 does not generate the drive signal 3366 to turn on the transistor 3310. In another example, regardless of whether the drive signal 3366 is generated or not generated to turn on the transistor 3310 under the slow turn-on mechanism, the turn-on mechanism for the secondary-side synchronization rectifier (SR) controller 3308 remains to be the slow turn-on mechanism as the default turn-on mechanism as shown by the process 3610.

In another embodiment, under the fast turn-on mechanism, if the secondary-side synchronization rectifier (SR) controller 3308 detects that the voltage signal 3362 becomes smaller than the threshold voltage (e.g., $V_{th}$), the secondary-side synchronization rectifier (SR) controller 3308 generates, without delay, the drive signal 3366 to turn on the transistor 3310, regardless of whether the voltage signal 3362 remains smaller than the threshold voltage (e.g., $V_{th}$) during at least a debounce time duration (e.g. 400 ns). In another example, after the drive signal 3366 is generated to turn on the transistor 3310 under the fast turn-on mechanism, the turn-on mechanism for the secondary-side synchronization rectifier (SR) controller 3308 changes from the fast turn-on mechanism back to the slow turn-on mechanism as shown by the process 3610.

As discussed above and further emphasized here, FIG. 17 is merely an example, which should not unduly limit the scope of the claims. One of ordinary skill in the art would recognize many variations, alternatives, and modifications. For example, at the process 3722, it is determined whether the voltage signal 3362 becomes smaller than the reference voltage 3490 (e.g., $V_{ref1}$) but larger than the reference voltage 3590 (e.g., $V_{ref2}$), and if at the process 3722, it is determined that the voltage signal 3362 becomes smaller than the reference voltage 3490 (e.g., $V_{ref1}$) but larger than the reference voltage 3590 (e.g., $V_{ref2}$), the process 3723 is performed. In another example, at the process 3723, it is determined whether the voltage signal 3362 remains smaller than the reference voltage 3490 (e.g., $V_{ref1}$) but larger than the reference voltage 3590 (e.g., $V_{ref2}$) for a time duration that is equal to or larger than the threshold duration $T_{th2}$, and if at the process 3723, it is determined that the voltage signal 3362 remains smaller than the reference voltage 3490 (e.g., $V_{ref1}$) but larger than the reference voltage 3590 (e.g., $V_{ref2}$) for a time duration that is equal to or larger than the threshold duration $T_{th2}$, the process 3740 is performed.

Figure 18:
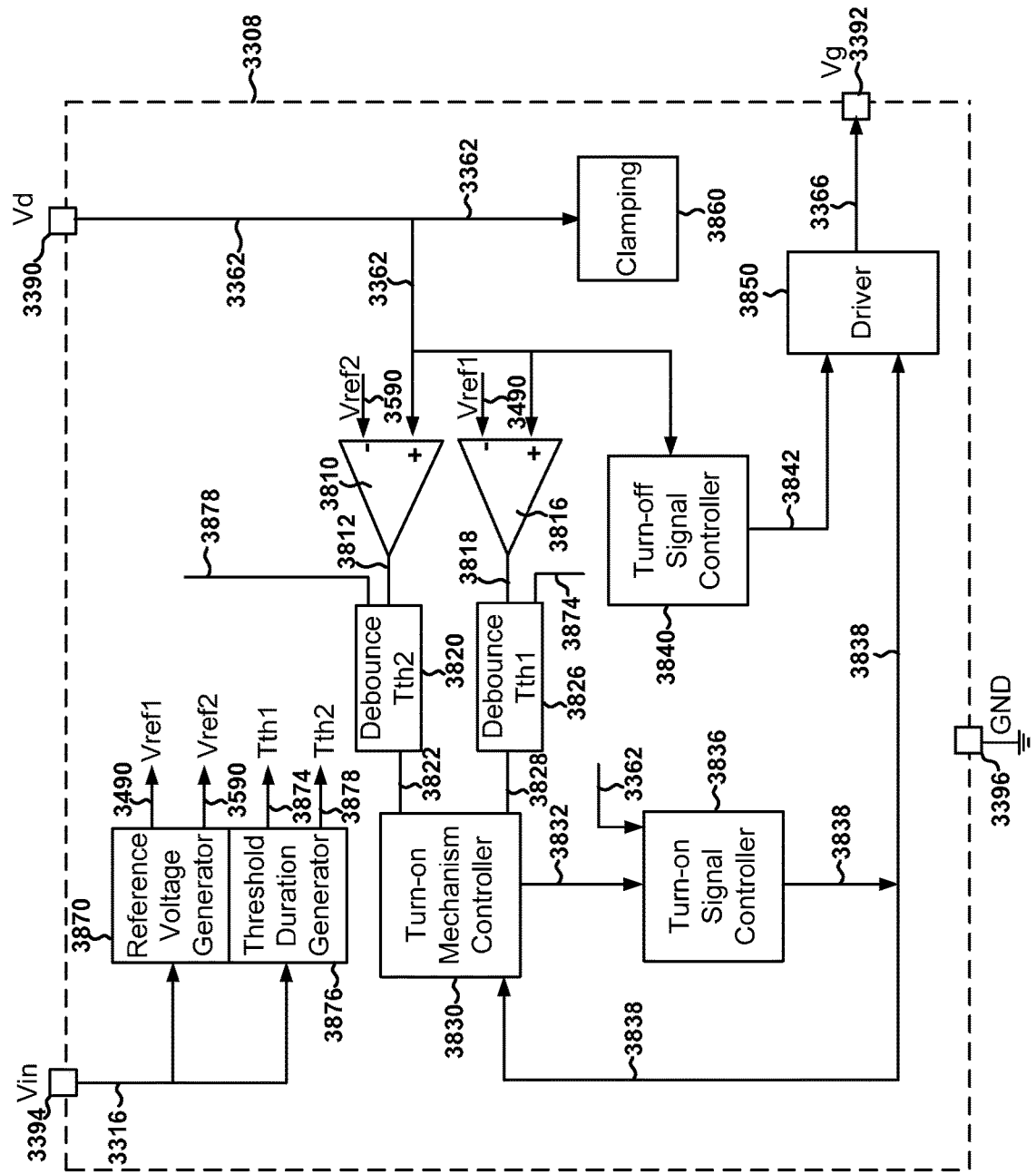
FIG. 18 is a simplified diagram showing certain components of the secondary-side synchronization rectifier (SR) controller of the power conversion system as shown in FIG. 13 according to an embodiment of the present invention.

FIG. 18 is a simplified diagram showing certain components of the secondary-side synchronization rectifier (SR) controller 3308 of the power conversion system 3300 as shown in FIG. 13 according to an embodiment of the present invention. This diagram is merely an example, which should not unduly limit the scope of the claims. One of ordinary skill in the art would recognize many variations, alternatives, and modifications. The secondary-side synchronization rectifier (SR) controller 3308 includes the terminals 3390, 3392, 3394 and 3396. Additionally, the secondary-side synchronization rectifier (SR) controller 3308 includes comparators 3810 and 3816, debounce components 3820 and 3826, a turn-on mechanism controller 3830, a turn-on signal controller 3836, a turn-off signal controller 3840, a driver 3850, a clamper 3860, a reference voltage generator 3870, and a threshold duration generator 3876.

In one embodiment, the reference voltage generator 3870 receives the voltage signal 3316 and generates the reference voltage 3490 (e.g., $V_{ref1}$) and the reference voltage 3590 (e.g., $V_{ref2}$) based at least in part on the voltage signal 3316. For example, the reference voltage 3490 (e.g., $V_{ref1}$) and the reference voltage 3590 (e.g., $V_{ref2}$) are determined according to the following equations respectively:

$$V_{ref1}=V_{ref\_ini}+\alpha \times V_{in} \quad \text{(Equation 2)}$$

$$V_{ref2}=V_{ref\_ini}+\beta \times V_{in} \quad \text{(Equation 3)}$$

where $V_{ref1}$ represents the reference voltage 3490, and $V_{ref2}$ represents the reference voltage 3590. Additionally, $V_{in}$ represents the voltage signal 3316. Moreover, $V_{ref\_ini}$ represents a predetermined voltage magnitude. Also, $\alpha$ represents a predetermined constant, and $\beta$ represents another predetermined constant.

In another example, the reference voltage 3490 (e.g., $V_{ref1}$) is larger than the reference voltage 3590 (e.g., $V_{ref2}$). In yet another example, the predetermined constant $\alpha$ in Equation 2 is larger than zero, the predetermined constant $\beta$ in Equation 3 is larger than zero, and the predetermined constant $\alpha$ in Equation 2 is larger than the predetermined constant $\beta$ in Equation 3. In yet another example, the reference voltage 3490 (e.g., $V_{ref1}$) increases linearly with the voltage signal 3316 (e.g., $V_{in}$), and the reference voltage 3590 (e.g., $V_{ref2}$) increases linearly with the voltage signal 3316 (e.g., $V_{in}$).

In another embodiment, the threshold duration generator 3876 receives the voltage signal 3316 and generates, based at least in part on the voltage signal 3316, a signal 3874 that represents the threshold time period $T_{th1}$ and a signal 3878 that represents the threshold time period $T_{th2}$. For example, the threshold duration $T_{th1}$ and the threshold duration $T_{th2}$ are determined according to the following equations respectively:

$$T_{th1}=T_{th\_ini}+\gamma \times V_{in} \quad \text{(Equation 4)}$$

$$T_{th2}=T_{th\_ini}+\delta \times V_{in} \quad \text{(Equation 5)}$$

where $T_{th1}$ represents the threshold duration $T_{th1}$, and $T_{th2}$ represents the threshold duration $T_{th2}$. Additionally, $V_{in}$ represents the voltage signal 3316. Moreover, $T_{th\_ini}$ represents a predetermined duration magnitude. Also, $\gamma$ represents a predetermined constant, and $\delta$ represents another predetermined constant. In another example, the threshold duration $T_{th2}$ is longer than the threshold duration $T_{th1}$. In yet another example, the reference voltage 3590 (e.g., $V_{ref2}$) is smaller than the reference voltage 3490 (e.g., $V_{ref1}$), and the threshold duration $T_{th2}$ is longer than the threshold duration $T_{th1}$.

In yet another example, the predetermined constant $\gamma$ in Equation 4 is larger than zero, the predetermined constant $\delta$ in Equation 5 is larger than zero, and the predetermined constant $\gamma$ in Equation 4 is smaller than the predetermined constant $\delta$ in Equation 5. In yet another example, the threshold duration $T_{th1}$ increases linearly with the voltage signal 3316 (e.g., $V_{in}$), and the threshold duration $T_{th2}$ increases linearly with the voltage signal 3316 (e.g., $V_{in}$).

According to one embodiment, the comparator 3810 receives the voltage signal 3362 and the reference voltage 3590 (e.g., $V_{ref2}$) and generate a comparison signal 3812. For example, if the voltage signal 3362 becomes larger than the reference voltage 3590 (e.g., $V_{ref2}$), the comparison signal 3812 changes from a logic low level to a logic high level. In another example, the comparison signal 3812 is received by the debounce component 3820. According to another embodiment, the debounce component 3820 receives the comparison signal 3812 and the signal 3878 that represents the threshold time period $T_{th2}$. For example, the debounce component 3820 determines whether the voltage signal 3362 remains larger than the reference voltage 3590 (e.g., $V_{ref2}$) (e.g., whether the comparison signal 3812 remains to be at the logic high level) for a time duration that is equal to or larger than the threshold duration $T_{th2}$. In another example, the debounce component 3820 generates a signal 3822, which indicate whether the voltage signal 3362 remains larger than the reference voltage 3590 (e.g., $V_{ref2}$)

(e.g., whether the comparison signal 3812 remains to be at the logic high level) for a time duration that is equal to or larger than the threshold duration $T_{th2}$.

According to another embodiment, the comparator 3816 receives the voltage signal 3362 and the reference voltage 3490 (e.g., $V_{ref1}$) and generate a comparison signal 3818. For example, if the voltage signal 3362 becomes larger than the reference voltage 3490 (e.g., $V_{ref1}$), the comparison signal 3818 changes from the logic low level to the logic high level. In another example, the comparison signal 3818 is received by the debounce component 3826. According to another embodiment, the debounce component 3826 receives the comparison signal 3818 and the signal 3874 that represents the threshold time period $T_{th1}$. For example, the debounce component 3826 determines whether the voltage signal 3362 remains larger than the reference voltage 3490 (e.g., $V_{ref1}$) (e.g., whether the comparison signal 3818 remains to be at the logic high level) for a time duration that is equal to or larger than the threshold duration $T_{th1}$. In another example, the debounce component 3826 generates a signal 3828, which indicate whether the voltage signal 3362 remains larger than the reference voltage 3490 (e.g., $V_{ref1}$) (e.g., whether the comparison signal 3818 remains to be at the logic high level) for a time duration that is equal to or larger than the threshold duration $T_{th1}$.

In one embodiment, the turn-on mechanism controller 3830 receives the signals 3822 and 3828, and in response generates a signal 3832 indicating whether the turn-on mechanism is a fast turn-on mechanism or a slow turn-on mechanism. For example, if the signal 3822 indicates that the voltage signal 3362 remains larger than the reference voltage 3590 (e.g., $V_{ref2}$) for a time duration that is equal to or larger than the threshold duration $T_{th2}$, and/or the signal 3828 indicates that the voltage signal 3362 remains larger than the reference voltage 3490 (e.g., $V_{ref1}$) for a time duration that is equal to or larger than the threshold duration $T_{th1}$, the turn-on mechanism controller 3830 determines the turn-on mechanism to be a fast turn-on mechanism and generates the signal 3832 indicating that the turn-on mechanism is the fast turn-on mechanism. In another example, if the signal 3822 does not indicate that the voltage signal 3362 remains larger than the reference voltage 3590 (e.g., $V_{ref2}$) for a time duration that is equal to or larger than the threshold duration $T_{th2}$, and the signal 3828 does not indicate that the voltage signal 3362 remains larger than the reference voltage 3490 (e.g., $V_{ref1}$) for a time duration that is equal to or larger than the threshold duration $T_{th1}$, the turn-on mechanism controller 3830 determines the turn-on mechanism to be a slow turn-on mechanism and generates the signal 3832 indicating that the turn-on mechanism is the slow turn-on mechanism.

In yet another example, as shown in FIG. 16, if at least one of condition P or condition Q is satisfied, the turn-on mechanism controller 3830 determines the turn-on mechanism to be a fast turn-on mechanism and generates the signal 3832 indicating that the turn-on mechanism is the fast turn-on mechanism. In yet another example, as shown in FIG. 16, if neither condition P nor condition Q is satisfied, the turn-on mechanism controller 3830 determines the turn-on mechanism to be a slow turn-on mechanism and generates the signal 3832 indicating that the turn-on mechanism is the slow turn-on mechanism.

According to some embodiments, the turn-on signal controller receives the signal 3832 and the voltage signal 3362, and generates a signal 3838. In one embodiment, if the signal 3832 indicates that the turn-on mechanism is the fast turn-on mechanism, when the turn-on signal controller detects that the voltage signal 3362 becomes smaller than the threshold voltage (e.g., $V_{th}$), the turn-on signal controller outputs, without delay, the signal 3838, which if received by the driver 3850, instructs the driver 3850 to generate the drive signal 3366 to turn on the transistor 3310 (e.g., a MOSFET). For example, the driver 3850 receives the signal 3838 and in response, generates the drive signal 3366 to turn on the transistor 3310 (e.g., a MOSFET). In another embodiment, the signal 3838 is received by the turn-on mechanism controller 3830. For example, the signal 3838, if received by the driver 3850, instructs the driver 3850 to generate the drive signal 3366 to turn on the transistor 3310 (e.g., a MOSFET), and in response the turn-on mechanism controller 3830 changes the turn-on mechanism from the fast turn-on mechanism to the slow turn-on mechanism and generates the signal 3832 indicating that the turn-on mechanism is the slow turn-on mechanism.

In yet another embodiment, if the signal 3832 indicates that the turn-on mechanism is the fast turn-on mechanism, when the turn-on signal controller does not detect that the voltage signal 3362 becomes smaller than the threshold voltage (e.g., $V_{th}$), the turn-on signal controller does not output the signal 3838, which if received by the driver 3850, instructs the driver 3850 to generate the drive signal 3366 to turn on the transistor 3310 (e.g., a MOSFET). For example, the driver 3850 receives the signal 3838 and in response, does not generate the drive signal 3366 to turn on the transistor 3310 (e.g., a MOSFET). In another embodiment, the signal 3838 is received by the turn-on mechanism controller 3830. For example, the signal 3838, if received by the driver 3850, does not instruct the driver 3850 to generate the drive signal 3366 to turn on the transistor 3310 (e.g., a MOSFET), and in response the turn-on mechanism controller 3830 keep the turn-on mechanism to be the fast turn-on mechanism and generates the signal 3832 indicating that the turn-on mechanism is the fast turn-on mechanism.

In yet another embodiment, if the signal 3832 indicates that the turn-on mechanism is the slow turn-on mechanism, when the turn-on signal controller detects that the voltage signal 3362 becomes smaller than the threshold voltage (e.g., $V_{th}$) and also detects that the voltage signal 3362 remains smaller than the threshold voltage during at least the debounce time duration (e.g. 400 ns), the turn-on signal controller outputs the signal 3838, which if received by the driver 3850, instructs the driver 3850 to generate the drive signal 3366 to turn on the transistor 3310 (e.g., a MOSFET). For example, the driver 3850 receives the signal 3838 and in response, generates the drive signal 3366 to turn on the transistor 3310 (e.g., a MOSFET). In another embodiment, the signal 3838 is received by the turn-on mechanism controller 3830, which in response, keeps the turn-on mechanism to be the slow turn-on mechanism and generates the signal 3832 indicating that the turn-on mechanism is the slow turn-on mechanism.

In yet another embodiment, if the signal 3832 indicates that the turn-on mechanism is the slow turn-on mechanism, when the turn-on signal controller does not detect that the voltage signal 3362 becomes smaller than the threshold voltage (e.g., $V_{th}$) or does not detect that the voltage signal 3362 remains smaller than the threshold voltage during at least the debounce time duration (e.g. 400 ns), the turn-on signal controller does not output the signal 3838, which if received by the driver 3850, instructs the driver 3850 to generate the drive signal 3366 to turn on the transistor 3310 (e.g., a MOSFET). For example, the driver 3850 receives the signal 3838 and in response, does not generate the drive signal 3366 to turn on the transistor 3310 (e.g., a MOSFET).

In another embodiment, the signal 3838 is received by the turn-on mechanism controller 3830, which in response, keeps the turn-on mechanism to be the slow turn-on mechanism and generates the signal 3832 indicating that the turn-on mechanism is the slow turn-on mechanism.

In yet another embodiment, the clamper 3860 receives the voltage signal 3362. For example, the voltage signal 3362 includes one or more high voltage glitches. In another example, the clamper is used to clamp the voltage signal 3362 in order to protect one or more internal circuits of the secondary-side synchronization rectifier (SR) controller 3308.

Certain embodiments of the present invention provide a secondary-side synchronization rectifier (SR) controller that selects either a fast turn-on mechanism or a slow turn-on mechanism in order to provide a desirable tradeoff between efficiency and reliability.

According to another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and in response to the input signal not being determined to remain larger than the first threshold for the first time period that is equal to or longer than the first predetermined duration, operate with a first mechanism. Moreover, operating with the first mechanism, the system controller is further configured to determine whether the input signal remains smaller than a second threshold for a second time period that is equal to or longer than a second predetermined duration, and in response to the input signal being determined to remain smaller than the second threshold for the second time period that is equal to or longer than the second predetermined duration, change the drive signal at the second controller terminal from a first logic level to a second logic level. The first predetermined duration is larger than zero, and the second predetermined duration is larger than zero. For example, the system controller is implemented according to at least FIG. 13 and/or FIG. 14.

According to yet another embodiment, a system controller for regulating a power converter includes a first controller terminal and a second controller terminal. The system controller is configured to receive an input signal at the first controller terminal, and generate a drive signal at the second controller terminal based at least in part on the input signal to turn on or off a transistor in order to affect a current associated with a secondary winding of the power converter. Additionally, the system controller is further configured to determine whether the input signal remains smaller than or equal to a first threshold and larger than a second threshold for a first time period that is equal to or longer than a first predetermined duration, the second threshold being smaller than the first threshold, and in response to the input signal not being determined to remain smaller than or equal to the first threshold and larger than the second threshold for the first time period that is equal to or longer than the first predetermined duration, operate with a first mechanism. Moreover, operating with the first mechanism, the system controller is further configured to determine whether the input signal remains smaller than a third threshold for a second time period that is equal to or longer than a second predetermined duration, and in response to the input signal being determined to remain smaller than the third threshold for the second time period that is equal to or longer than the second predetermined duration, change the drive signal at the second controller terminal from a first logic level to a second logic level. The first predetermined duration is larger than zero, and the second predetermined duration is larger than zero. For example, the system controller is implemented according to at least FIG. 13 and/or FIG. 15.

According to yet another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. The second threshold is smaller than the first threshold, and the second predetermined duration is longer than the first predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. Also, operating with the first mechanism, the system controller is further configured to determine whether the input signal remains smaller than a third threshold for a third time period that is equal to or longer than a third predetermined duration, and in response to the input signal being determined to remain smaller than the third threshold for the third time period that is equal to or longer than the third predetermined duration, change the drive signal at the second controller terminal from a first logic level to a second logic level. The first predetermined duration is larger than zero, the second predetermined duration is larger than zero, and the third predetermined duration is larger than zero. For example, the system controller is implemented according to at least FIG. 13, FIG. 16, FIG. 17, and/or FIG. 18.

According yet another embodiment, a system controller for regulating a power converter includes a first controller terminal and a second controller terminal. The system controller is configured to receive an input signal at the first controller terminal, and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. The second threshold is smaller than the first threshold, and the second predetermined duration is longer than the first predetermined duration. The first predetermined duration is larger than zero, and the second predetermined duration is larger than zero. The first threshold changes with the input signal in magnitude, and the second threshold changes with the input signal in magnitude. For example, the system controller is implemented according to at least FIG. 13, FIG. 16, FIG. 17, and/or FIG. 18.

According to yet another embodiment, a system controller for regulating a power converter includes a first controller terminal and a second controller terminal. The system controller is configured to receive an input signal at the first controller terminal and generate a drive signal at the second controller terminal based at least in part on the input signal to turn on or off a transistor in order to affect a current associated with a secondary winding of the power converter. Additionally, the system controller is further configured to determine whether the input signal remains larger than a first threshold for a first time period that is equal to or longer than a first predetermined duration, and determine whether the input signal remains larger than a second threshold for a second time period that is equal to or longer than a second predetermined duration. Moreover, the system controller is further configured to, in response to the input signal not being determined to remain larger than the first threshold for the first time period that is equal to or longer than the first predetermined duration and the input signal not being determined to remain larger than the second threshold for the second time period that is equal to or longer than the second predetermined duration, operate with a first mechanism. The second threshold is smaller than the first threshold, and the second predetermined duration is longer than the first predetermined duration. The first predetermined duration is larger than zero, the second predetermined duration is larger than zero, the first predetermined duration changes with the input signal in magnitude, and the second predetermined duration changes with the input signal in magnitude. For example, the system controller is implemented according to at least FIG. 13, FIG. 16, FIG. 17, and/or FIG. 18.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; and in response to the input signal not being determined to remain larger than the first threshold for the first time period that is equal to or longer than the first predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a second threshold for a second time period that is equal to or longer than a second predetermined duration; and in response to the input signal being determined to remain smaller than the second threshold for the second time period that is equal to or longer than the second predetermined duration, changing the drive signal from a first logic level to a second logic level. The first predetermined duration is larger than zero, and the second predetermined duration is larger than zero. For example, the method is implemented according to at least FIG. 13 and/or FIG. 14.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains smaller than or equal to a first threshold and larger than a second threshold for a first time period that is equal to or longer than a first predetermined duration, the second threshold being smaller than the first threshold; and in response to the input signal not being determined to remain smaller than or equal to the first threshold and larger than the second threshold for the first time period that is equal to or longer than the first predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a third threshold for a second time period that is equal to or longer than a second predetermined duration; and in response to the input signal being determined to remain smaller than the third threshold for the second time period that is equal to or longer than the second predetermined duration, changing the drive signal from a first logic level to a second logic level. The first predetermined duration is larger than zero, and the second predetermined duration is larger than zero. For example, the method is implemented according to at least FIG. 13 and/or FIG. 15.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration, the second threshold being smaller than the first threshold, the second predetermined duration being longer than the first predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The generating a drive signal based at least in part on the input signal to turn on or off a transistor in order to affect a current associated with a secondary winding of the power converter includes, in response to operating with the first mechanism, determining whether the input signal remains smaller than a third threshold for a third time period that is equal to or longer than a third predetermined duration; and in response to the input signal being determined to remain smaller than the third threshold for the third time period that is equal to or longer than the third predetermined duration, changing the drive signal from a first logic level to a second logic level. The first predetermined duration is larger than zero, the second predetermined duration is larger than zero, and the third predetermined duration is larger than zero. For example, the method is implemented according to at least FIG. 13, FIG. 16, FIG. 17, and/or FIG. 18.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The second threshold is smaller than the first threshold, and the second predetermined duration is longer than the first predetermined duration. The first predetermined duration is larger than zero, and the second predetermined duration is larger than zero. The first threshold changes with the input signal in magnitude, and the second threshold changes with the input signal in magnitude. For example, the method is implemented according to at least FIG. 13, FIG. 16, FIG. 17, and/or FIG. 18.

According to yet another embodiment, a method for regulating a power converter includes receiving an input signal, processing information associated with the input signal, and generating a drive signal based at least in part on the input signal to turn on or off a transistor in order to affect a current associated with a secondary winding of the power converter. The processing information associated with the input signal includes: determining whether the input signal remains larger than a first threshold for a first time period that is equal to or longer than a first predetermined duration; determining whether the input signal remains larger than a second threshold for a second time period that is equal to or longer than a second predetermined duration; and in response to the input signal not being determined to remain larger than the first threshold for the first time period that is equal to or longer than the first predetermined duration and the input signal not being determined to remain larger than the second threshold for the second time period that is equal to or longer than the second predetermined duration, operating with a first mechanism. The second threshold is smaller than the first threshold, and the second predetermined duration is longer than the first predetermined duration. The first predetermined duration is larger than zero, the second predetermined duration is larger than zero, the first predetermined duration changes with the input signal in magnitude, and the second predetermined duration changes with the input signal in magnitude. For example, the method is implemented according to at least FIG. 13, FIG. 16, FIG. 17, and/or FIG. 18.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power converter, the system controller comprising:
    a first controller terminal; and
    a second controller terminal;
    wherein the system controller is configured to:
        receive an input signal at the first controller terminal; and
        generate a drive signal at the second controller terminal based at least in part on the input signal;
    wherein the system controller is further configured to:
        determine whether the input signal remains larger than a first threshold for a first time period that is longer than a first predetermined duration;
        in response to the input signal not being determined to remain larger than the first threshold for the first time period that is longer than the first predetermined duration, operate with a first mechanism; and
        in response to the input signal being determined to remain larger than the first threshold for the first time period that is longer than the first predetermined duration, operate with a second mechanism;
    wherein, operating with the first mechanism, the system controller is further configured to:
        determine whether the input signal remains smaller than a second threshold for a second time period that is longer than a second predetermined duration; and
        in response to the input signal being determined to remain smaller than the second threshold for the second time period that is longer than the second predetermined duration, change the drive signal at the second controller terminal from a first logic level to a second logic level;
    wherein the second mechanism is different from the first mechanism.

2. The system controller of claim 1 wherein:
    operating with the second mechanism, the system controller is further configured to:
        determine whether the input signal becomes smaller than the second threshold; and
        in response to the input signal being determined to become smaller than the second threshold, change the drive signal at the second controller terminal from the first logic level to the second logic level.

3. The system controller of claim 2 wherein the system controller is further configured to, after the drive signal is changed from the first logic level to the second logic level in response to the input signal being determined to become smaller than the second threshold, operate with the first mechanism.

4. The system controller of claim 1 wherein:
the first mechanism is a slow turn-on mechanism; and
the second mechanism is a fast turn-on mechanism.

5. The system controller of claim 1 wherein:
the first logic level is a logic low level; and
the second logic level is a logic high level.

6. The system controller of claim 1 wherein the system controller is further configured to, in response to changing the drive signal from the first logic level to the second logic level, turn on a transistor.

7. The system controller of claim 1 wherein the second threshold is smaller than the first threshold.

8. The system controller of claim 1 wherein the system controller is further configured to:
determine whether the input signal becomes smaller than the second threshold; and
in response to the input signal being determined to become smaller than the second threshold,
if the system controller operates with the first mechanism, after a delay, change the drive signal at the second controller terminal from the first logic level to the second logic level; and
if the system controller operates with the second mechanism, immediately change the drive signal at the second controller terminal from the first logic level to the second logic level.

9. A system controller for regulating a power converter, the system controller comprising:
a first controller terminal; and
a second controller terminal;
wherein the system controller is configured to:
receive an input signal at the first controller terminal; and
generate a drive signal at the second controller terminal based at least in part on the input signal;
wherein the system controller is further configured to:
determine whether the input signal remains smaller than or equal to a first threshold and larger than a second threshold for a first time period that is longer than a first predetermined duration, the second threshold being smaller than the first threshold;
in response to the input signal not being determined to remain smaller than or equal to the first threshold and larger than the second threshold for the first time period that is longer than the first predetermined duration, operate with a first mechanism; and
in response to the input signal being determined to remain smaller than or equal to the first threshold and larger than the second threshold for the first time period that is longer than the first predetermined duration, operate with a second mechanism;
wherein, operating with the first mechanism, the system controller is further configured to:
determine whether the input signal remains smaller than a third threshold for a second time period that is longer than a second predetermined duration; and
in response to the input signal being determined to remain smaller than the third threshold for the second time period that is longer than the second predetermined duration, change the drive signal at the second controller terminal from a first logic level to a second logic level;
wherein the second mechanism is different from the first mechanism.

10. The system controller of claim 9 wherein:
operating with the second mechanism, the system controller is further configured to:
determine whether the input signal becomes smaller than the third threshold; and
in response to the input signal being determined to become smaller than the third threshold, change the drive signal at the second controller terminal from the first logic level to the second logic level.

11. The system controller of claim 10 wherein the system controller is further configured to, after the drive signal is changed from the first logic level to the second logic level in response to the input signal being determined to become smaller than the third threshold, operate with the first mechanism.

12. The system controller of claim 9 wherein:
the first mechanism is a slow turn-on mechanism; and
the second mechanism is a fast turn-on mechanism.

13. The system controller of claim 9 wherein:
the first logic level is a logic low level; and
the second logic level is a logic high level.

14. The system controller of claim 9 wherein the system controller is further configured to, in response to changing the drive signal from the first logic level to the second logic level, turn on a transistor.

15. The system controller of claim 9 wherein:
the third threshold is smaller than the first threshold; and
the third threshold is smaller than the second threshold.

16. The system controller of claim 9 wherein the system controller is further configured to:
determine whether the input signal becomes smaller than the third threshold; and
in response to the input signal being determined to become smaller than the third threshold,
if the system controller operates with the first mechanism, after a delay, change the drive signal at the second controller terminal from the first logic level to the second logic level; and
if the system controller operates with the second mechanism, immediately change the drive signal at the second controller terminal from the first logic level to the second logic level.

17. A method for regulating a power converter, the method comprising:
receiving an input signal;
processing information associated with the input signal; and
generating a drive signal based at least in part on the input signal;
wherein the processing information associated with the input signal includes:
determining whether the input signal remains larger than a first threshold for a first time period that is longer than a first predetermined duration;
in response to the input signal not being determined to remain larger than the first threshold for the first time period that is longer than the first predetermined duration, operating with a first mechanism; and
in response to the input signal being determined to remain larger than the first threshold for the first time period that is longer than the first predetermined duration, operating with a second mechanism;
wherein the generating a drive signal based at least in part on the input signal includes, in response to operating with the first mechanism, determining whether the input signal remains smaller than a second threshold for a second time period that is longer than a second predetermined duration; and in response to the input signal being determined to remain smaller than the second threshold for the second time period that is longer than the second predetermined duration, changing the drive signal from a first logic level to a second logic level;

wherein the second mechanism is different from the first mechanism.

18. The method of claim 17 wherein:

the generating a drive signal based at least in part on the input signal further includes, in response to operating with the second mechanism, determining whether the input signal becomes smaller than the second threshold; and in response to the input signal being determined to become smaller than the second threshold, changing the drive signal from the first logic level to the second logic level.

19. The method of claim 18 wherein the processing information associated with the input signal further includes, after the drive signal is changed from the first logic level to the second logic level in response to the input signal being determined to become smaller than the second threshold, operating with the first mechanism.

20. The method of claim 17 wherein:

the first mechanism is a slow turn-on mechanism; and
the second mechanism is a fast turn-on mechanism.

21. The method of claim 17, and further comprising:

in response to changing the drive signal from the first logic level to the second logic level, turning on a transistor.

22. The method of claim 17 wherein the second threshold is smaller than the first threshold.

23. The method of claim 17 wherein the generating a drive signal based at least in part on the input signal further includes:

determining whether the input signal becomes smaller than the second threshold; and in response to the input signal being determined to become smaller than the second threshold, if operating with the first mechanism, after a delay, changing the drive signal at the second controller terminal from the first logic level to the second logic level; and if operating with the second mechanism, immediately changing the drive signal at the second controller terminal from the first logic level to the second logic level.

24. A method for regulating a power converter, the method comprising:

receiving an input signal;

processing information associated with the input signal; and generating a drive signal based at least in part on the input signal;

wherein the processing information associated with the input signal includes:

determining whether the input signal remains smaller than or equal to a first threshold and larger than a second threshold for a first time period that is longer than a first predetermined duration, the second threshold being smaller than the first threshold;

in response to the input signal not being determined to remain smaller than or equal to the first threshold and larger than the second threshold for the first time period that is longer than the first predetermined duration, operating with a first mechanism; and in response to the input signal being determined to remain smaller than or equal to the first threshold and larger than the second threshold for the first time period that is longer than the first predetermined duration, operating with a second mechanism;

wherein the generating a drive signal based at least in part on the input signal includes, in response to operating with the first mechanism, determining whether the input signal remains smaller than a third threshold for a second time period that is longer than a second predetermined duration; and in response to the input signal being determined to remain smaller than the third threshold for the second time period that is longer than the second predetermined duration, changing the drive signal from a first logic level to a second logic level;

wherein the second mechanism is different from the first mechanism.

25. The method of claim 24 wherein:

wherein the generating a drive signal based at least in part on the input signal includes, in response to operating with the second mechanism, determining whether the input signal becomes smaller than the third threshold; and in response to the input signal being determined to become smaller than the third threshold, changing the drive signal from the first logic level to the second logic level.

26. The method of claim 25 wherein the processing information associated with the input signal further includes, after the drive signal is changed from the first logic level to the second logic level in response to the input signal being determined to become smaller than the third threshold, operating with the first mechanism.

27. The method of claim 24 wherein:

the first mechanism is a slow turn-on mechanism; and
the second mechanism is a fast turn-on mechanism.

28. The method of claim 24, and further comprising:

in response to changing the drive signal from the first logic level to the second logic level, turning on a transistor.

29. The method of claim 24 wherein:

the third threshold is smaller than the first threshold; and
the third threshold is smaller than the second threshold.

30. The method of claim 24 wherein the generating a drive signal based at least in part on the input signal further includes:

determining whether the input signal becomes smaller than the third threshold; and in response to the input signal being determined to become smaller than the third threshold, if operating with the first mechanism, after a delay, changing the drive signal at the second controller terminal from the first logic level to the second logic level; and if operating with the second mechanism, immediately changing the drive signal at the second controller terminal from the first logic level to the second logic level.

* * * * *